ENVIRONMENTAL SYSTEM

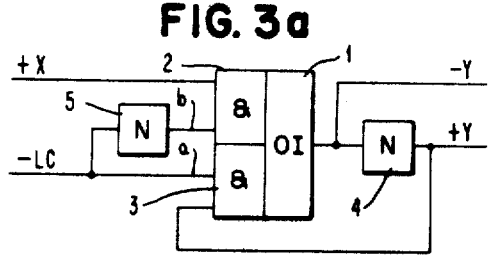
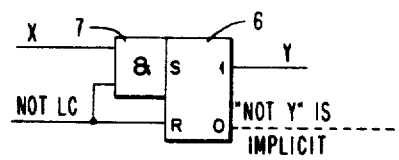
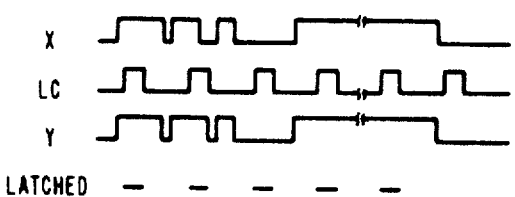
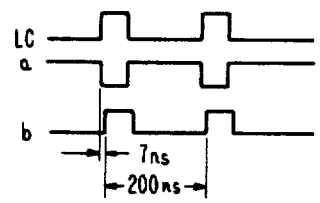
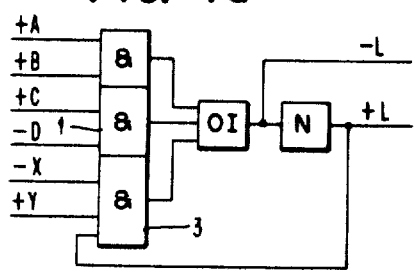
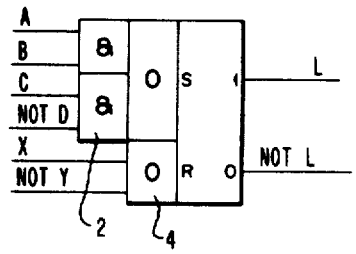
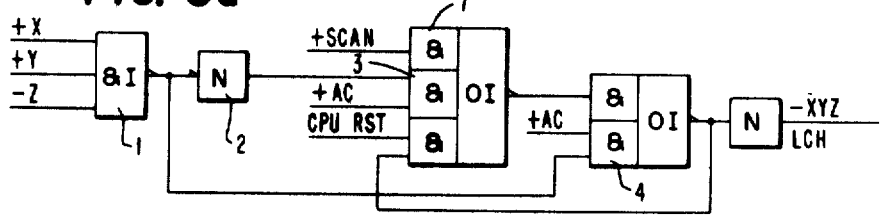
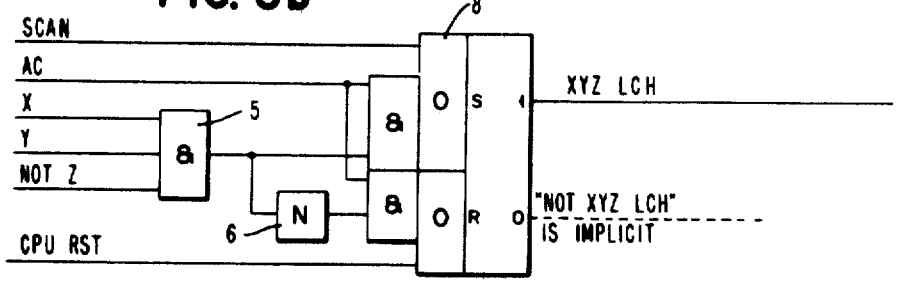

FIG.12

THRU

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13,1967

FIG.59

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13,1967

FIG.61

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1967

THRU

FIG.67

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1967

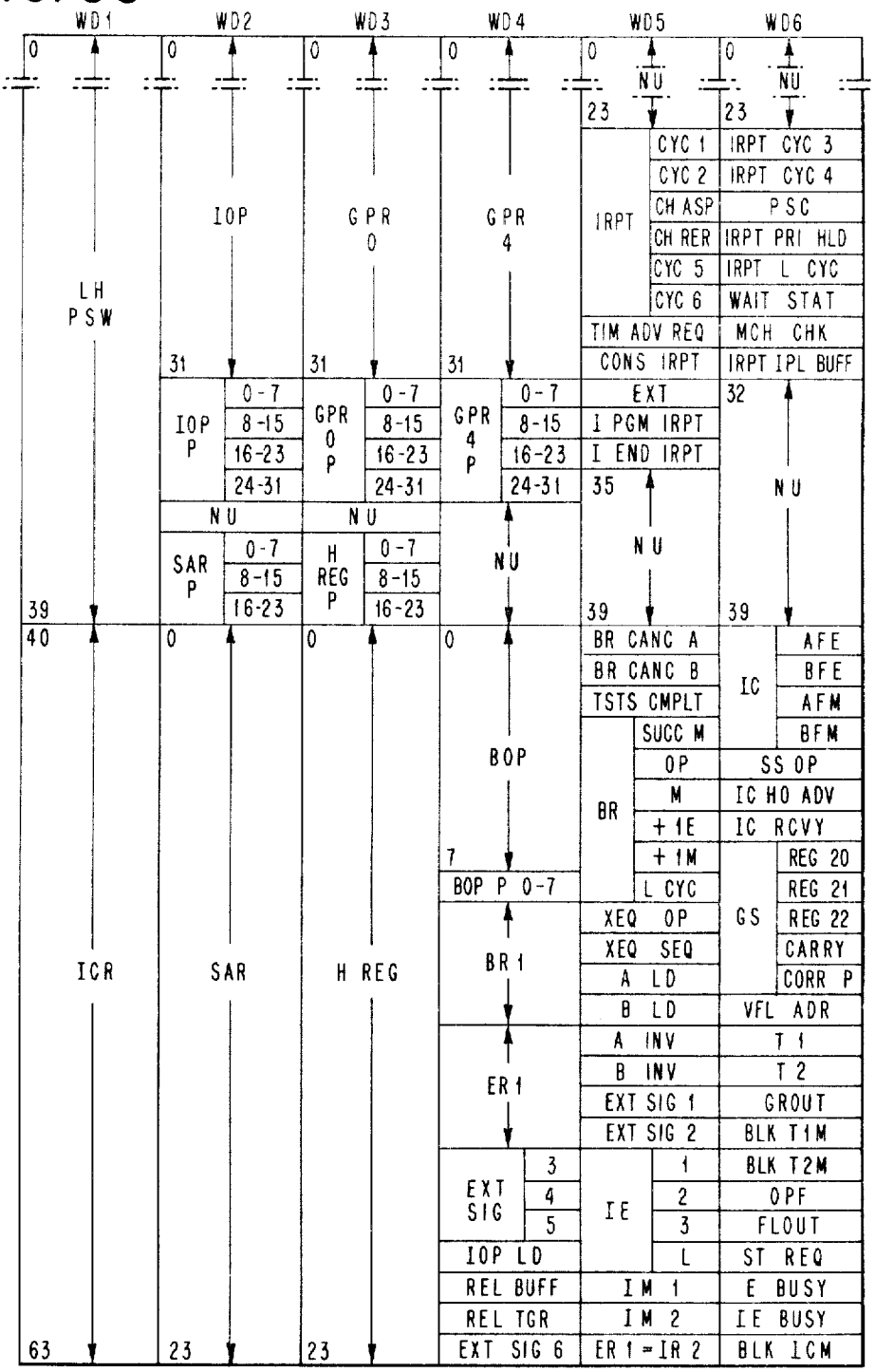

FIG. 69 E UNIT SCAN

FIG.70

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13,1967

FIG.71

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13,1967

FIG. 73  E UNIT DATA FLOW (2)

FIG.76

THRU

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13,1967

FIG.372

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13,1967

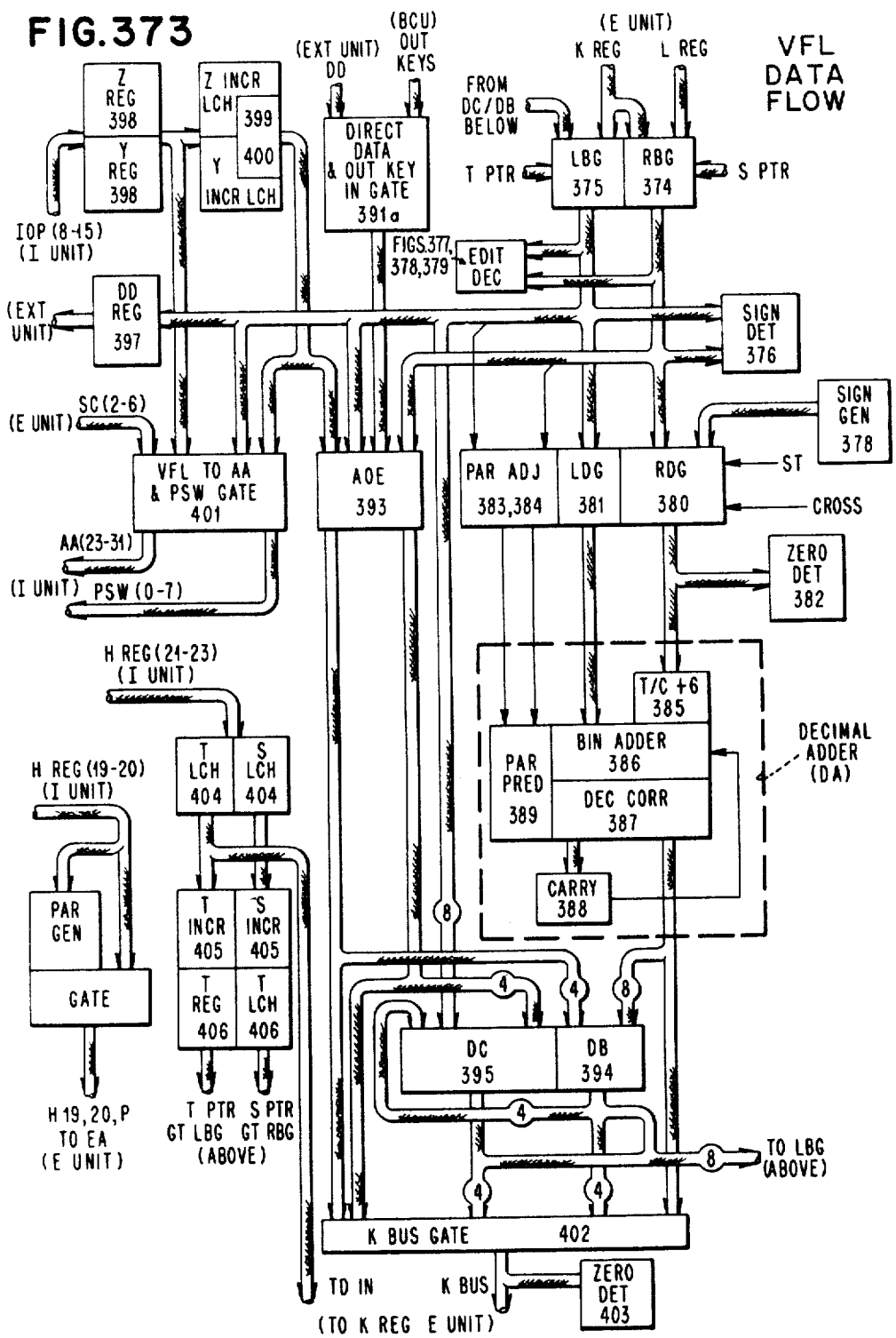

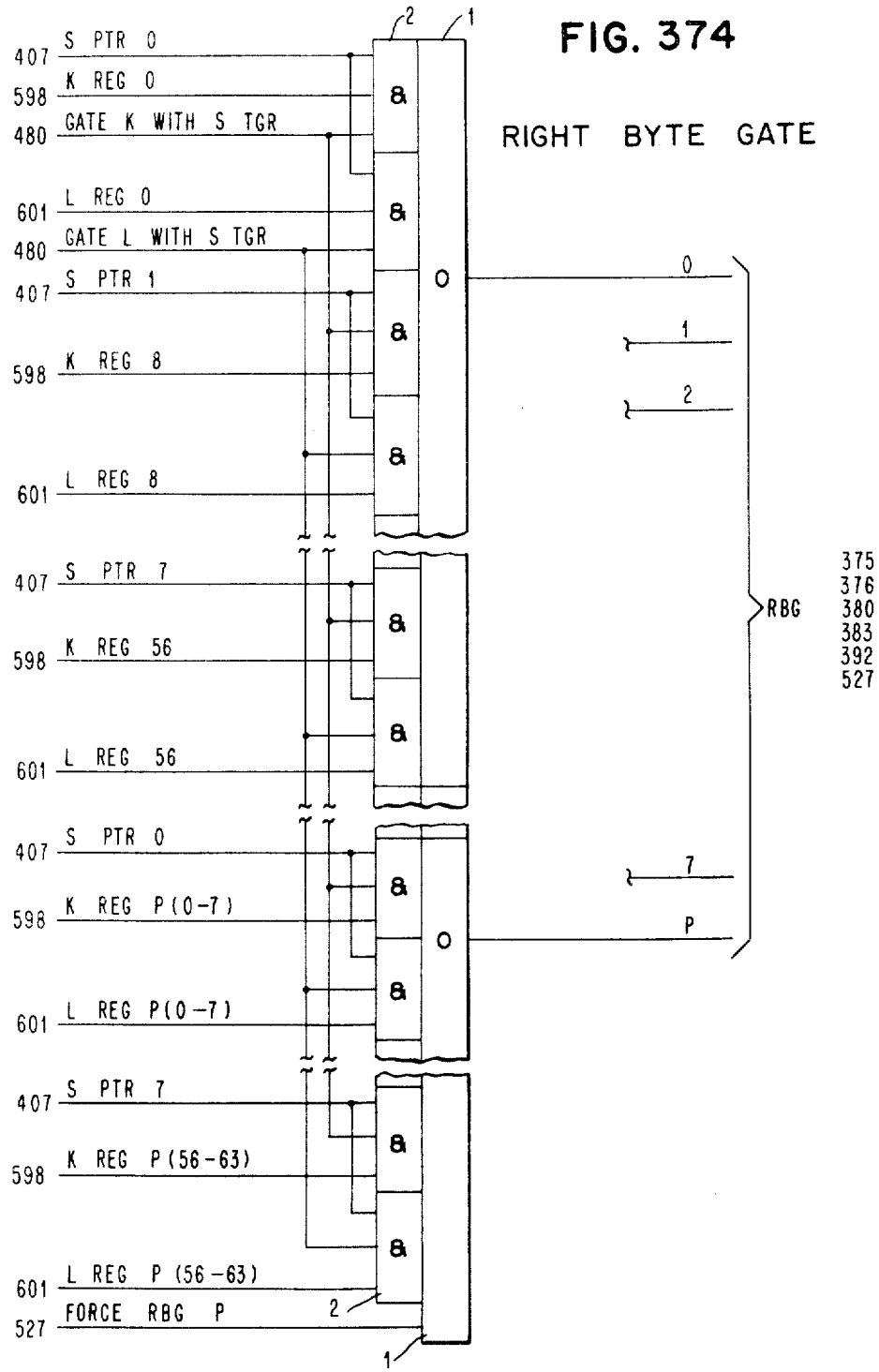

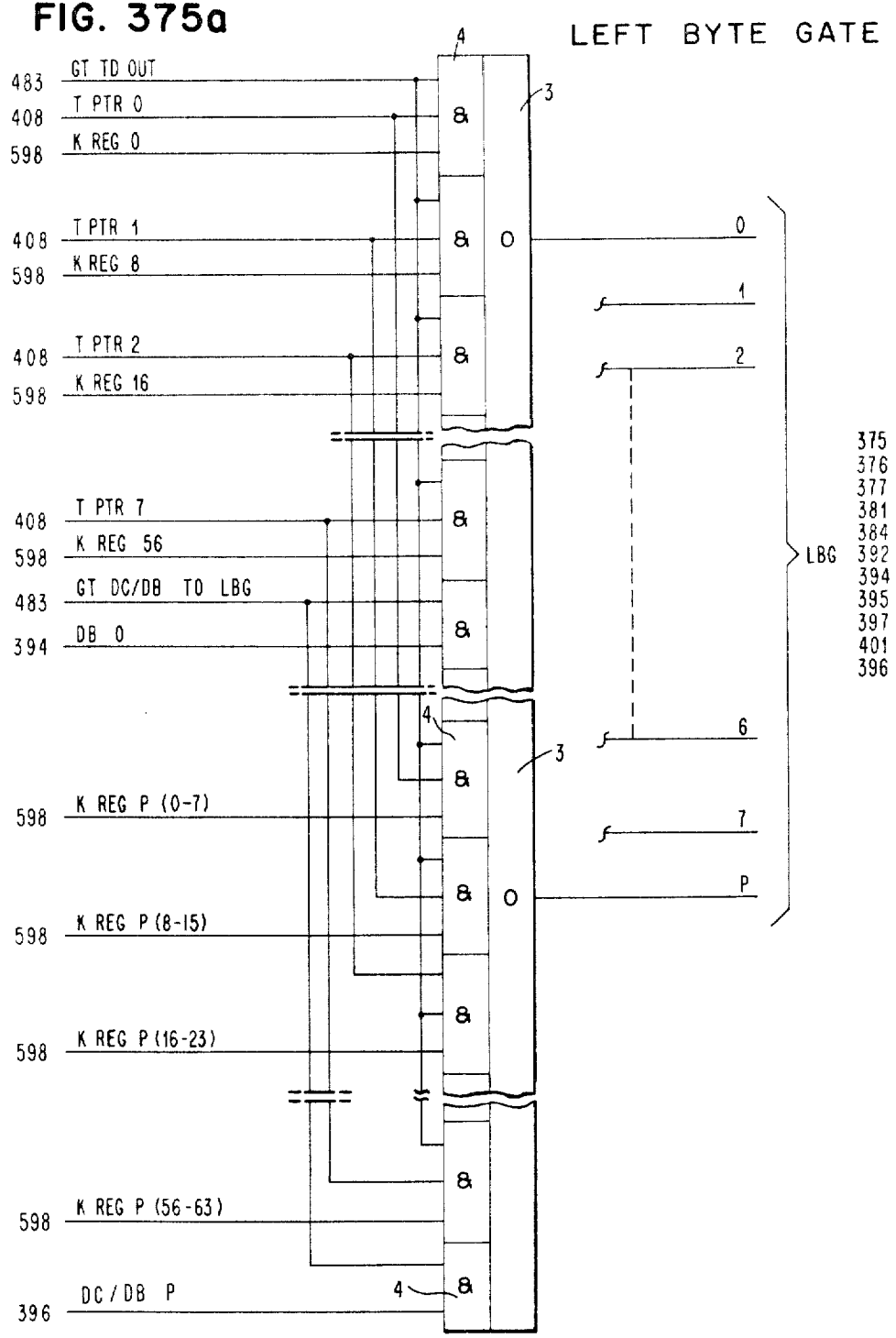

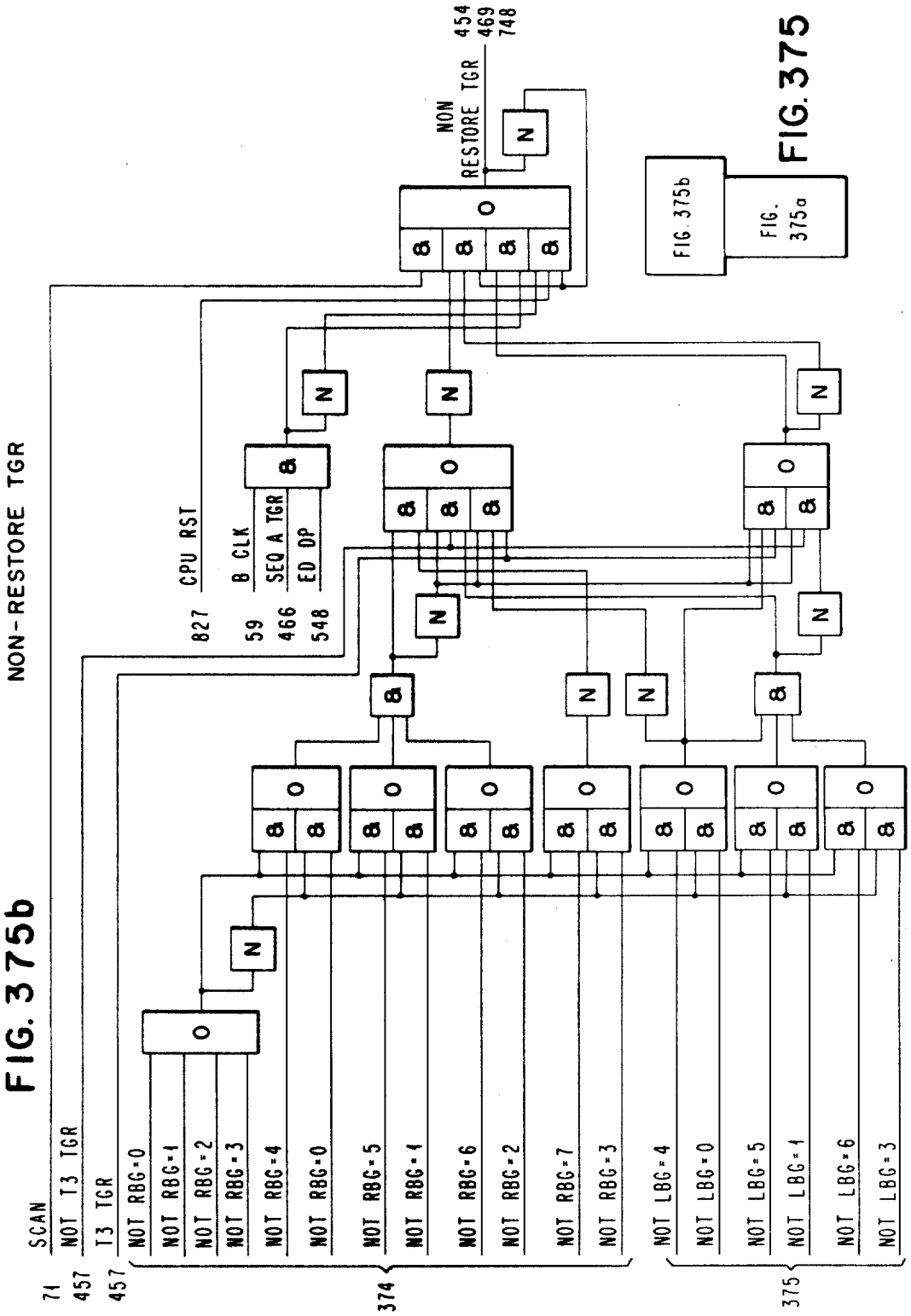

EDIT DECODE

SIGN GEN & EDIT DEC

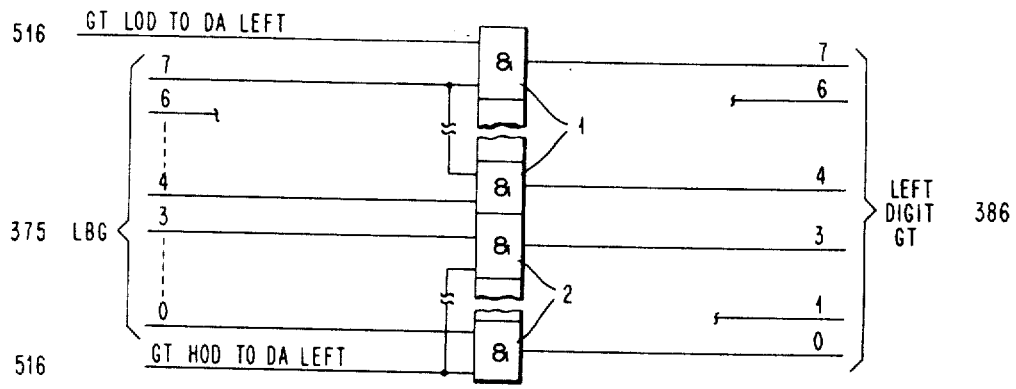
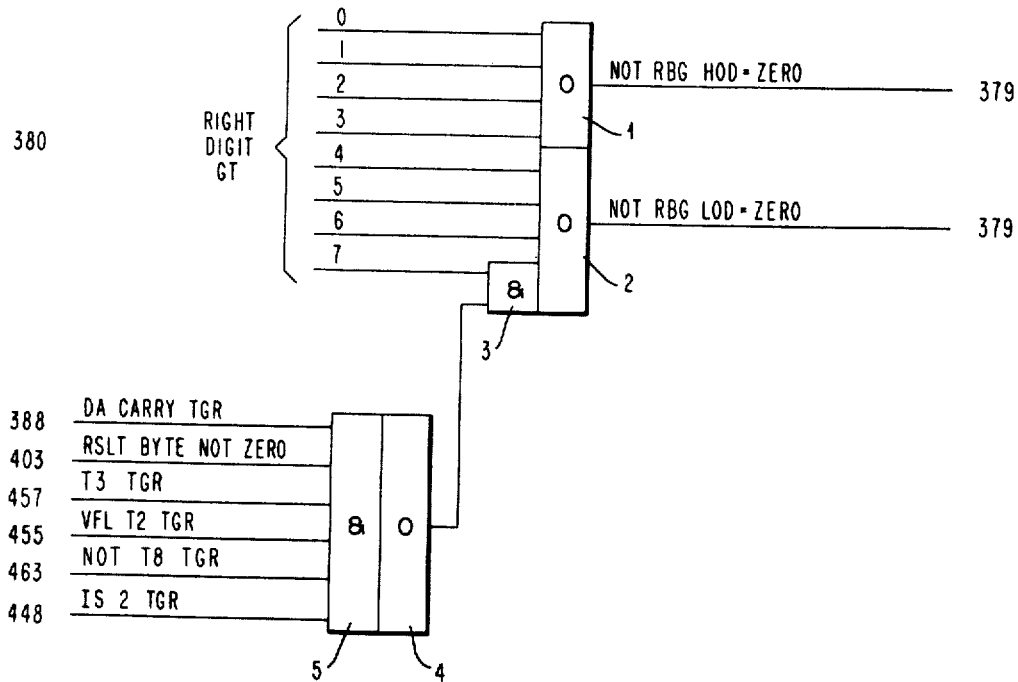

FIG. 383 RIGHT P ADJ
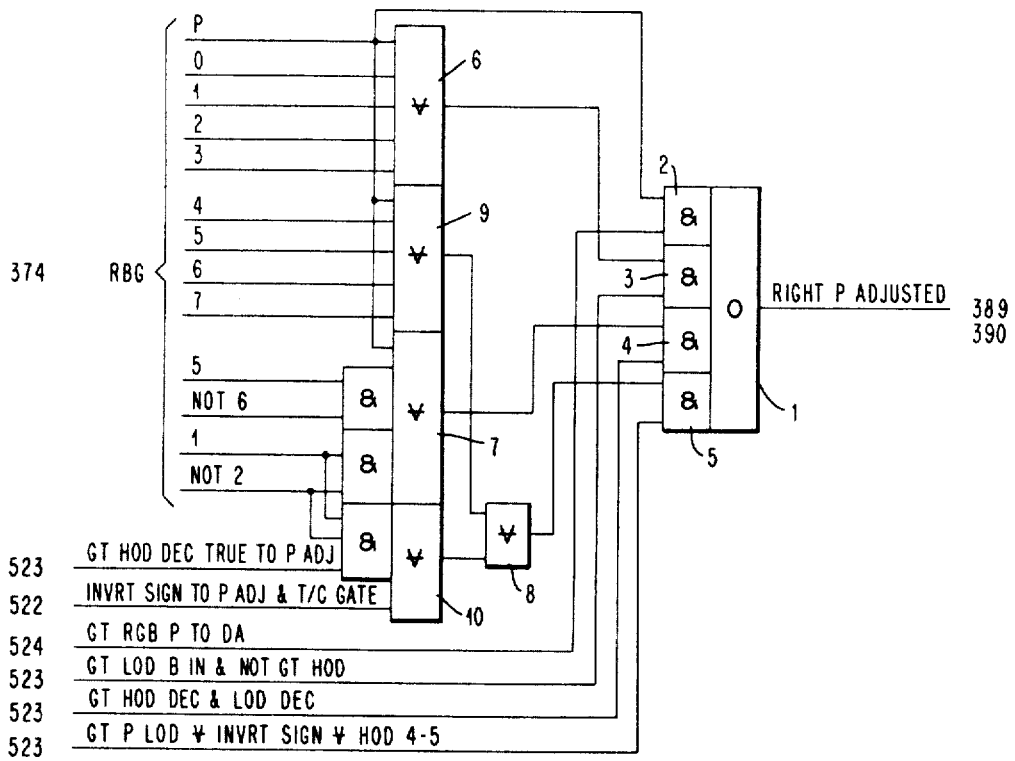
FIG. 384 LEFT P ADJ
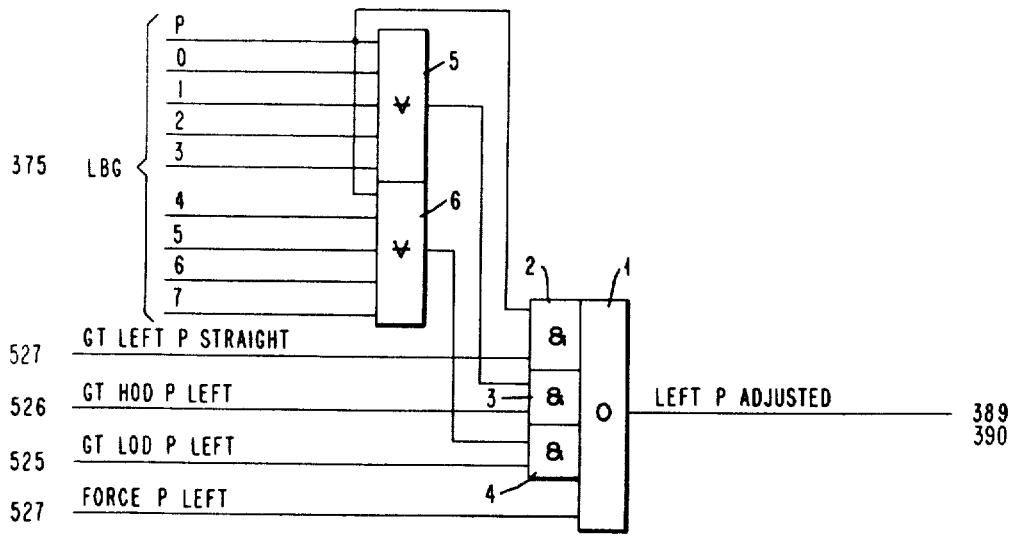

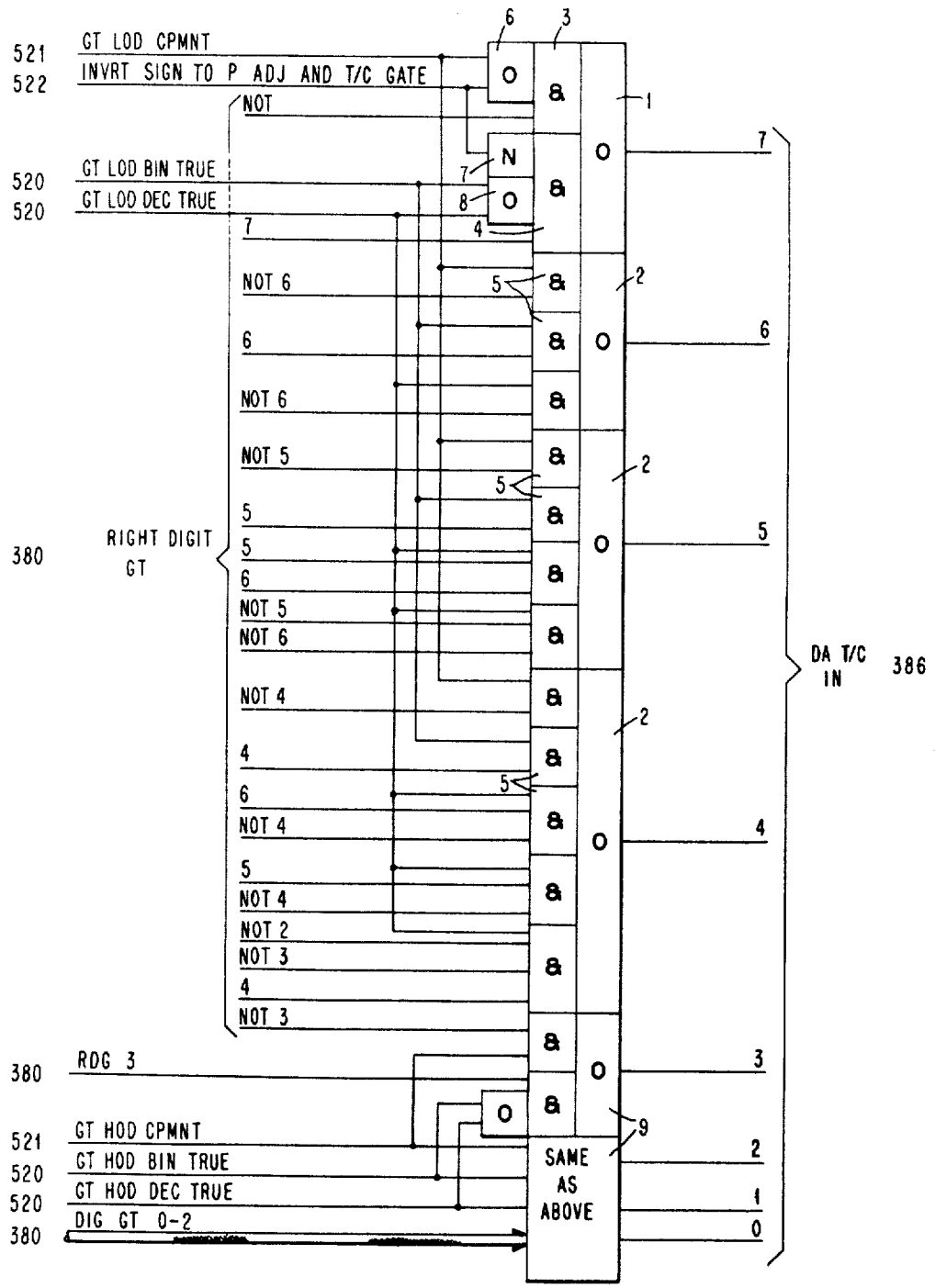
FIG. 385  TRUE/CPMNT PLUS 6

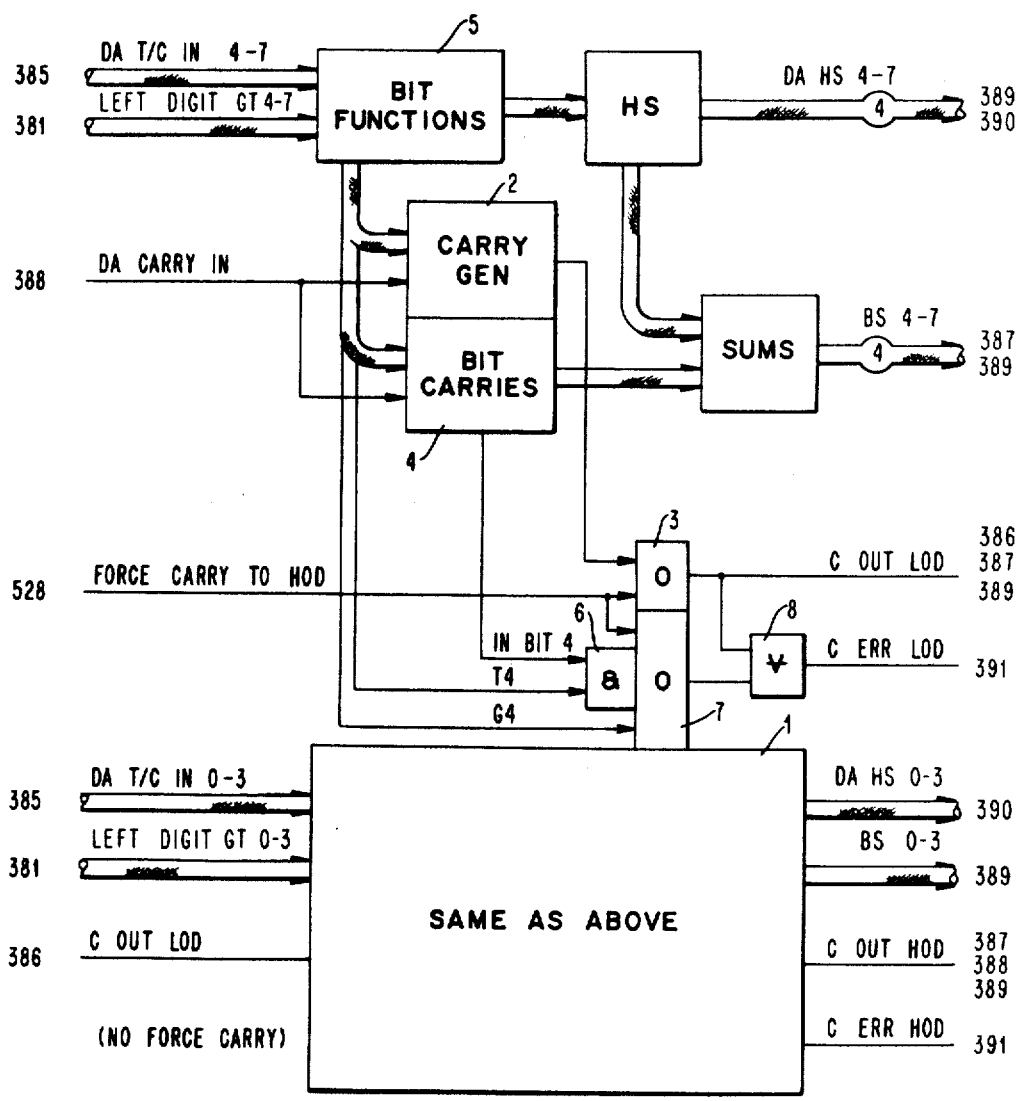
FIG. 386 — BIN ADDER

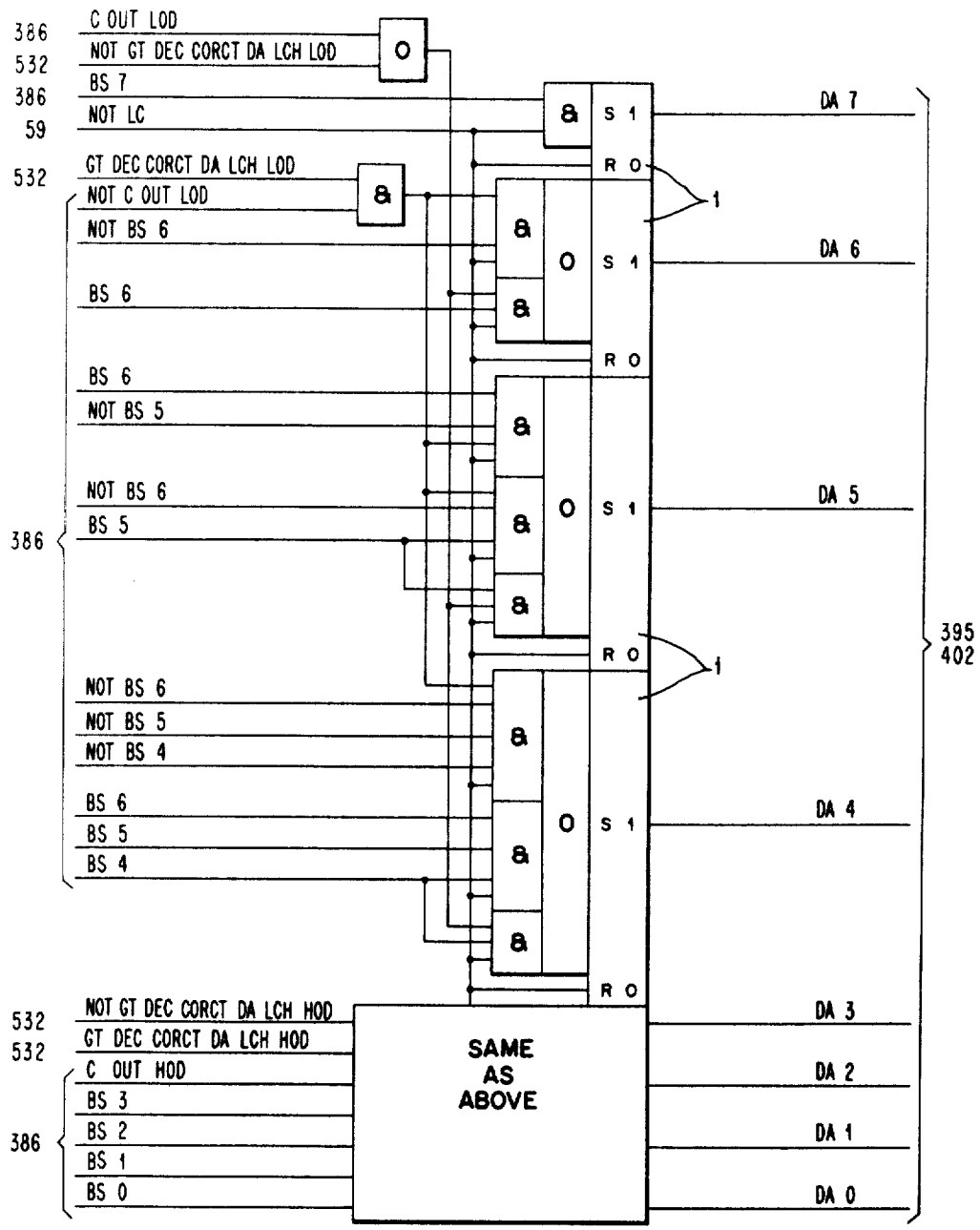
FIG.387 D/C-DEC CORRECT

FIG. 390
DA HS CHK
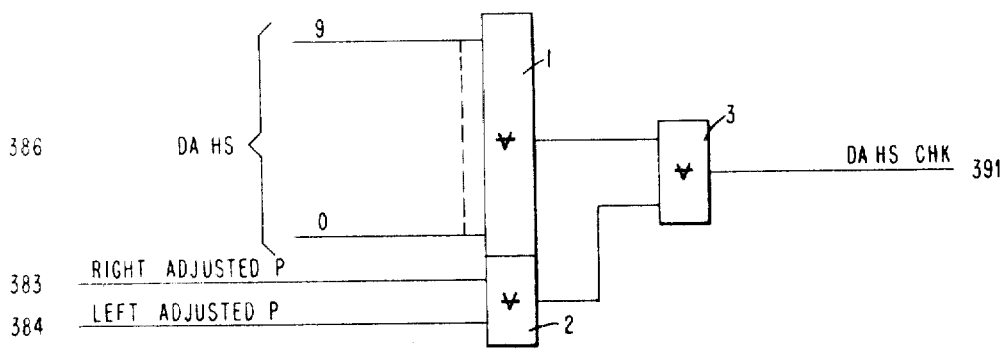
FIG. 391
DA ERROR
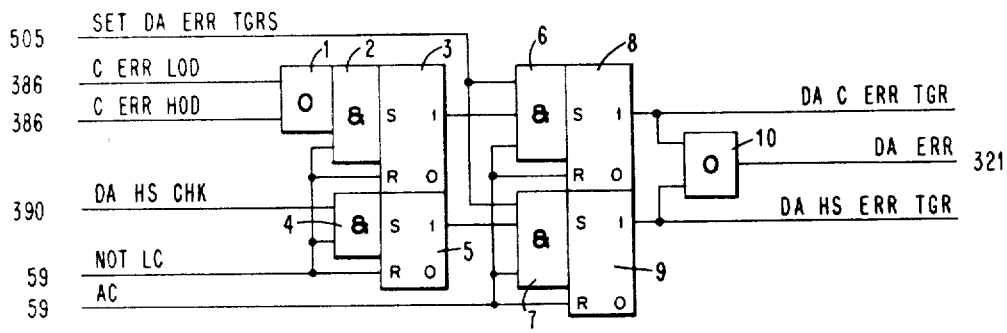
FIG. 391a   DIRECT DATA & OUT KEY IN GATE
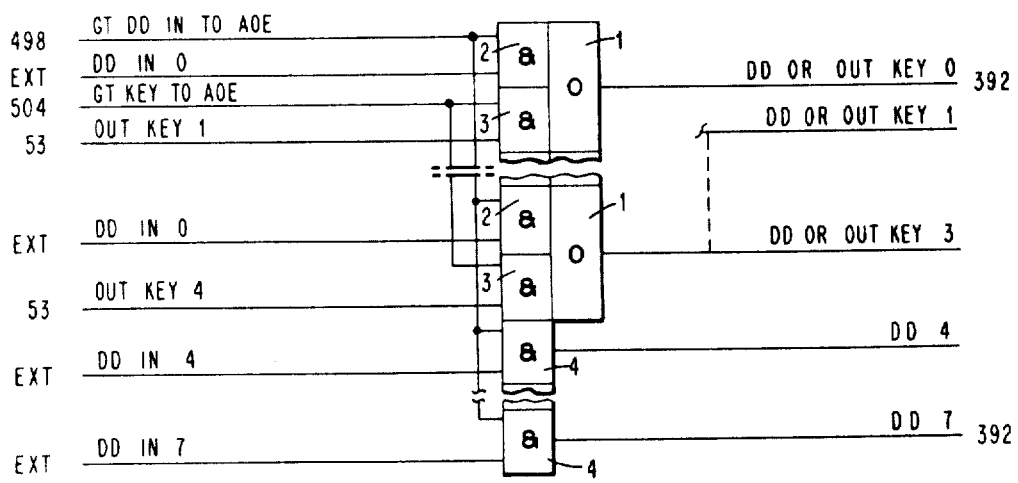

DIRECT DATA REG

FIG. 401 VFL TO AA & PSW GATE

FIG. 403  K BUS ZERO DET
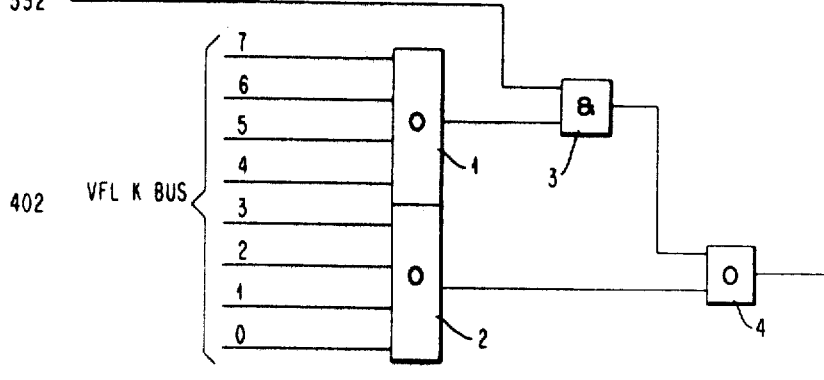
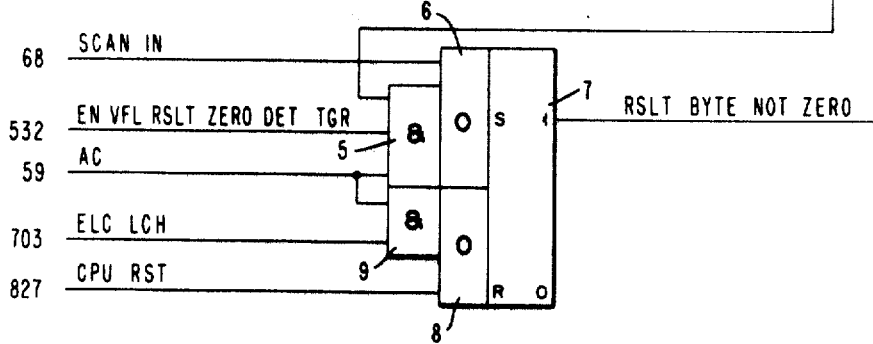
FIG. 403a  LGTH/ADR P
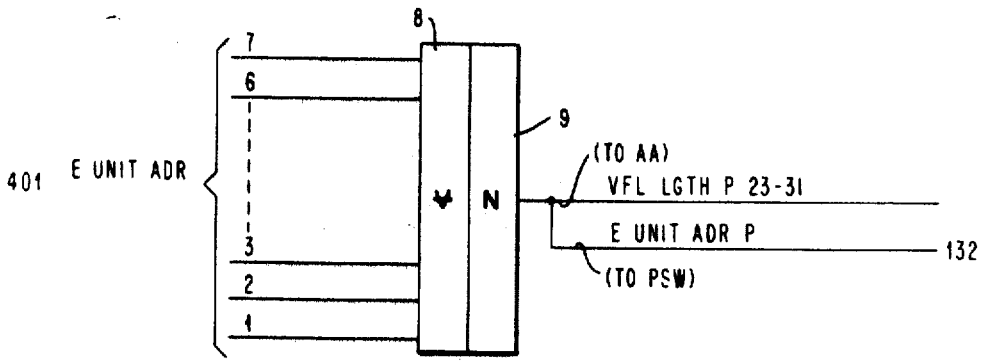

FIG. 405 S & T INCRS
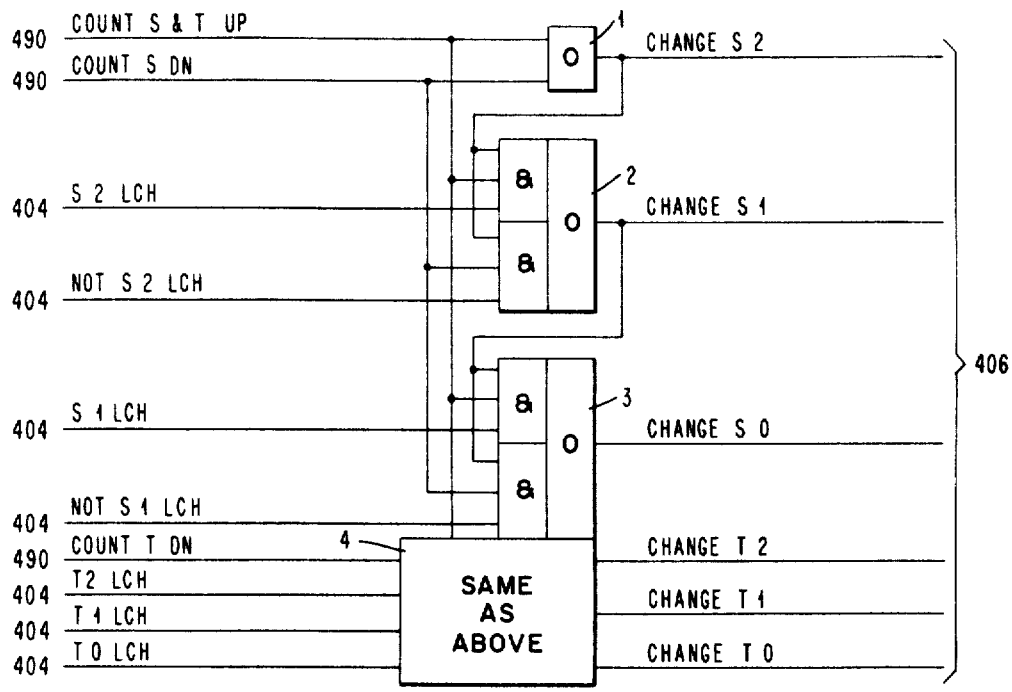
FIG. 406 S & T REGS
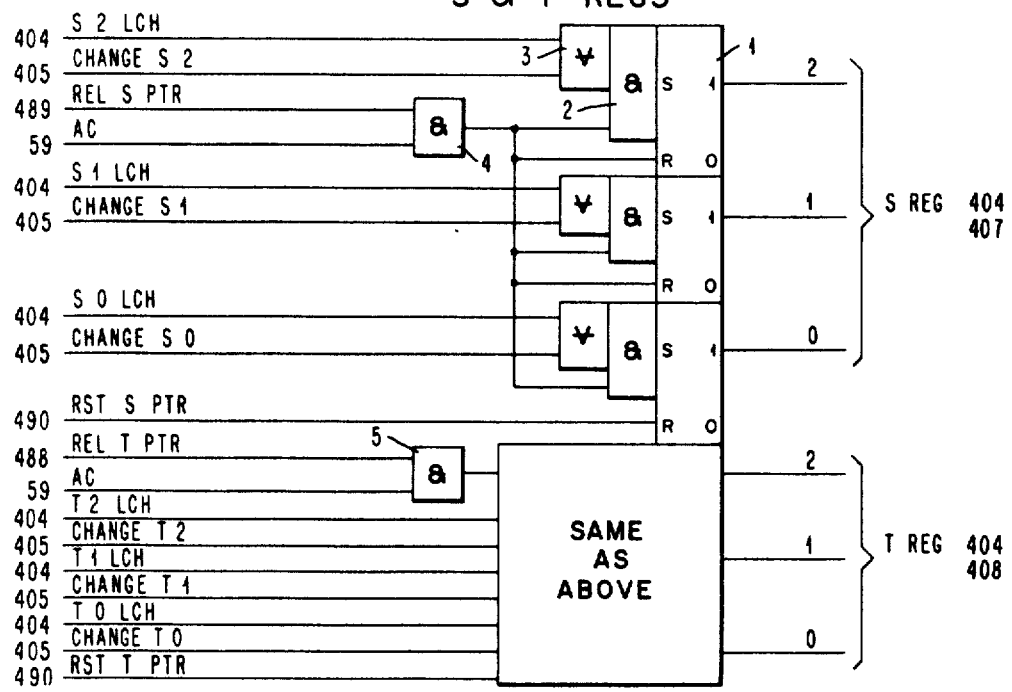

FIG.409a

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1967

THRU

FIG.534

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1967

FIG. 535    E UNIT DATA FLOW (BINARY)

FIG. 537

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1967

THRU

FIG. 876

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1967

United States Patent Office 3,384,876
Patented May 21, 1968

3,384,876
OVERLAPPED FIELD HANDLING IN A DATA PROCESSING SYSTEM
Olin L. MacSorley, Lake Katrine, and Robert A. Nelson, Poughkeepsie, N.Y., assignors to International Business Machines Corporation, Armonk, N.Y., a corporation of New York
Continuation-in-part of application Ser. No. 445,304, Apr. 5, 1965. This application Jan. 13, 1967, Ser. No. 609,240
6 Claims. (Cl. 340—172.5)

ABSTRACT OF THE DISCLOSURE

The specification discloses an illustrative embodiment for the invention comprising a large scale data processing system of the type which is composed of a plurality of quasi-independent units. The environmental data processing system includes a central processing unit or portion, which is herein referred to as a CPU, a plurality of storage units, a plurality of input/output control devices referred to herein as channels, as well as control and maintenance facilities which are found in a power distribution unit, herein referred to as a PDU. The CPU of the environmental system includes a control or instruction unit hereinafter referred to as an I unit, and an arithmetic and logic or execution unit, hereinafter referred to as an E unit. The I unit includes controls for instruction fetching, branching, interruption handling, communication with the input/output channels, and other related functions. The E unit of the environmental system can perform algebraic and logical operations, moving, shifting, and other functions. A pair of registers is provided to present source and result operands, each of said registers being capable of holding a plurality of operands. Substitution of one storage word as a source of operands in place of another storage word may be accomplished by transferring operand source control from one register to another register. The exhaustion of one storage word as a source can be separated from the exhaustion of the same storage word as a result, and the storage word may be maintained in an available status for use as either a source or a result.

Figure 1:
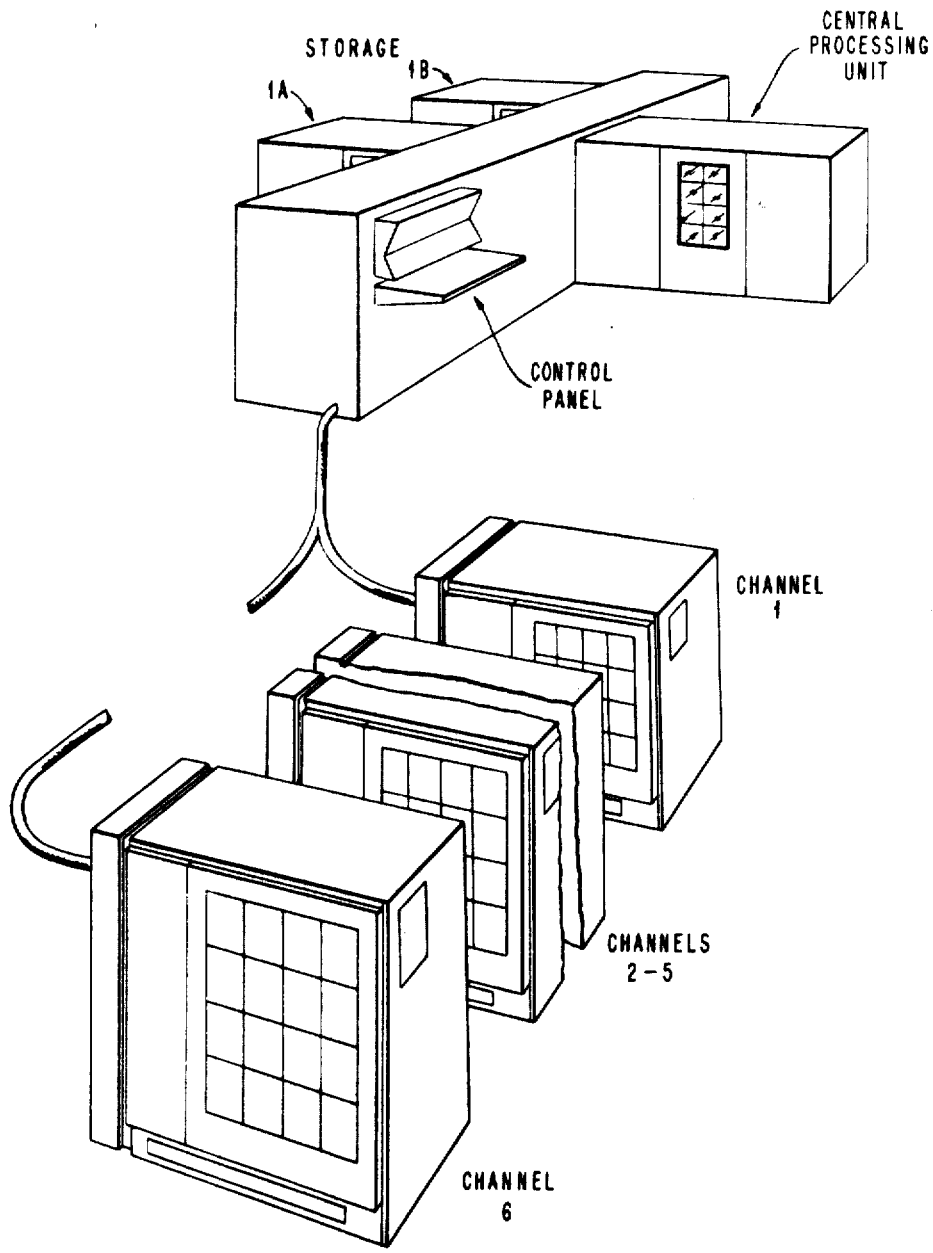

This application is a continuation-in-part of application Ser. No. 445,304, filed Apr. 5, 1965, now abandoned, entitled "Overlapped Field Handling in a Data Processing System."

| TABLE OF CONTENTS | Column |
|---|---|
| (1.0) Background of the Invention | 3 |
| (2.0) References | 5 |
| (3.0) Nomenclature | 6 |
| (4.0) Brief Description of Environmental System (FIG. 2) | 8 |
| (5.0) Component circuits (FIG. 3 through FIG. 8) | 8 |
| (6.0) Basic Bus Control Unit | 10 |
| (7.0) Clock Circuit | 11 |
| (7.4) Clock Circuit | 11 |
| (8.0) Scan | 11 |
| (8.1) Scanning into the I Unit (FIG. 68) | 12 |
| (8.2) Scanning into the E Unit (FIG. 69) | 12 |
| (9.0) Instruction Unit Data Flow | 12 |
| (9.1) General Introduction to I Unit Data Flow | 13 |
| (9.1.1) Instruction Selection (FIG. 72) | 13 |
| (9.1.2) Instruction Input Paths (FIG. 73) | 14 |
| (9.1.3) Instruction Decoding (FIG. 74) | 14 |
| (9.1.4) Instruction Utilization (FIG. 75) | 15 |
| (10.0) Instruction Sequencing | 15 |
| (10.1) Introduction | 15 |
| (11.0) Instruction Counter Controls (FIG. 72 through FIG. 75) | 16 |
| (11.1) Introduction | 17 |
| (12.0) Branching | 17 |
| (12.1) Branch Operations | 17 |
| (12.1.1) Introduction to Branch Controls | 17 |
| (13.0) I Unit Execution | 18 |
| (14.0) Interruptions | 18 |
| (14.1) Interruption Handling | 18 |
| (15.0) Variable Field Length Data Flow | 18 |
| (15.1) Brief Description of VFL Data Flow (FIG. 373) | 18 |
| (15.2) Right and Left Byte Gates (FIG. 374 through FIG. 376) | 19 |
| (15.2.1) RBG (FIG. 374) | 19 |

| TABLE OF CONTENTS—Continued | Column |
|---|---|
| (15.2.2) LBG (FIG. 375) | 19 |
| (15.2.3) Byte Gate Sign Detect (FIG. 376) | 20 |
| (15.2.4) Edit Decode (FIG. 377 through FIG. 379) | 20 |
| (15.3) Right and Left Digit Gates (FIG. 377 through FIG. 384) | 20 |
| (15.3.1) Sign Generator (FIG. 378) | 20 |
| (15.3.2) RDG (FIG. 380) | 20 |
| (15.3.3) LDG (FIG. 381) | 21 |
| (15.3.4) True Complement Zero Detect (FIG. 382) | 21 |
| (15.3.5) Parity Adjust (FIG. 383 and FIG. 384) | 21 |
| (15.4) Decimal Adder | 22 |
| (15.4.1) True/Complement and Excess 6 Gate (FIG. 385) | 22 |
| (15.4.2) Binary Adder (FIG. 386) | 22 |
| (15.4.3) True/Complement-Decimal Correction Circuit (FIG. 387) | 23 |
| (15.4.4) Decimal Carry Trigger (FIG. 388) | 24 |
| (15.5) DA Checking | 24 |
| (15.5.1) Decimal Adder Parity Predict (FIG. 389) | 24 |
| (15.5.2) DA Half Sum Check (FIG. 390) | 24 |
| (15.5.3) DA Error Circuit (FIG. 391) | 24 |
| (15.6) Direct Data and Outkey Ingate (FIG. 391) | 24 |
| (15.7) AND-OR-EXCLUSIVE OR Circuit (FIG. 392–FIG. 393) | 25 |
| (15.8) Digit Buffer Digit Counter | 25 |
| (15.8.1) Digit Buffer (DB) (FIG. 394) | 25 |
| (15.8.2) Digit Counter (DC) (FIG. 395) | 26 |
| (15.8.3) Digit Counter/Digit Buffer Parity (FIG. 396) | 26 |
| (15.9) Direct Data Register (FIG. 397) | 26 |
| (15.10) Y and Z Registers and Latches | 26 |
| (15.10.1) YZ Registers (FIG. 398) | 27 |
| (15.10.2) Y/Z Incrementing Circuits (FIG. 399) | 28 |
| (15.10.3) Y and Z Latches (FIG. 400) | 28 |
| (15.11) VFL to Address Adder and PSW Gate (FIG. 401) | 29 |
| (15.12) VFL to K Register Bus | 29 |
| (15.12.1) K Bus Gate (FIG. 402) | 29 |
| (15.12.2) K Bus Zero Detect (FIG. 403) | 29 |
| (15.13) S and T Pointers | 29 |
| (15.13.1) S and T Latches (FIG. 404) | 29 |
| (15.13.2) S and T Incrementers (FIG. 405) | 30 |
| (15.13.3) S and T Registers (FIG. 406) | 30 |
| (15.13.4) S and T Pointer Decode Circuits (FIG. 407– G. 409) | 30 |
| (16.0) Variable Field Length Controls | 30 |
| (16.1) Introduction to VFL Controls | 30 |
| (16.1.1) Execution Sequences and Interrupts | 30 |
| (16.1.1.1) Set-Up | 31 |
| (16.1.1.2) Iterations | 31 |
| (16.1.1.3) Store/Fetch | 31 |
| (16.1.1.4) Prefetch | 31 |
| (16.1.1.5) Address Put-Away | 32 |
| (16.1.1.6) VFL Interruptions | 32 |
| (16.1.2) Miscellaneous Control Triggers and Sequences | 32 |
| (16.1.2.0) VFL T1-8 Triggers | 32 |
| (16.1.2.1) VFL Store Request and Fetch Request Triggers | 32 |
| (16.1.2.2) Store/Fetch Trigger | 33 |
| (16.1.2.3) Y and Z Counting | 33 |
| (16.1.2.4) End Sequence and ELC | 33 |
| (16.1.2.5) VFL Zero Detects | 33 |
| (16.1.3) Sequence Hardware | 34 |
| (16.2) VFL Set-Up Sequences | 34 |
| (16.2.1) Introduction to Set-Up Groups | 34 |
| (16.2.2) Group I (MVO, PACK, UNPK, ZAP, CP, AP, SP) | 34 |
| (16.2.2.1) General Objectives | 34 |
| (16.2.2.2) SU1 | 35 |
| (16.2.2.3) SU2 | 35 |
| (16.2.2.4) SU3 | 35 |
| (16.2.2.5) SU4 | 35 |
| (16.2.2.6) SU5 | 35 |
| (16.2.2.7) SU6 | 35 |
| (16.2.2.8) SU7 | 36 |
| (16.2.2.9) SU8 | 36 |
| (16.2.2.10) SU9 | 36 |
| (16.2.3) Group II (MUN, MVC, MVZ, NC CLC, OC, XC, EDT EDMK) | 36 |
| (16.2.3.1) General Objectives | 36 |
| (16.2.3.2) Set-Up Functions | 37 |
| (16.2.4) Group III (MP, DP) | 38 |
| (16.2.5) Group IV (TR, TRT) | 38 |
| (16.2.5.1) General | 38 |
| (16.2.5.2) Set-Up Functions | 38 |
| (16.2.6) Interrupts | 39 |
| (16.3) Iterations (and Direct Control) | 39 |
| (16.3.1) Decimal Iterations | 39 |
| (16.3.1.1) Move With Offset (MVO) | 39 |
| (16.3.1.2) Pack (Pack) | 39 |
| (16.3.1.3) Unpack (UNPK) | 40 |
| (16.3.1.4) Zero and Add (ZAP) | 40 |
| (16.3.1.5) Decimal Compare (CP) | 40 |
| (16.3.1.6) Decimal Add and Decimal Subtract (AP and SP) | 40 |
| (16.3.2) Logical Move, Connective and Compare Iterations | 41 |
| (16.3.2.1) Move (MVC) | 41 |
| (16.3.2.2) Move Numerics and Move Zones (MVN and MVZ) | 42 |
| (16.3.2.3) AND, OR and EXCLUSIVE OR (NC, OC and XC) | 42 |
| (16.3.2.4) Logical Compare (CLC) | 43 |
| (16.3.3) Translate and Translate-and-Test (TR and TRT) | 43 |
| (16.3.4) Edit and Edit-and-Mark (EDT and EDMK) | 44 |
| (16.3.5) Direct Control | 46 |
| (16.3.5.1) Write Direct (WRD) | 46 |
| (16.4) Store/Fetch (SF) | 46 |
| (16.4.1) Introduction | 46 |
| (16.4.2) Store/Fetch for AP, SP | 46 |
| (16.4.2.1) Crossing a Word Boundary or Last Store | 47 |
| (16.4.2.2) Change Sign | 48 |
| (16.4.2.3) Start Recomplement Pass | 48 |
| (16.4.3) Store/Fetch for ZAP, CP, MVO | 49 |
| (16.4.3.1) ZAP | 49 |
| (16.4.3.2) CP | 49 |

TABLE OF CONTENTS—Continued

| | Column |
|---|---|
| (16.4.3.3) MVO | 50 |
| (16.2.2) Store/Fetch for PACK, UNPK | 50 |
| 16.4.4.1 Non-Overlapping Fields | 50 |
| 16.4.4.2 Overlapping Fields | 50 |
| (16.4.5) Store/Fetch for MVN, MVC, MVZ, NC, CLC, OC, XC | 50 |
| (16.4.6) Store/Fetch for ED, EDMK, TR, TRT | 51 |
| (16.5) Prefetch Sequence (PF) | 51 |
| (16.5.1) Introduction | 51 |
| (16.5.2) First Prefetch | 52 |
| (16.5.3) Interaction With Store/Fetch | 52 |
| (16.5.4) Decimal Instructions | 52 |
| (16.5.4.1) General | 52 |
| (16.5.4.2) Overlapping Fields | 53 |
| (16.5.5) Logical Instructions | 53 |
| (17.0) Variable Field Length Operations | 54 |
| (17.1) Fixed Sequence VFL Operations | 54 |
| (17.1.1) Introduction | 54 |
| (17.1.2) Common Operations | 54 |
| (17.1.3) MVI—Move, SI | 54 |
| (17.1.4) CLI—Compare Logical, SI | 55 |
| (17.1.5) NI, OI, XI—AND, OR, EXCLUSIVE OR, SI | 55 |
| (17.1.6) TM—Test Under Mask, SI | 55 |
| (17.1.7) LA—Load Address, RX | 56 |
| (17.1.8) STC—Store Character, RX | 56 |
| (17.1.9) IC—Insert Character, RX | 56 |
| (17.1.10) SSM—Set System Mask, SI | 56 |
| (17.1.11) ISK—Insert Key, RR | 56 |
| (17.2) Decimal Multiply and Divide Set-Up | 56 |
| (17.2.1) Multiply Set-Up Functions | 56 |
| (17.2.2) Divide Set-Up Functions | 57 |
| (17.2.3) Set-Up Sequencer Functions | 57 |
| (17.2.4) Prefetch Sequencer Functions | 58 |
| (17.3) Multiply Iterations | 59 |
| (17.3.1) Method of Multiplication | 59 |
| (17.3.2) Register Functions for Decimal Multiply | 60 |
| (17.3.2.1) J Register | 60 |
| (17.3.2.2) K Register and M Register | 60 |
| (17.3.2.3) L Register | 60 |
| (17.3.3) VFL Counter and Pointer Functions for Multiply | 60 |
| (17.3.3.1) Y Counter | 60 |
| (17.3.3.2) Z Counter | 60 |
| (17.3.3.3) S Pointer | 60 |
| (17.3.3.4) T Pointer | 61 |
| (17.3.3.5) Digit Counter | 61 |
| (17.3.4) Odd and Even Cycle Definition | 61 |
| (17.3.5) VFL Sequencer Functions for Multiply | 61 |
| (17.3.6) VFL Control Trigger Functions | 62 |
| (17.4) Divide Iterations | 63 |
| (17.4.1) Method of Division | 63 |
| (17.4.2) Register Functions for Decimal Divide | 64 |
| (17.4.2.1) J Register | 64 |
| (17.4.2.2) K Register and M Register | 64 |
| (17.4.2.3) L Register | 64 |
| (17.4.3) VFL Counter and Pointer Functions for Divide | 64 |
| (17.4.5) VFL Sequencer Functions for Divide | 65 |
| (17.4.5.1) Iteration Sequencers | 65 |
| (17.4.5.4) Other Sequencers | 65 |
| (17.4.6) VFL Control Trigger Functions | 66 |
| (17.4.7) Divide Store/Fetch | 67 |

(1.0) BACKGROUND OF THE INVENTION

This invention relates to data processing, and more particularly, to improved handling of overlapped data words.

In the data processing art, the handling of operands in arithmetic and logical units, or in other portions of a central processing unit, is interrelated with the storing and fetching of operands from a storage unit. In certain cases, less than a complete storage word may be handled at one time, handling of data being iterative, so that successive operations are required in order to facilitate functions involving a complete storage word. In some cases, a source operand may be in one storage word which is either adjacent or within a single storage-word-distance of a second storage word, a second operand and possibly a result being contained within said second storage word. This gives rise to problems of attempting to store a result in storage, in such a way as to have the storage word available for fetching as a subsequent source storage word. It has been proposed in the prior art to save a storage word rather than returning it to storage when it may be required for further use such as for use as a source of operands.

The primary object of the present invention is to provide improved apparatus for handling related storage words in a data processing system.

Another object of the present invention is to provide means for handling overlapped and marginally displaced storage words in a data processing system.

Other objects of the invention include:

Provision of handling of overlapped storage words in a central processing unit with a minimum of hardware;

Provision of improved overlapped word handling apparatus utilizing a minimum of buffer registers;

Provision of improved overlapped data handling apparatus which operates with a minimum of control circuitry;

Provision of a simplified overlapped data field handling apparatus which is also capable of handling fields which, though not overlapped, are within one storage word of one another;

Provision of a flexible related-field storage word handling apparatus for data processing systems; and Provision of an improved selection and connection means for handling related storage words in a data processing system.

In accordance with the present invention, a pair of registers are provided to present source and result operands, each of said registers capable of holding a plurality of operands; the relationship between the location within the register of a first operand relating to a source, and the location of a second operand relating to a result or to a second source, being a flexible factor to which the invention relates, among other things. The present invention provides means for substituting one storage word as a source of operands in place of another storage word, without moving the storage words, the substitution being accomplished by transferring operand source control from one register to another register, other aspects of the control remaining the same. Additionally, provision is made to transfer, from one of a pair of registers to a third register, secondary source or result words which are no longer to be utilized as secondary sources or results, so as to maintain availability of the storage word for use as a primary source. Provision is also made to transfer from a result register to a source register so as to permit adjacent or nearly adjacent storage words to be utilized in related operations wherein the exhaustion of one storage word as a source can be separated from the exhaustion of the same storage word as a result, and the storage word may be maintained in an available status for use as either a source or a result.

This permits a simplified method of having all sources readily available, which permits prefetching of a source, or temporary buffering of a source when it has been exhausted as an operand, prior to its use as a different source; the invention is implemented with a minimum of hardware, thereby reducing the length of data flow paths and the amount of complexity required in the control mechanism thereof.

Other objects, features and advantages of the present invention will become more apparent in the light of the following detailed description of a preferred embodiment thereof, as illustrated in the accompanying drawings.

The drawings are illustrative block diagrams, schematic block diagrams, timing diagrams, charts and illustrations of an embodiment of the present improvement, as set forth in a Large Scale Data Processing System which is referred to as "said environmental system," as set forth in the following list:

TABLE OF FIGURES

Figure 9:
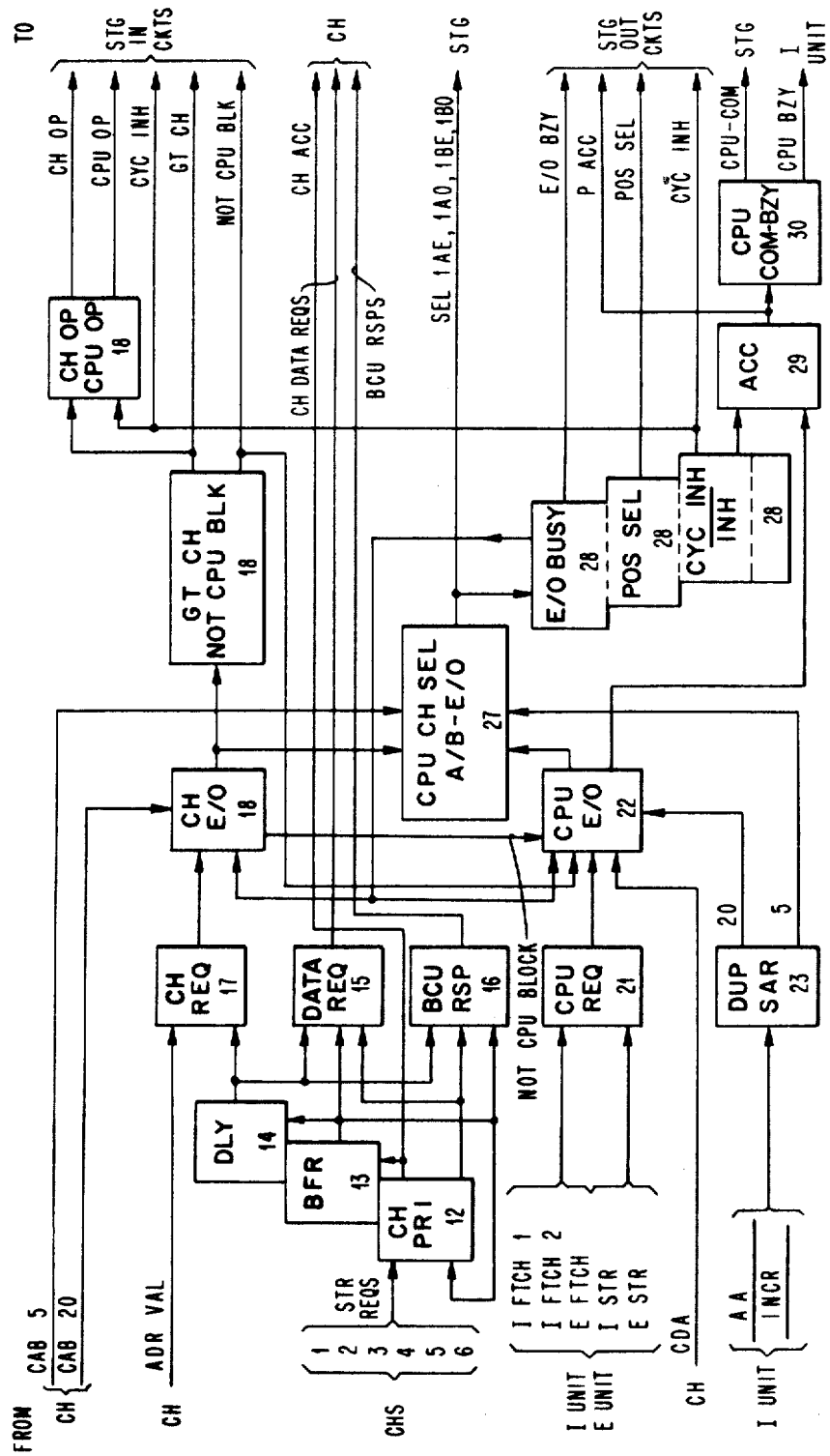
Figure 10:
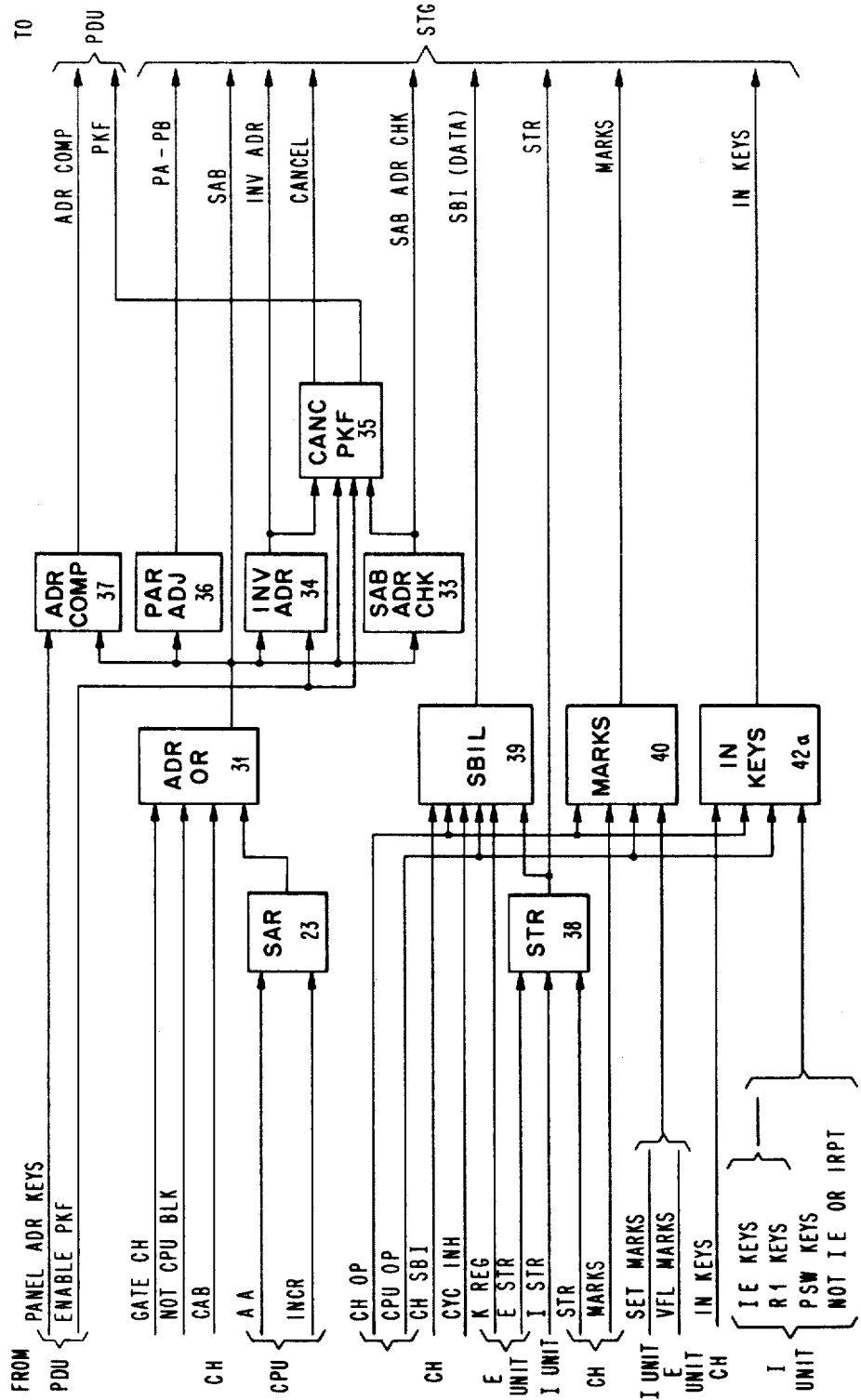
Figure 11:
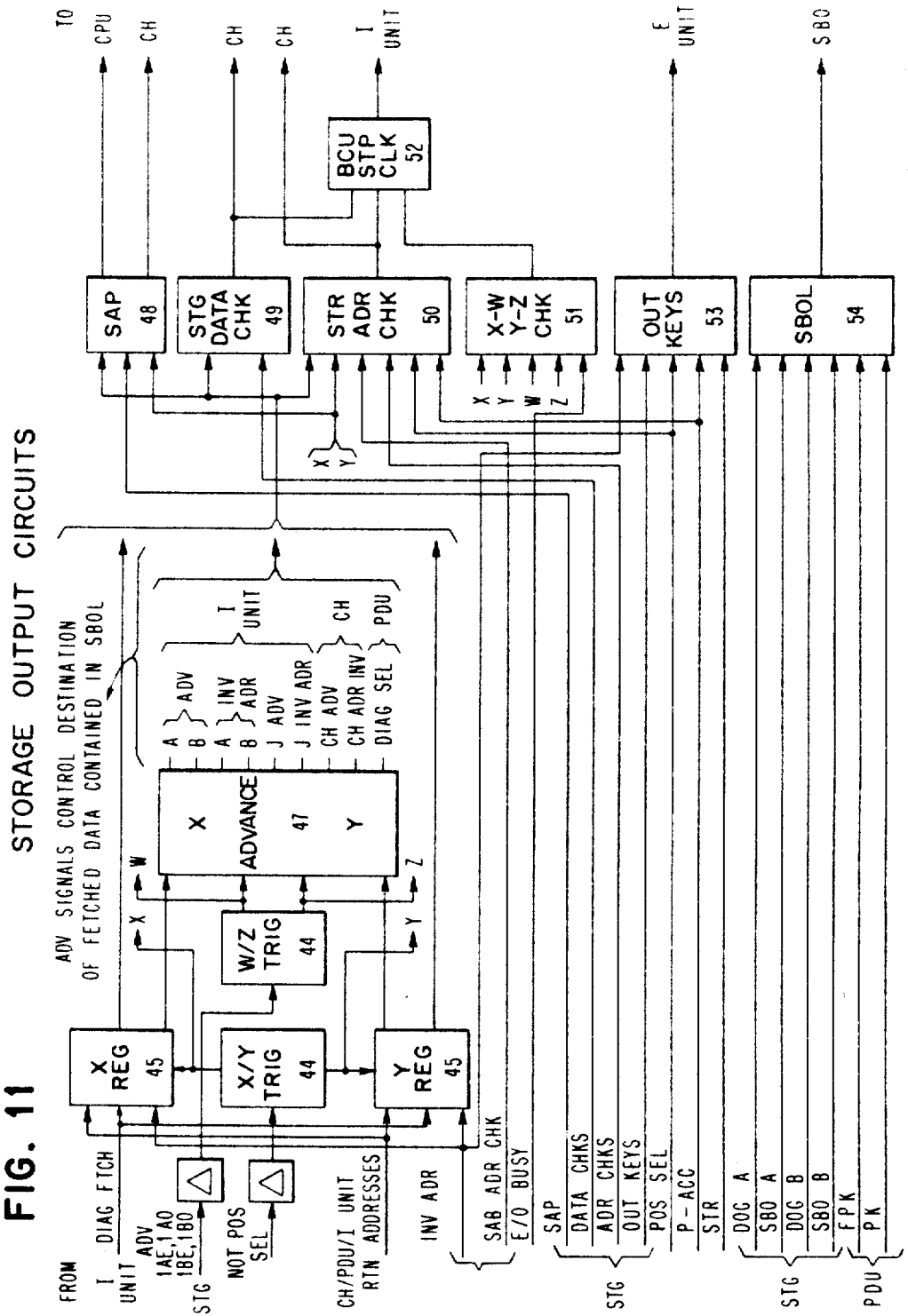

| | Sheet |
|---|---|
| (FIG. 1) System Illustration | 1 |
| (FIG. 2) Environmental System | 2 |
| (FIGS. 3a–5b) Component Circuits | 3 |
| (FIGS. 6a–8b) Component Circuits | 4 |
| (FIG. 9) Selection Circuits | 5 |
| (FIG. 10) Storage Input Circuits | 6 |
| (FIG. 11) Storage Output Circuits | 7 |
| FIGS. 12–59 are illustrative of said environmental system | 8–38 |
| (FIG. 60) Check Stop Timing | 39 |
| FIGS. 61–67 are illustrative of said environmental system | 40–43 |
| (FIG. 68) I Unit Scan | 44 |
| (FIG. 69) E Unit Scan | 45 |
| FIGS. 70–71 are illustrative of said environmental system | 46–47 |
| (FIG. 72) E Unit Data Flow (1) | 48 |
| (FIG. 73) E Unit Data Flow (2) | 49 |
| (FIG. 74) I Unit | 50 |
| (FIG. 75) GR+ADR | 51 |
| FIGS. 76–372 are illustrative of said environmental system | 52–258 |
| (FIG. 373) VFL Data Flow | 259 |
| (FIG. 374) Right Byte Gate | 260 |
| FIG. 375 is a block diagram consisting of FIG. 375a, Left Byte Gate, and FIG. 375b, non-restore TRG | 261–262 |
| (FIG. 376) RG Sign Detect | 263 |
| (FIG. 377) Edit Decode | 264 |
| (FIG. 378) Sign GEN and Edit DEC | 264 |
| (FIG. 379) Edit Source Decode LCHS | 265 |

TABLE OF FIGURES—Continued

Figure 408:
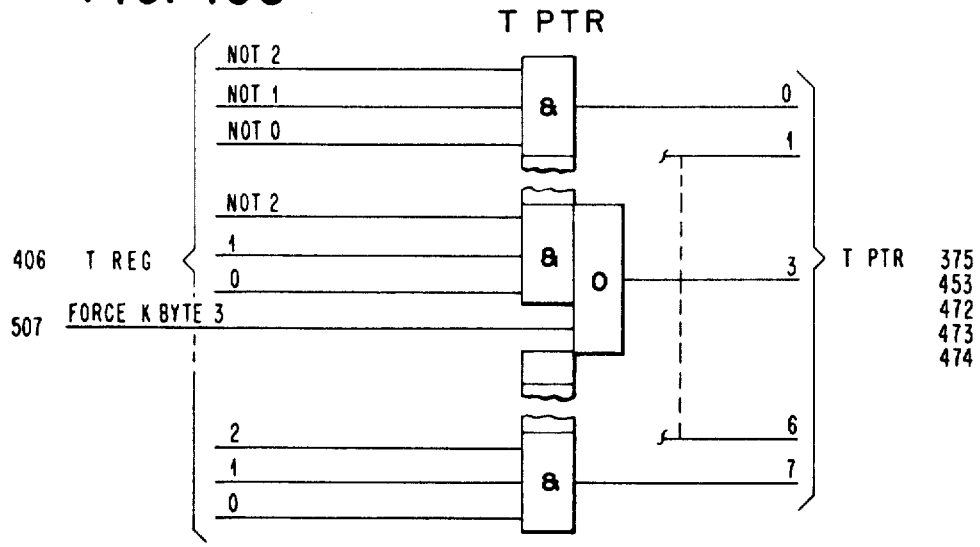
Figure 409:
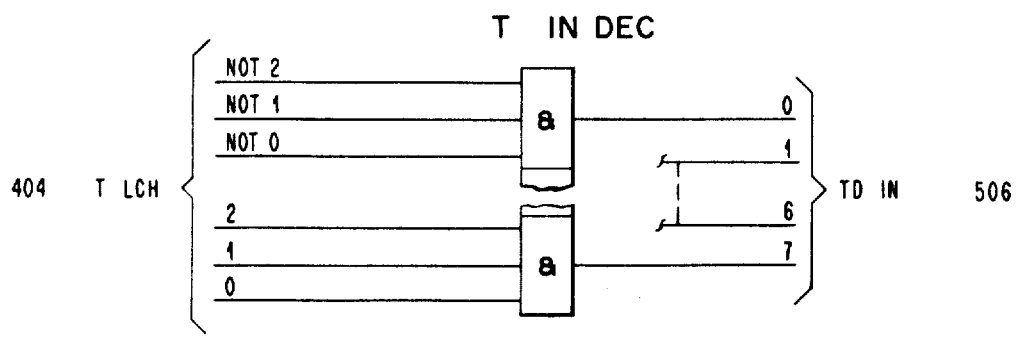
Figure 535:
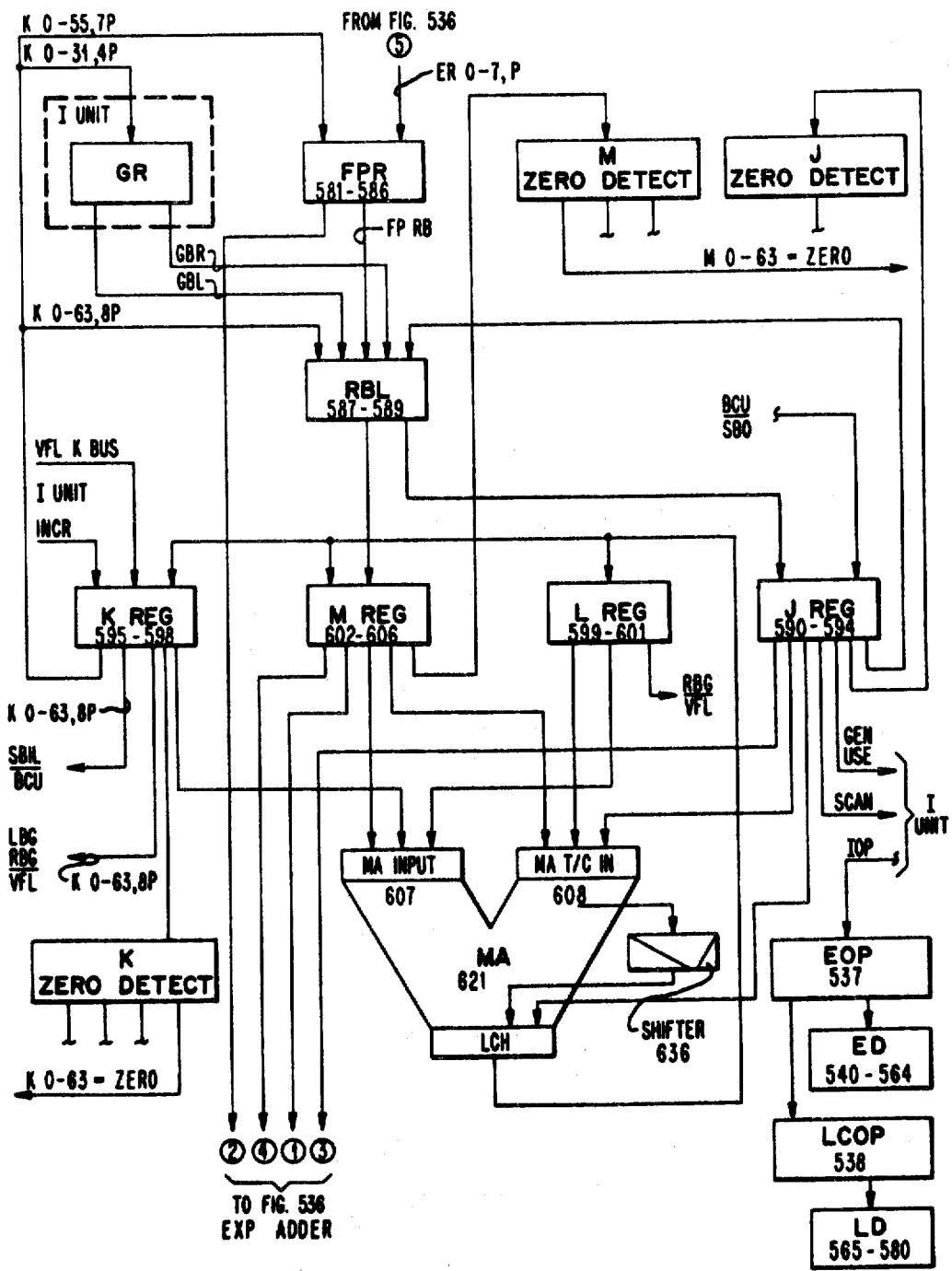
Figure 536:
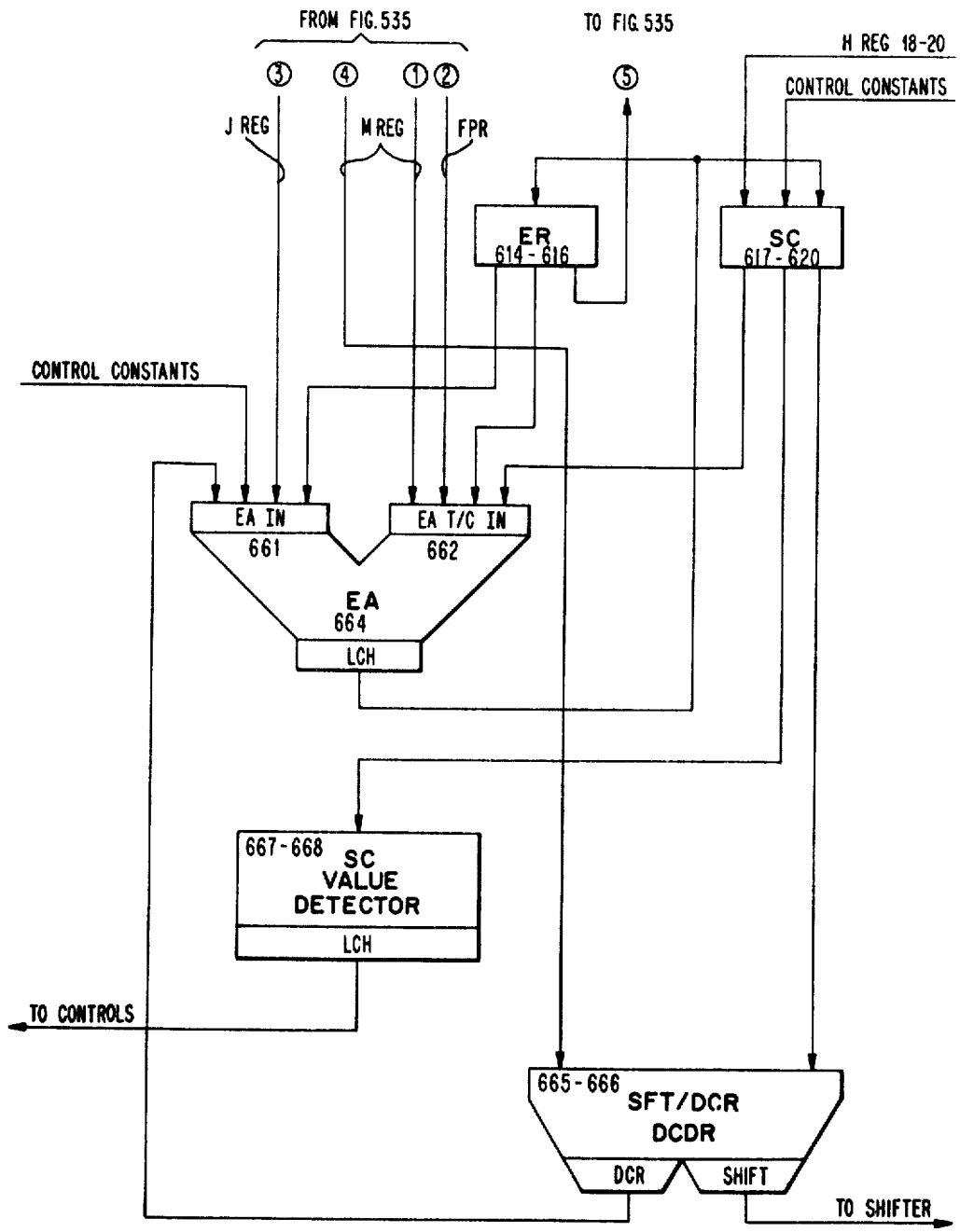

| | Sheet |
|---|---|
| (FIG. 380) Right Digit Gate | 266 |
| (FIG. 381) Left Digit Gate | 267 |
| (FIG. 382) T/C Zero DET | 267 |
| (FIG. 383) Right P ADJ | 268 |
| (FIG. 384) Left P ADJ | 268 |
| (FIG. 385) True/CPMNT Plus 6 | 269 |
| (FIG. 386) Bin Adder | 270 |
| (FIG. 387) D/-DEC Correct | 271 |
| (FIG. 388) DA Carry | 272 |
| (FIG. 389) Decimal Adder Parity Predict | 272 |
| (FIG. 390) DA IIS CHK | 273 |
| (FIG. 391) DA Error | 273 |
| (FIG. 391a) Direct Data and Out Key in Gate | 273 |
| (FIG. 392) AOE IN | 274 |
| (FIG. 393) AOE | 274 |
| (FIG. 394) Digit Buffer | 275 |
| (FIG. 395) Digit CTR | 276 |
| (FIG. 396) DC/DB P | 277 |
| (FIG. 397) Direct Data REG | 277 |
| (FIG. 398) Y/Z REG | 278 |
| (FIG. 399) Y/Z INCR | 279 |
| (FIG. 400) Y/Z LCH | 280 |
| (FIG. 401) VFL TO AA and PSW Gate | 281 |
| (FIG. 402) K Bus Gate | 282 |
| (FIG. 403) K Bus Zero DET | 283 |
| (FIG. 403a) LGTH/ADR P | 283 |
| (FIG. 404) S and T LCHS | 284 |
| (FIG. 405) S and T INCRS | 285 |
| (FIG. 406) S and T REGS | 285 |
| (FIG. 407) S PTR | 286 |
| (FIG. 408) T PTR | 286 |
| (FIG. 409) T IN DEC | 286 |
| FIGS. 409a–534 are illustrative of said environmental system | 287–382 |
| (FIG. 535) E Unit Data Flow (Binary) | 383 |
| (FIG. 536) E Unit Data Flow (Binary) | 384 |
| FIGS. 537–876 are illustrative of said environmental system | 385–643 |

(2.0) REFERENCES

A primary reference in understanding the full environment of the present invention is an architectural description, or definition, of a system in which the present invention is embodied. This comprises a manual entitled "IBM System/360 Principles of Operation," a copy of which is available in the Scientific Library of the U.S. Patent Office, "IBM Form No. A–22–6821."

Another reference, which discloses a small system in accordance with the architecture of said System/360 Manual is found in a copending application of the same assignee entitled Data Processing System, Ser. No. 357,372, filed on Apr. 6, 1964, by G. M. Amdahl et al.

An input/output channel device which is adapted for use in said environmental system is disclosed in a copending application of the same assignee entitled Automatic Channel Apparatus, Ser. No. 357,369, filed Apr. 6, 1964, by L. E. King et al.

A core storage device is shown in a copending application of the same assignee entitled Storage Drive Sense System, Ser. No. 445,306, filed Apr. 5, 1965, by Anatol Furman.

A bipolar latch, used throughout said environmental system, is described in detail in an article by O. J. Bedrij, entitled Gated Trigger With Bipolar Set, IBM Technical Disclosure Bulletin, vol. 2, No. 6, April 1960, page 50 (a copy of which is available in the Scientific Library of the U.S. Patent Office).

A binary trigger is referred to in particular in section 5. This trigger is described in detail in section 11b of a copending application of the same assignee entitled Parallel Memory, Multiple Processing, Variable Word Length Computer, Ser. No. 332,648, filed Dec. 23, 1963, now Patent No. 3,270,325, by R. S. Carter and W. W. Welz.

Binary-decimal addition is described in a copending application of the same assignee, Ser. No. 223,431, entitled Byte Processing Unit, filed Sept. 13, 1962, by Robert Keslin. A shifter is described in a copending application of the same assignee, Ser. No. 162,477, Proportional Space Matrix Printer, filed Dec. 27, 1961, now Patent No. 3,174,427, by Richard L. Taylor.

Additional references include the following copending applications of the same assignee as in this case, each of which forms a part of, and is illustrated in, the environmental system, which is entitled Large Scale Data Processing System:

Large Scale Data Processing System, Ser. No. 445,326, filed Apr. 5, 1965, by O. L. MacSorley et al., now abandoned.

Large Scale Data Processing System, Ser. No. 609,238, filed on Jan. 13, 1967, by O. L. MacSorley et al., said application being a continuation-in-part of Ser. No. 445,326.

Storage Reference Priority in a Data Processing System, Ser. No. 445,316, filed Apr. 5, 1965, now abandoned, by L. J. Hasbrouck et al.

Storage Reference Priority in a Data Processing System, Ser. No. 609,239, filed Jan. 13, 1967, by L. J. Hasbrouck et al., said application being a continuation-in-part of Ser. No. 445,316.

Unit Unavailability Detector for a Data Processing System, Ser. No. 445,318, filed Apr. 5, 1965, now Patent No. 3,341,824, by W. P. Wissick et al.

Rate Control in an Asynchronous Device Storage Accessing Apparatus, Ser. No. 445,319, filed Apr. 5, 1965, now abandoned, by W. P. Wissick et al.

Rate Control in an Asynchronous Device Storage Accessing Apparatus, Ser. No. 609,254, filed Jan. 13, 1967, by W. P. Wissick et al., said application being a continuation-in-part of Ser. No. 445,319.

Storage Cancellation and Panel Data Key Fetching in a Data Processing System, Ser. No. 445,311, filed Apr. 5, 1965, now abandoned, by W. P. Wissick et al.

Storage Cancellation and Panel Data Key Fetching in a Data Processing System, Ser. No. 609,252, filed Jan. 13, 1967, by W. P. Wissick et al., said application being a continuation-in-part of Ser. No. 445,311.

(3.0) NOMENCLATURE

The nomenclature of the present embodiment is almost entirely consistent with that shown in said System/360 Manual. A few exceptions do exist however. One of these is the instruction Execute and is herein referred to in abbreviated form as XEQ, whereas said Manual refers to this instruction in abbreviated form as EX. Another example is the instruction Edit; it is referred to in abbreviated form herein as EDT whereas said Manual refers to same as ED. In order to avoid confusion with "execution," "E decode," and other similar functions in the present embodiment, these changes have been made. However, a good definition of each of the instructions which may be performed by the present embodiment is found in said Manual. Additionally, the functions of a data processing system in accordance with the architectural definition within said Manual are applicable to this embodiment, with the exception of the fact that the present embodiment does not provide for: sharing of storage by more than one system, a multiplex channel, direct coupling between computers, large capacity storage, and certain other features which could be available on an embodiment of the system described in said Manual. However, said environmental system is readily adapted for the achievement of these functions.

In the present embodiment, a bit means a binary unit of intelligence, which can be either a one or a zero. A byte comprises eight bits, two bytes comprise a syllable or a half-word. Two syllables, or two half-words comprise a word, which includes thirty-two bits. A storage word is two words or sixty-four bits in the environmental system of the present embodiment. In storage, and within the data flow of the environmental system, there is one parity bit for each eight bits of data; at certain points in a data flow this is altered; for instance, at the output of an adder, it is possible that parity may be carried to several stages of logic on a four bit basis, and then combined on an eight bit basis.

In the detailed descriptions herein, the signals which propagate between various figures are all identified by unique lines which are referred to in the upper case (such as SAR meaning the output of the storage address register, CPU RST being the line that causes a computer reset of a particular type). As is discussed more fully in section 5, hereinafter, the use of positive and negative signals as inputs to positive and negative-type circuits is so customary, that it no longer has any significance to consider signals in actual circuitry as being either the true or the complement of an event; for instance, if a signal is generated in a positive sense when the event occurs, a minus signal may nonetheless be required to indicate that event due to the fact that the circuit which is utilizing the signal requires a negative input. For that reason, complementary functions (such as NOT LC, meaning the complement of the LC signal) are referred to as inputs even though they may not be explicitly generated in the circuit where the event is manifested by the true signal.

In block diagrams which comprise a plurality of blocks, each block being represented by one or more figures, the figure or figures within which the details of the particular block are shown may be identified in that block by figure number only, without the word "FIG." actually being printed within that block. This allows a simpler block configuration which is easier to read.

In the description of the detail figures, the various circuit elements are referred to by reference numerals, the reference numerals being applicable only in the particular figure number. However, in any case where a particular item is referred to in more than one place, it would have the same reference numeral wherever it is referred to. On the other hand, reference numerals between 1 and 30 are used repetitively throughout the environmental system due to the fact that the size of the environmental system would require reference numerals having four or five digits if completely sequential reference numerals were used for the entire environmental system. Therefore, any possible tendency toward confusion is alleviated by also specifying the figure number along with the reference numeral; additionally, the description itself is patently clear insofar as the precise element to which reference is being made.

When terms such as "storage cycle" or "last E cycle" are used, machine cycles as such are not necessarily involved. For instance, a storage cycle requires five machine cycles in the embodiment of said environmental system; last cycle triggers may be set from the start of NOT L time to the start of the following NOT L time, a period equal to a 200 nanosecond machine cycle, but displaced therefrom by approximately 65 nanoseconds since the basic machine cycle is defined to be from the start of A time to the end of A time, as is described in section 7. The duration or phase of any specially-referred to cycle often differs from a basic machine cycle. The terms, when used, refer to the latched condition or event being described, as is apparent in the context where used.

In order to facilitate cross referencing between the various copending applications, and most particularly, to facilitate cross referencing of embodiments in said copending applications of portions of said environmental system with the embodiment of a full environmental system, constant sequential figure numbers are used in all of said copending applications, whereby all figure numbers are identical in all of the cases. In order to reduce the cost of printing, figure numbers which relate to circuits not required in smaller embodiments are shown in an illustrative manner only. Any reference to a figure which is shown in an exemplary form in one of said copending applications should be interpreted as a reference to that same figure in the embodiment of said environmental system.

In certain instances, control lines comprising a particular combination of operational decoding or other status indications may not be shown in detail; that is, a line called "BR OR STATUS SWX" may be utilized, as an input to a circuit, but may not be generated, as an output from a circuit. However, there are innumerable examples of generated decode lines such that the generation of any other one would be well within the skill of the art. As an example, a line called "VFL T1 OR Y≠0" could be generated by the OR of "VFL T1" with "Y≠0," or with "NOT Y EQ 0," or by ORing the bits of the Y REG to see that Y does indeed equal other than zero.

(4.0) BRIEF DESCRIPTION OF ENVIRONMENTAL SYSTEM (FIG. 2)

Figure 2:
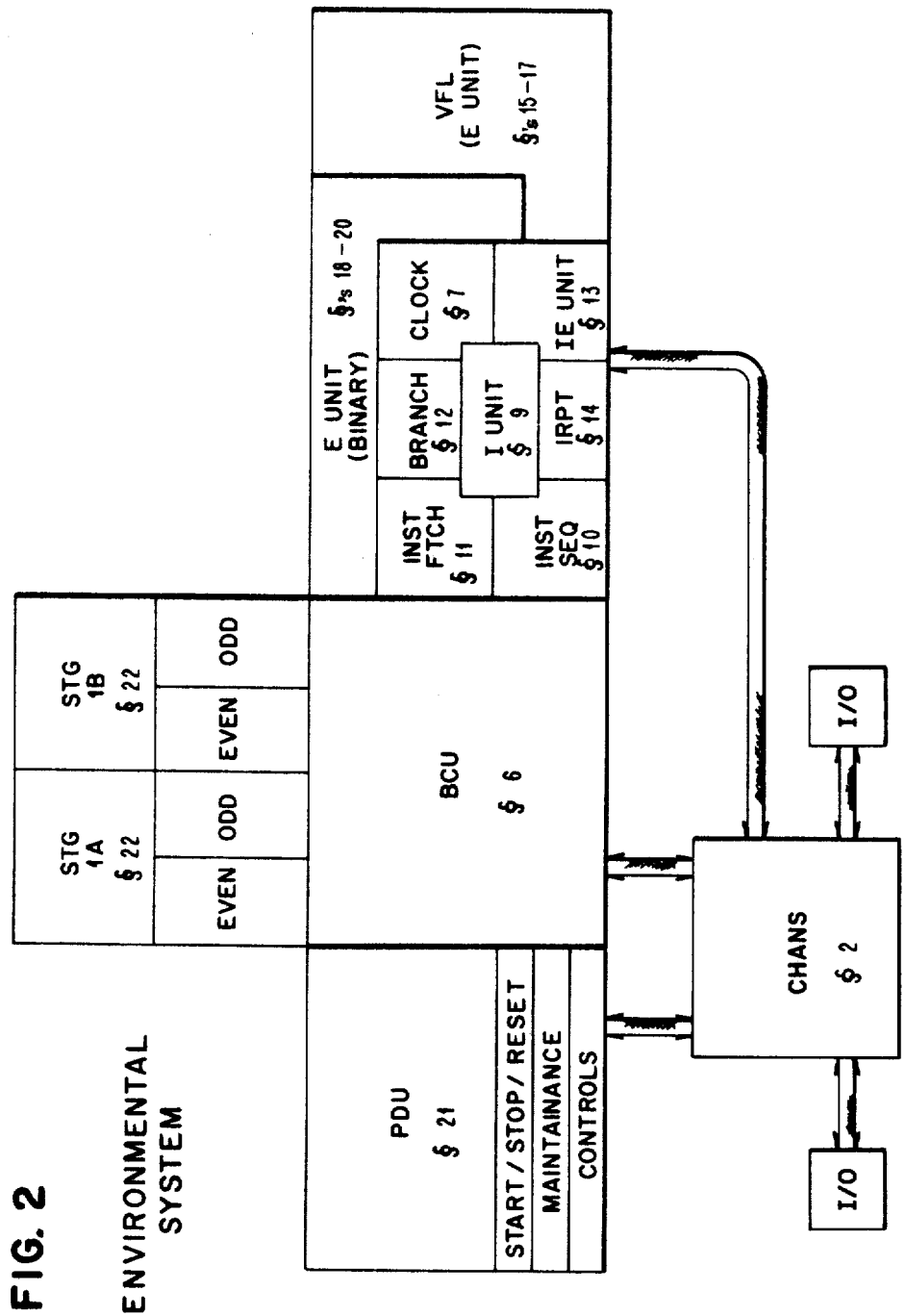

In FIG. 2, a block representation of said environmental system is shown to include a bus control unit (BCU) which is described in section 6, and which provides data flow communication between the various units of the system, and provides controls for the storage devices. The operator controls, certain maintenance controls, and basic stop start and reset controls are provided in the power distribution unit (PDU) described in section 21. The system also includes an I unit, the data flow portion of which is described in section 9, the main other functions of the unit being described in separate sections. The clock is shown in section 7, and includes the main timing pulses which are utilized throughout the system so as to synchronize operations. In section 10, instruction sequencing is described, and instruction fetching is described in section 11. Branching operations, and their effect on the remainder of the system are all described in section 12. Communication with channels, and performance of certain supervisory tape instructions, inter alia, are described with respect to an I execution unit (IE UNIT) in section 13. Interruption handling, and functions which, although not interruptions, are handled by the interruption circuitry, are described in section 14 of said environmental system. The E unit of said environmental system includes a binary portion and a VFL portion, which are referred to in a compound fashion; both the binary and VFL portions are considered part of the E unit, and E unit controls can come from either portion. However, the binary portion is generally not referred to as such, but is referred to merely as the E unit, and the VFL (variable field length) portion is usually referred to as the "VFL." Storage devices are not completely described herein, but the logical control thereover as it relates to the bus control unit is described in section 22.

(5.0) COMPONENT CIRCUITS (FIG. 3 THROUGH FIG. 8)

In FIG. 3 through FIG. 8, component circuits of the type which may be utilized in said environmental system are illustrated. These are not exhaustive, and merely illustrate types of circuits which might be utilized, and the manner in which they are illustrated in the detailed description of said environmental system.

In FIG. 3a, a simple latch is shown. This comprises an "AND-OR-INVERTER" combination which includes an OR-INVERT circuit 1 and two AND circuits 2, 3 as well as two inverters 4, 5. In normal operation, whenever the LC line is positive, the inverter 5 will provide a signal "b" to the AND circuit 2 so that a +X signal, whenever it may arrive, will cause the AND circuit 2 to activate the OR-INVERT circuit 1 thereby generating a −Y signal. If the +X signal is removed, then the −Y signal will disappear. The −Y signal causes the inverter 4 to generate the +Y signal which is fed back to an AND circuit 3; however, so long as the −LC pulse is present, the AND circuit 3 will not operate, so that the circuit of FIG. 3a is essentially an AND circuit whereby a +X signal and the signal from the inverter 5 pass through the AND circuit 2, becomes inverted in the OR circuit 1, and no latching takes place.

When the LC signal turns positive (at NOT L time), then any +X signal will cause a +Y signal to be gated through the AND circuit 3 thereby causing the circuit of FIG. 3a to become latched for the duration of the +LC signal. When the LC signal returns to a negative condition (at L time) then the state of the latch can again be changed. During the time that the circuit is latched, the AND circuit 3 will be passing a signal through the OR circuit 1 provided the latch was on at the time that the latching condition commenced, and the AND circuit 2 is blocked by the inverter 5. When the LC line returns to a negative condition, the AND circuit 3 will be immediately blocked, and the inverter 5, having about a seven nanosecond delay, will later cause the unblocking of the AND circuit 2. Thus, there is a short period of about seven nanoseconds (as illustrated in FIG. 3d) when the circuit of FIG. 3a will have no output whatever. This is of too short a duration to be illustrated in FIG. 3c which shows the operation of the latch of FIG. 3a in general terms.

The circuit of FIG. 3a is illustrated herein as shown in FIG. 3b. Thus, the circuit of FIG. 3a can be considered to be a latch circuit 6 settable by an AND circuit 7 at NOT L time, to be reset at L time.

In FIG. 4a is shown a variation of a latch having a combined reset condition which, as shown in FIG. 4b includes X or NOT Y. Notice that the AND circuit 1 in FIG. 4a has a minus D signal applied thereto which represents a NOT D as illustrated by the AND circuit 2 in FIG. 4b. Also notice that the AND circuit 3 in FIG. 4a has both −X and applied Y signals thereto so that the latched effect will be ended by the disappearance of −X or by the disappearance of +Y. This is illustrated as resetting in response to either X or NOT Y by the OR circuit 4 in FIG. 4b. A still further complicated latch is illustrated in FIG. 5a. This includes an AND-INVERT circuit 1 which passes a signal through an inverter 2 (the output of which then would be positive when the conditions to the AND invert circuit 1 are met) so as to cause an AND circuit 3 to operate when the +AC signal appears. +AC means a positive controlled clock signal having the A time duration. The "C" within "AC" stands for "controlled," in contrast with "running," as is the case when an AR signal is involved. The AR signal would be of the same duration and timing as the AC signal, but could run even through single cycle operations, whereas the AC signal would be stopped during single cycle operations.

The latch of FIG. 5a can be reset by the CPU RST signal, or by the raw output of the AND INVERT circuit 1 as applied to an AND circuit 4. The circuit of FIG. 5a would be illustrated herein as shown in FIG. 5b, wherein an AND circuit 5 will either set or reset the latch in dependence upon whether the conditions are met, due to the assistance of an inverter 6. Notice also that single-input AND circuits such as the AND circuit 7 in FIG. 5a actually represent merely an input to the OR INVERT circuit, as illustrated by the direct application of the scan signal to the OR circuit 8 in FIG. 5b.

Figure 6A:
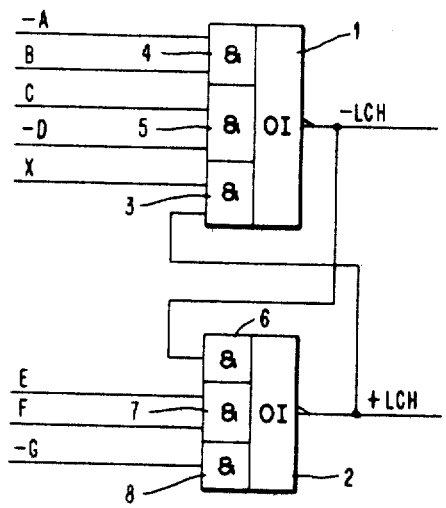
Figure 6B:
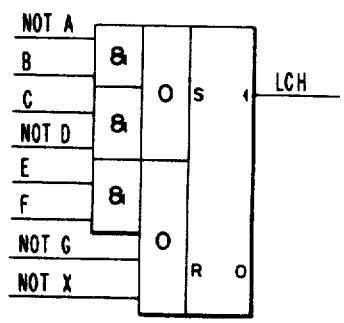

A variation in the circuit of FIG. 5a is shown in FIG. 6a, wherein a first OR INVERT circuit 1 operates when the latch is in the on condition, and a second OR INVERT circuit 2 operates when the latch is in the reset condition. When the OR circuit 2 operates, it has a negative output, thereby locking an AND circuit 3. However, a negative output from the OR circuit 2 does not preclude an output from the latch inasmuch as either one of two AND circuits 4, 5 could supply an input to the OR circuit 1. If either of the AND circuits 4, 5 do operate, then there will be a minus signal out of the OR circuit 1 which will block a single-input AND circuit 6 at the input to the OR circuit 2 so that the OR circuit 2 will normally have no output unless inputs are applied to either an AND circuit 7 or a single input AND circuit 8. With the OR circuit 2 locked, its positive output will be applied to an AND circuit 3, and if there is an X signal at the AND circuit 3, then the latch will remain on even though either of the OR circuits 4, 5 which turn the latch on in the first place no longer has inputs thereto. This is illustrated more clearly in the circuit shown in FIG. 6b, which represents the manner of illustrating this circuit herein. As seen in FIG. 6b, the latch can be turned on by NOT A and B, or by C and NOT D. If turned on, it will latch up provided that E and F are not both present, and provided that G and X are both present. If the latch turns on and becomes latched in an on condition, then the appearance of E and F together or the appearance of NOT G or NOT X will cause the latch to turn off.

Figure 7A:
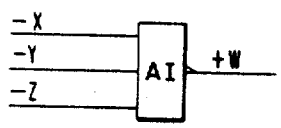
Figure 7B:
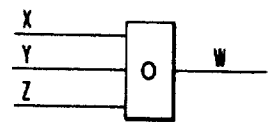

In FIG. 7a, an AND INVERT circuit with minus inputs is shown to create a +W signal. This is fully equivalent to the circuit of FIG. 7b wherein a positive, non-inverting OR circuit responds to positive XYZ signals to generate a positive W signal.

Figure 8A:
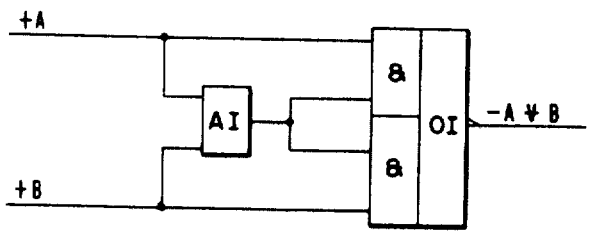
Figure 8B:

FIG. 8a is a simple illustration of a two input EXCLUSIVE OR circuit, which is represented herein as shown in FIG. 8b. It should be understood that the EXCLUSIVE OR function with only two inputs is a test for oddness: that is, one and only one input must be present; if no inputs or two inputs are present, then there will be no output. Thus, an odd number of inputs are required. In the embodiment described herein, a term "EXCLUSIVE OR circuit" is utilized to mean a complex of EXCLUSIVE OR circuits which test for oddness and evenness of the inputs thereto. These may be actually manifested in two input EXCLUSIVE OR circuits as shown in FIG. 8a, or may be represented with EXCLUSIVE OR circuits actually responding to more inputs. To the extent that more than two inputs are shown, it can be assumed that a three input EXCLUSIVE OR circuit or a two input EXCLUSIVE OR circuit or combinations thereof are utilized in a well-known "tree" fashion so as to provide an EXCLUSIVE OR complex which gives an output whenever the inputs thereto are odd in number.

From the foregoing description, it can be seen that the presence of a plus or a minus signal has no significance in and of itself, due to the way in which a plus or a minus signal may be utilized. For instance, when applied to a +AND circuit of a reset side of a latch as shown in FIG. 6a, it may be a NOT signal, as illustrated by the NOT G signal shown in FIG. 6b. Similarly, when applied to a resetting AND circuit such as the AND circuit 3 in FIG. 4a, a −X signal really becomes an X signal in terms of its logical connotation as illustrated in FIG. 4b. Also, the minus signals applied to the circuit of FIG. 7a in fact are plus signals when the function of that circuit is considered to be an OR circuit. For that reason, the simplified showing of the present embodiment (such as illustrated in FIGS. 3b, 4b, 5b, 6b, 7b and 8b) do not consider whether a plus or minus signal may be generated at the source of a signal, or whether that signal may be generated in true or complement form, since such considerations have no bearing on the way in which the signal may be utilized. However, at the input to any particular circuit (such as the input to FIG. 6b) the affirmative or negative function which the signal represents does have logical connotation and is shown. To the extent that a "NOT SIGNAL" is required but not generated, it is implied that one with ordinary skill in the art could obtain the opposite phase thereof from the source of the "SIGNAL." This is illustrated, for instance, in FIGS. 3a and 3b where both phases are generated in 3a, and only the affirmative phase is generated in 3b, the complement thereto being implied.

(6.0) BASIC BUS CONTROL UNIT

The BCU (bus control unit) acts as a buffering traffic control for data, address, control, and checking signals between the storage devices and the rest of the system. In this embodiment, the CPU (including the I unit, the IE unit, the BE unit, and the E unit) is considered to be a single device with respect to the accessing of storage, and it must share storage with the channels. Each of the I/O channels 1–6 has a priority rating corresponding to its number (1–6), and the MC (maintenance channel, including panel keys and panel indicators) comprises a seventh, lowest-priority channel for storage reference purpose. In accessing storage, priority is determined as between channels, and then priority is determined between the selected channel and the CPU. Stated alternatively, the CPU may reference storage unless it is prevented from doing so by a prior outstanding request for an available storage device initiated from one of the channels; which one of the channels will be permitted to reference storage is determined independently by a channel priority circuit. For purposes of completeness and simplicity, the embodiment of a bus control unit described in this section does not include provisions for handling a large capacity storage, nor for the sharing of a single storage device by more than one data processing system. The BCU comprises three general portions, shown in FIG. 9, FIG. 10 and FIG. 11, and described in Sections 6.1, 6.2 and 6.3, respectively of previously referred to application Ser. No. 609,238.

(7.0) CLOCK CIRCUIT

(7.4) Clock circuit

Figure 60:
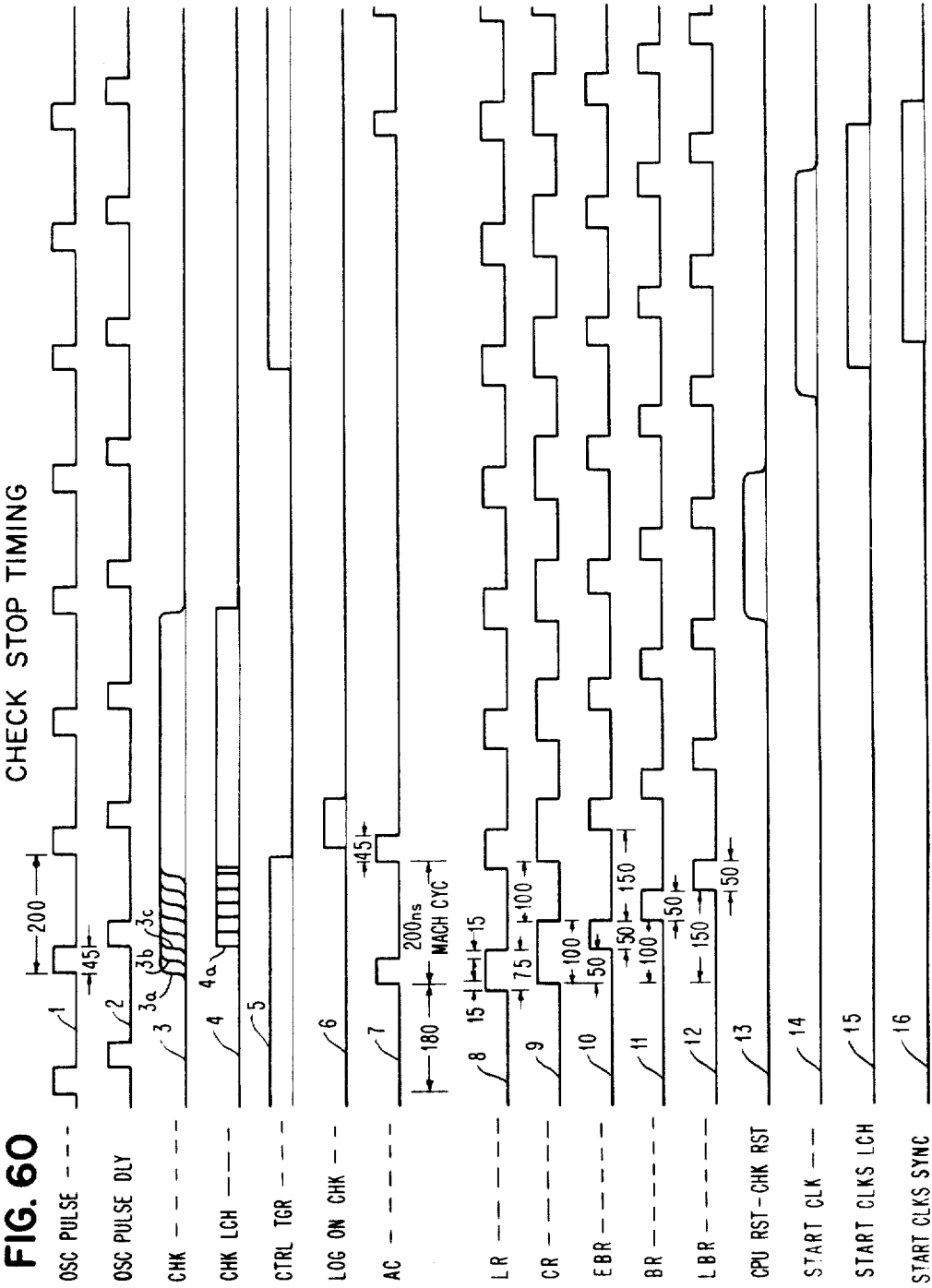

References herein to FIGS. 56–59, 61 and 62 refer to figures in said application Ser. No. 609,238. The actual timing signals used throughout the system are generated by the clock circuits shown in FIG. 59, the upper portion of which comprises the control clock, and the lower portion of which is identical to the upper portion and comprises the running clock; the only difference between them being that the control clock is operated by the gated control pulse signal from FIG. 58, whereas the running clock is operated by the gated running pulse signal from FIG. 58. The operation of the clock generating circuits is illustrated in FIG. 60 through FIG. 62. In FIG. 60 through FIG. 62, an OSC PULSE (illustration 1) comprises the signal on the OSC line. It is to be noted that this signal is about 45 nanoseconds in width, and the beginning of each pulse is separated from the beginning of the following pulse by 200 nanoseconds, which comprises a machine cycle. The delayed oscillator pulse (OSC PULSE DLY, illustration 2) comprises the output of the delay unit 7 in FIG. 58. This is the signal which gates the signals on the GATED CTRL PULSE line and on the GATED RUNNING PULSE line. These signals are utilized to generate the actual timing signals as shown in FIG. 59.

Whenever the clock has to be stopped because of error signals which give rise to a check condition, it is desirable to always know that the clock will stop at a definite time in relation to the time at which the error condition was sensed. Therefore, the clock circuits of FIG. 56 through FIG. 59 are arranged so that the clock will always stop within a machine cycle following the cycle within which an error could be sensed. Referring to illustration 3 of the check signal (CHK) in FIG. 60, it will be seen that check signals can appear at a number of different times within a machine cycle. It is therefore desirable to establish that these check signals will fall within a single defined machine cycle. For this reason, the final timing of the various clock signals (as shown in illustrations 7–12 in FIG. 60), is set up so that A time begins prior to the time when any of these check signals could occur and the next A described in section 7.5, only during the nonoscillator pulse time. Thus, either of the first two check setting times (3a, 3b) will cause the check latch to be set at time 4a, all other occurrences of a check condition causing the check latch to be set at a corresponding time, approximately 20 nanoseconds after the check condition has occurred, due to the time delays inherent in logic circuits used for setting the check latch. Thus, the establishment of a signal from the check latch is related to the timing of the oscillator in such a fashion that the basic timing signal which defines a machine cycle, which is A time, must occur approximately 180 nanoseconds after the oscillator pulse output on the OSC line in FIG. 56.

(8.0) SCAN

Within the embodiment of said environmental system, the word "scan" means the forcing of conditions in bistable devices throughout the system, so as to cause the system to establish a particular state. This is accomplished by a network of circuitry which is complex in its size, but is conceptually very simple. The process includes defining a scan mode, identifying a particular cycle within the scan mode, and utilizing certain bits of a storage word fetched from storage as data bits to force particular bistable devices.

(8.1) Scanning into the I unit (FIG. 68)

I unit scanning is illustrated in FIG. 68. Scanning into the I unit is controlled by six scan word cycles, each one of which causes a 63-bit word to be set into various latches and triggers of the machine. The first scan cycle is defined as word 1 (WD1), which causes all 63 bits of the J register to be loaded into the PSW register, bit for bit, as shown in FIG. 68. In word 2 of the scan, bits 0–31 are loaded into the IOP register, and IOP parity bits themselves are forced by bits 32–36 of the J register. During this same cycle, the storage address register is loaded with bits 40–63 of the J register, and the parity bits of the storage address register are forced by bits 37–39 of the J register. In a similar fashion, the other words are applied to the various circuits as shown in the chart of FIG. 68. The manner of providing this gating is twofold: as in the case of the PSW register, scan gates are provided as shown at the top of FIG. 70 of application Ser. No. 609,238. When status triggers and registers are being scanned into (as in the case of word 5 and word 6, FIG. 68) actual signals are generated by scan gate signals in combination with bits of the J register as shown in FIG. 71 of application Ser. No. 609,238. But the circuits of FIGS. 70 and 71 are merely illustrative of the manner in which scanning signals may be applied to the circuits of this embodiment.

Figure 69:
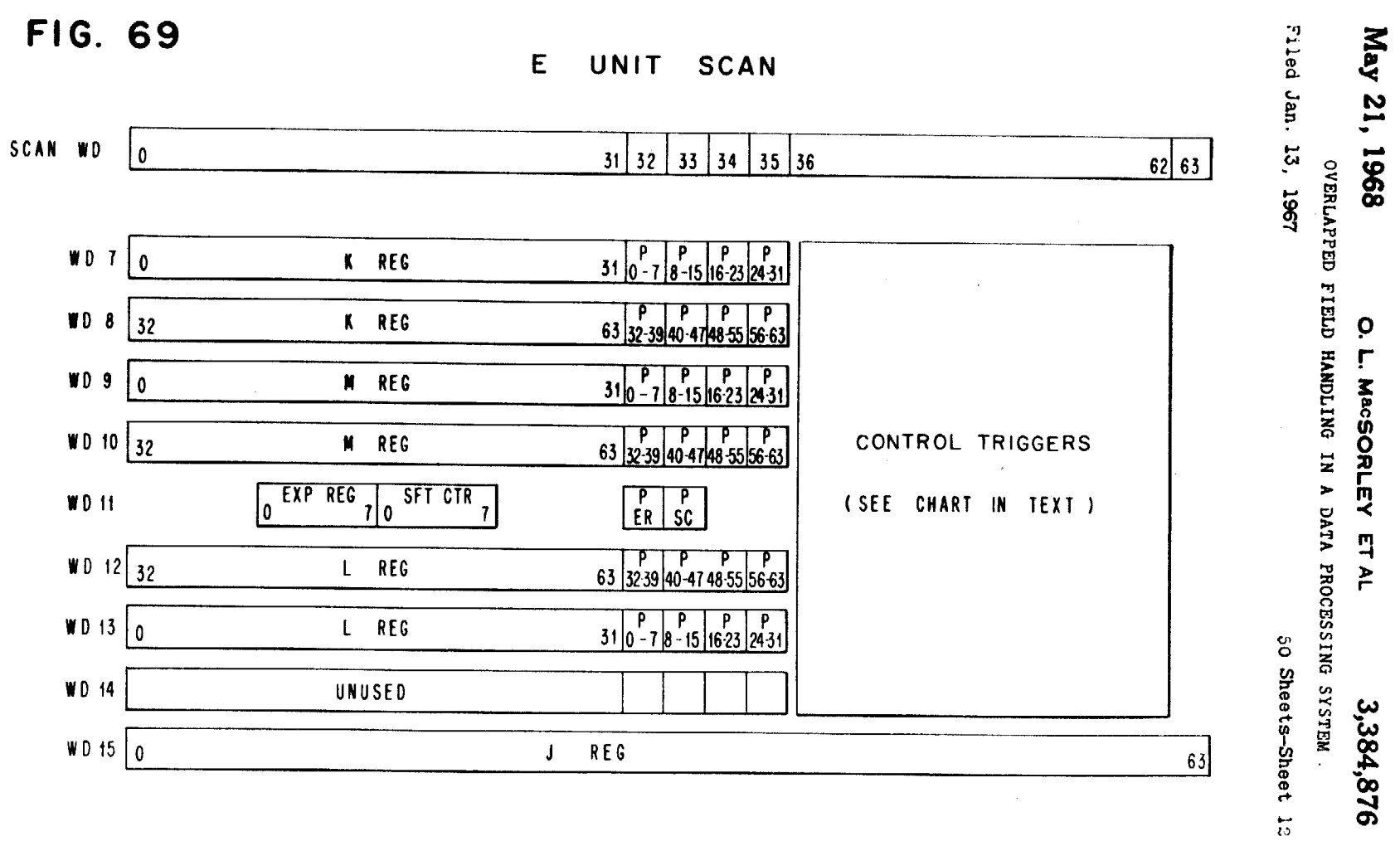

(8.2) Scanning into the E unit (FIG. 69)

A chart which is illustrated somewhat differently than FIG. 68, but which contains the same information, is shown in FIG. 69. E unit scanning commences after I unit scanning, and includes word 7 through word 15 of a scan operation. The chart of FIG. 69 is not complete as shown therein, bits 36–62 thereof for words 7 through 14 being illustrated in the following chart:

E SCAN-IN CHART—WORD 7

Bit trigger:
    36 J0–7 EA
    37 J0–63 MA T/C
    38 J0–31 MA T/C
    39 J32–39 EA
    40 JL32 MA T/C
    41 J For Parity MA T/C
    42 K0–63 MA
    43 KR4 MA
    44 KL2 MA
    45 DC8
    46 DC4
    47 DC2
    48 DC1
    49 DB0
    50 DB1
    51 DB2
    52 DB3
    53 DBP
    54 QUOT OVFLO
    55 QUOT SIGN OVFLO
    56 QUOT INSRT Z VALID
    57 QUOT INSRT Z QUOT
    58 QUOT INSRT DIV TRUE

(9.0) INSTRUCTION UNIT DATA FLOW

As is well known in the data processing art, every computer, or data processing system, utilizes instructions which include an operation portion that defines the actual data handling steps which the computer is to perform as well as an address portion which defines a location in storage of the data, or operands, upon which the operation is to be performed. Traditionally, a computer will have a section of the machine set aside for the purpose of handling the instruction, which section may have a variety of names such as control unit, instruction sequencing unit, or instruction unit. This portion of the machine is referred to herein as the I unit, the I unit selects instructions, handles branch and interrupt functions, communicates with the channels, and performs other related control functions.

The description of the I unit herein is divided into "data flow" and controls. "Data flow" refers to the main registers, adders, incrementers, and decoders among which the manifestations of instructions, or portions of instructions, are routed, so as to perform the registering, testing, incrementing, and decoding of their instruction manifestations so as to derive a useful result therefrom.

The description of the I unit data flow is covered in two different ways herein: first, a complete look at the data flow will be given in sections 9.1 et seq., followed by individual descriptions of main portions thereof. The block diagrams of the first section show the same matter as the block diagrams of the second section, but the purpose and approach of the drawings differs. In studying the circuitry in detail, the second section should be utilized; to get an idea of how instructions are handled in this system, the drawings of the first section should be utilized.

*(9.1) General introduction to I unit data flow*

Figure 72:
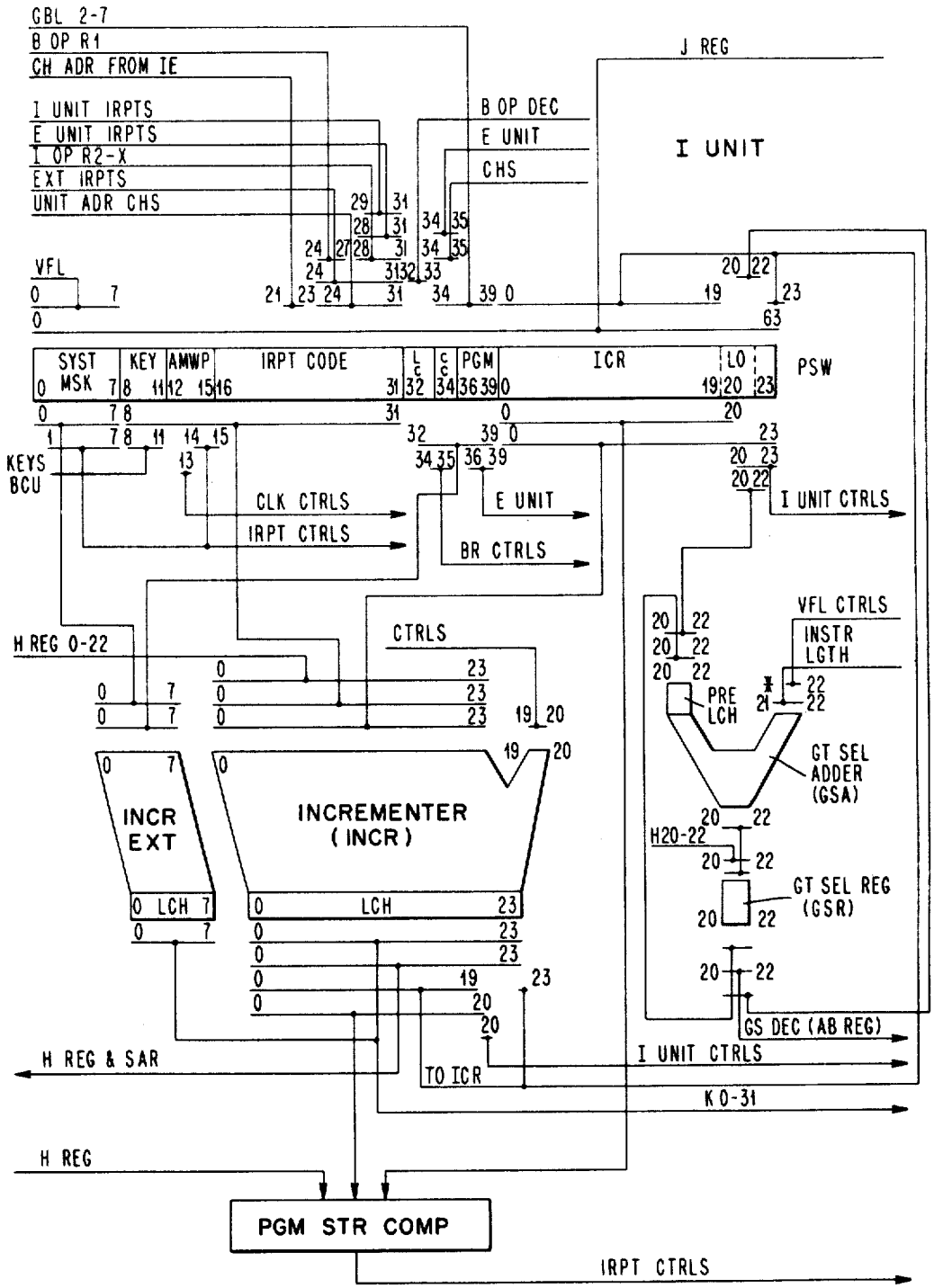
Figure 73:
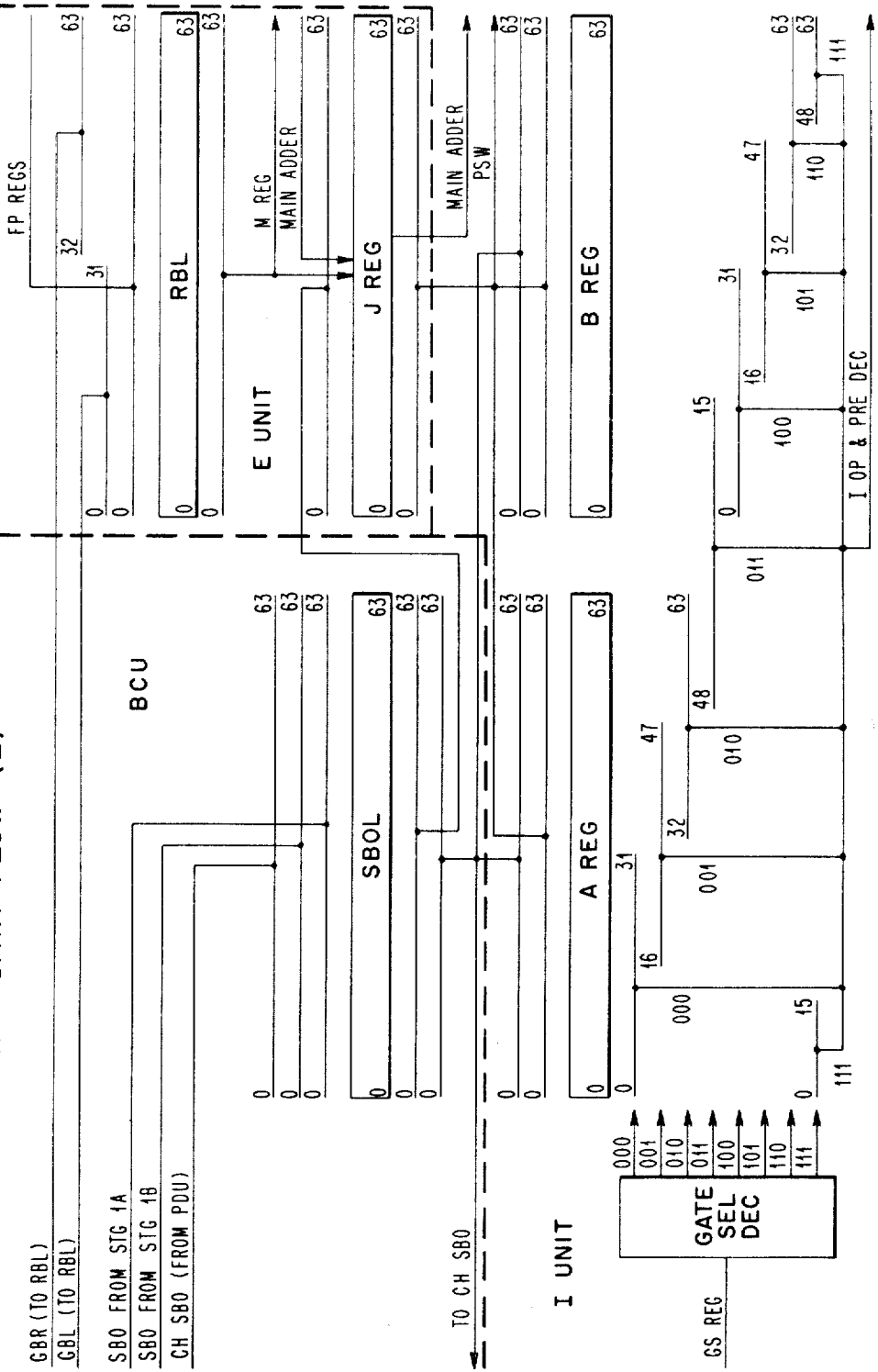
Figure 74:
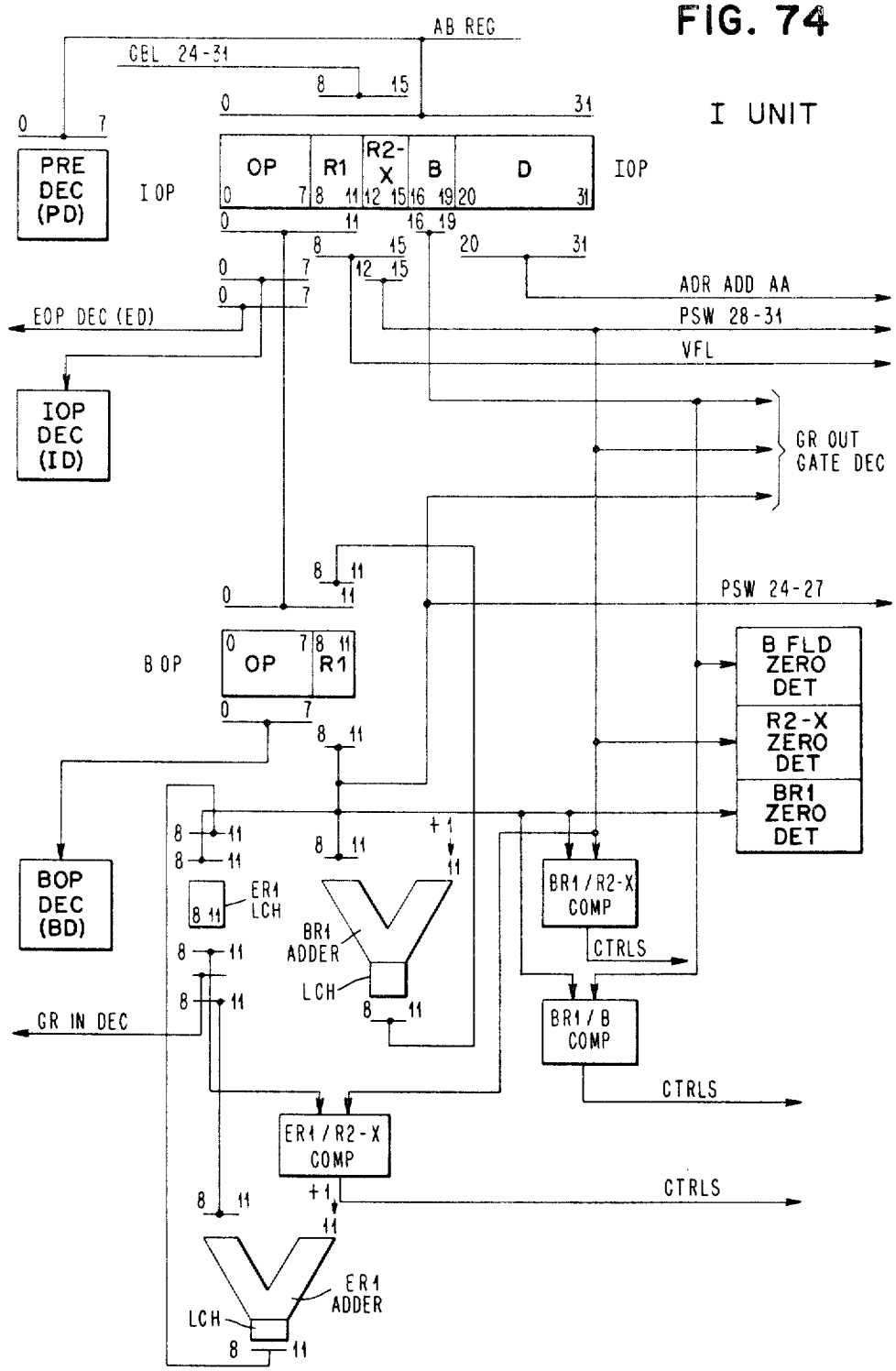
Figure 75:
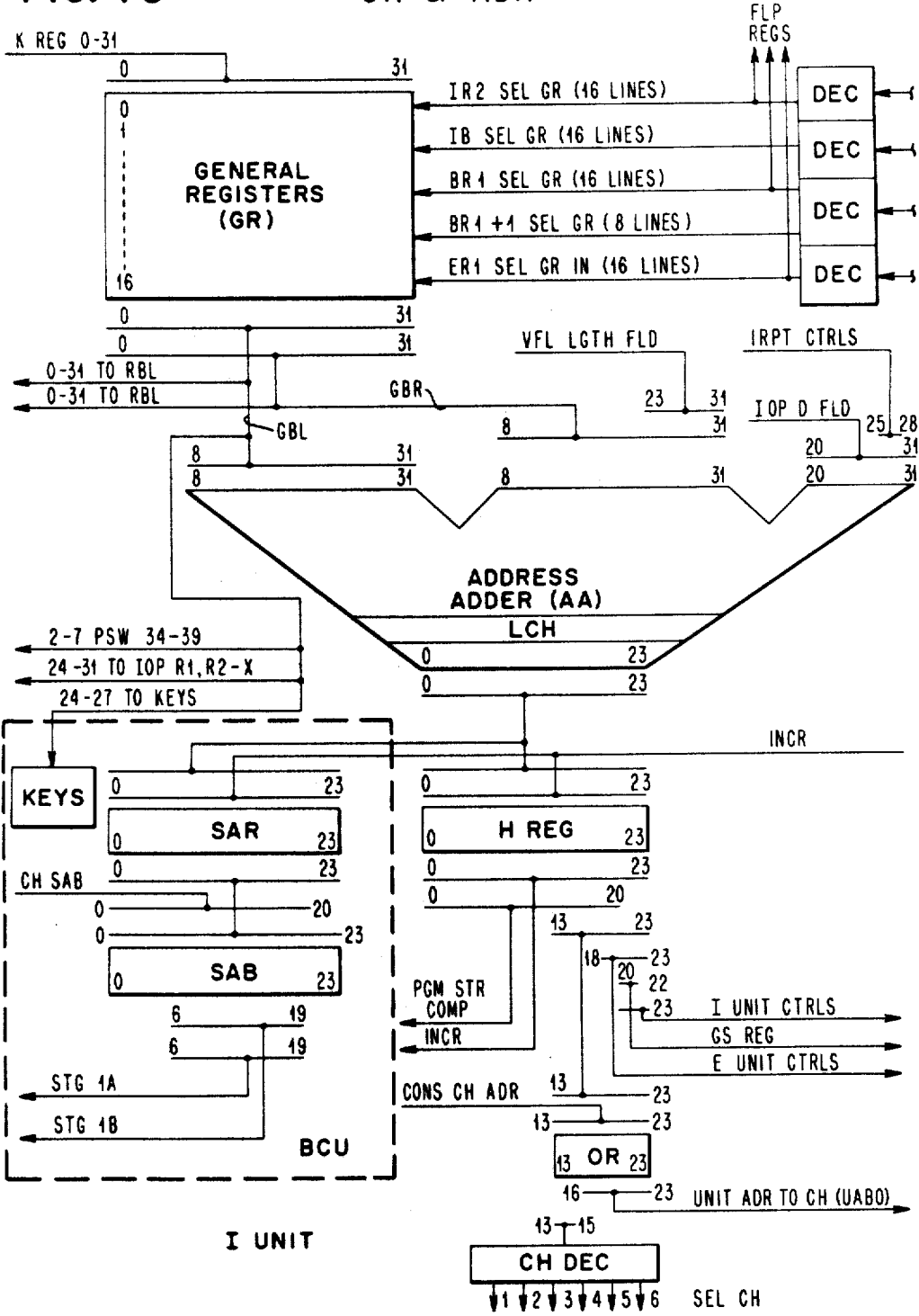

The I unit data flow is described in conjunction with portions of the E unit (which performs the arithmetic and logic operations upon operands, thereby executing the instructions), and the BCU (bus control unit, which controls the flow of data to and from storage units). The I unit data flow may be considered to comprise four portions:

Instruction selection shown in FIG. 72 and described in section 9.1.1;

Instruction input paths shown in FIG. 73 and described in section 9.1.2;

Instruction decoding shown in FIG. 74 and described in section 9.1.3;

AND instruction utilization shown in FIG. 75 and described in section 9.1.4.

(9.1.1) INSTRUCTION SELECTION (FIG. 72)

In the upper central section of FIG. 72 is shown the program status word register (PSW). This register is shown in detail in FIG. 131 through FIG. 139 of application Ser. No. 609,238. The PSW contains the system mask, storage protection keys, status bits indicating that the machine is utilizing ASCII code (A), the machine check mask (M), a WAIT bit (W), a PROBLEM bit (P), the INTERRUPTION CODE (IRPT CODE), the instruction LENGTH CODE (LC), the CONDITION CODE (CC), the PROGRAM MASK (PGM), and the instruction counter register (ICR), including a low order portion thereof (LO). It is the ICR which determines the address of the next instruction in a sequence of instructions which comprise a program.

The ICR feeds an incrementer (INCR) which increments the instruction address each time that an instruction buffer register is to be loaded from storage; the ICR also feeds a gate select adder (GSA) which updates the instruction count each time an instruction is performed so as to generate a correct address for the next instruction in a sequence. The INCR is shown in detail in FIG. 140 through FIG. 154 of application Ser. No. 609,238. The output of the INCR may be returned to the ICR and may also be applied to the SAR (storage address register) and the H REG (H register, a backup for the storage address register), as well as to a PGM STR COMP (program store compare circuit) and to the high order half (K0–31) of the K register. The INCR is sometimes used merely as a data path to pass 32 bits from one portion of the PSW register to the K register, and is sometimes used to check (for correct parity) the two halves of the PSW. In order to provide a 32 bit data path, the INCR is provided with an INCR EXT (incrementer extender) which provides the low order 8 bits (0–7) of the data path when the INCR is so utilized. The INCR may also receive inputs from the H REG.

The illustrative diagram of FIG. 72 also shows a gate select adder and gate select register (GSA, GSR) which control the selection of a particular group of instruction bytes from among 8-byte storage words as described in section 9.1.2. Since each instruction has at least two bytes, any addressing of storage is on a byte basis, the lowest ordered bit (23) of the ICR is not utilized in selecting instructions from the AB REG; thus, only bits 20–22 are involved in the gate select mechanism. The GS mechanism is shown in FIG. 156 through FIG. 162 of application Ser. No. 609,238.

(9.1.2) INSTRUCTION INPUT PATHS (FIG. 73)

The output of the gate select register (GSR) in FIG. 72 is applied to a gate select decode circuit GS DEC (AB REG) so as to select the correct 32 bits at one time out of the AB register (A REG, B REG). The AB register is utilized as a buffer register for instructions which are fetched from storage so as to insure that there is always one instruction available for processing in addition to the instruction which is currently being processed in the I unit. Since the I unit generally processes each instruction concurrently with the execution of a previous instruction by the E unit, this means that the contents of the AB register may be as much as two instructions ahead of that which is being executed. Instructions are received from one of the storage units (STG 1A, STG 1B) over the storage bus out (SBO), or on the channel storage bus out (CH SBO) including data from the power distribution unit (PDU, which includes the maintenance channel). All data so received are stored in the storage bus out latch (SBOL), instructions being transferable directly to the AB register, and all data, including instructions, being transferable to the channel storage bus out or to the J register (J REG). Instructions may be temporarily placed in the J REG if they have not been fetched by a certain time in an instruction fetch cycle, and will thereafter be transferred to the AB register provided that a branch has not occurred. In all other cases, timely received instructions are transferred directly from SBOL to the AB register. The contents of the AB register is transferred to the IOP register and to the PRE DEC or TP (predecode) circuit by means of the gate select mechanism, 32 bits at a time. The choice of the 32 bit group to be selected from the AB register is made by the GATE SEL DEC (gate select decode) circuit which is controlled by the gate select circuitry of FIG. 72 so that the extraction of each instruction will result in extracting the next sequential instruction on a following operation. The AB register, and GS output gating therefor, are shown in FIG. 76 through FIG. 80 of application Ser. No. 609,238.

(9.1.3) INSTRUCTION DECODING (FIG. 74)

The 32 bits from the AB register are applied to the IOP register as shown in FIG. 74. This register includes an operation portion (OP), an R1 field, an R2-X field, a B field, and a D field. At the time an instruction (or a portion of an instruction) is loaded into the IOP register, preliminary information about the instruction is also being derived from the PRE DEC. The contents of the IOP register are transferred to various circuits which perform different functions in the handling of an instruction. The OP portion is applied to the IOP DEC (ID), where the operation portion is decoded for I unit use. The same portion is transferred along with the R1 portion to the BOP register; in turn, the OP portion of the BOP register is applied to the BOP DEC (BD), for backup operation decoding. It is the IOP and BOP decoders which perform a major portion of the operand and branch decoding in the system. Each of the fields R1, R2-X, and B are used to specify general purpose registers, the contents of which are involved in the execution of the instruction. The R1 field, however, is utilized from the BOP register rather than from the IOP register controlling selection of the general registers. Each of these fields is also tested for zero in order to determine special situations where no general register is to be utilized in accordance with the architectural definition of a data processing system in said System/360 Manual. The B field of the IOP register is applied to the addressing adder (AA) as a component of a storage address for all instructions which reference storage, the addressing adder being shown in FIG. 79 of application Ser. No. 609,238 which the R1 portion of the BOP register also applies to an ER1 register which provides R1 information later in a cycle. The ER1 register is so called because it provides R1 information to the E cycle rather than to the I cycle.

In FIG. 74 various comparison circuits are shown which compare ER1 with R2-X, BR1 with R2-X, and BR1 with B. The purposes of the various comparisons are described in conjunction with the circuits which utilize them. The instruction decoding circuits are shown in detail in FIG. 76 et seq. of application Ser. No. 609,238.

(9.1.4) INSTRUCTION UTILIZATION (FIG. 75)

In FIG. 75, a plurality of general purpose registers (GR) receive information from the K REG under control of the ER1 SEL GR IN lines. The output of a general register selected by one of the lines: IR2 SEL GR, IB SEL GR, BR1 SEL GR, BR1+1 SEL GR lines will be applied to the general bus left or general bus right (GBL, GBR) for application to the register bus latch (RBL) shown in FIG. 73, and to the address adder (AA). The general registers, the GBL and GBR, and the controls therefor are shown in FIG. 114 et seq. of application Ser. No. 609,238. Other inputs to the address adder include a VFL LGTH FLD (VFL length field), the interrupt controls (IRPT CTRLS), and the IOP D field. The output of the address adder is applied to the SAR, and thence to the SAB (storage address bus) which applies address bits to storage. The address adder is also applied to the H register which serves as a sort of backup register for the SAR; addresses which are to be manipulated or compared are derived through the H register whereas utilization of address manifestations is through the SAR.

Also illustrated in FIG. 75 are the channel and unit selection circuits which respond to the H REG. Specifically, either the H REG or channel address signals from the console may be utilized to form a unit address on the UABO as well as channel selecting signals.

It should be borne in mind that FIG. 72 through FIG. 75 are intended as illustrative figures for reference, rather than being descriptive of the hardware as such. All of the hardware illustrated in FIG. 72 through FIG. 75 is illustrated, both in block diagram form, and in detail, in figures relating thereto, described hereinafter.

(10.0) INSTRUCTION SEQUENCING (10.1) Introduction

Instruction execution in the system is performed in two parts: an I time and an E time. The timing for a typical RX instruction is shown in FIG. 248 of application Ser. No. 609,238 (see said System/360 manual for details of an RX instruction).

I time (instruction time) is further broken down into two parts to perform "instruction handling," which includes the generation of storage addresses, and the gating of operands to the execution units from the general registers (GR's) or from the floating point registers (FPR's). The first part of I time is defined by the control trigger T1. The second part is defined by another control trigger T2. When the T1 and T2 cycles have been completed, the proper execution unit or units may be started. Both T1 and T2 may be repeated, as necessary, until the aforesaid functions are completed.

E time (execution time) is accomplished within different areas: the E unit, the IE unit and the branch (BR) unit. All instructions require the use of at least one execution unit, and some require the concurrent use of two execution units.

The following instructions use both the E unit and the IE unit:

ISK;
    SSM;
    LM;
    STM.

The following instructions require the BR unit as well as the E unit:

BALR (if R2≠0);
    BCTR (if R2≠0);
    BCT;
    BAL;
    BXH;
    BXLE.

When an execution unit is started, the I time control triggers begin their functions on the next instruction, overlapping the operation of the execution unit.

The T1 cycle is used to generate storage addresses when required. When this is completed, a logical control called TON T2 (turn on T2), which is developed from many conditions described in detail hereinafter, will initiate operand fetches from storage and set the T2 control trigger. During the T2 cycle, internal operands contained in either the general registers or floating point registers are gated to the execution unit. When the necessary conditions have been met, another logical control line called I TO E FER will cause the execution unit to start, unless an interruption has occurred.

While execution units are performing the actual functions of one instruction during a related E time, their "busy" state is recorded in control triggers located in the I unit. The last machine cycle for the E time conditions a turn off for a related busy trigger, IE BUSY or E BUSY; THE BRANCH UNIT USES THE IE BUSY TRIGGER TO INDICATE THE BUSY STATUS OF THE BR UNIT. Since the I time for one instruction is allowed to overlap (occur simultaneously with) the execution of a previous instruction, interference which could occur for many instructions is avoided by generating various "blocks" which control the following instruction. Blocking can occur to either part (T1 or T2) of the overlapped I time, and may be removed at various points during the handling of a current instruction. It is advantageous to allow instruction handling to proceed to a point which just precedes causing interference with instruction execution. By providing two points at which blocking of the I time functions of the next instruction is employed, a variable degree of overlap is obtained, which provides versatility necessary for maximum instruction handling speeds.

(11.0) INSTRUCTION COUNTER CONTROLS (FIG. 72 THROUGH FIG. 75)

The incrementer and gate select circuits control the normal advancing of the instruction counter and the normal fetching of instructions.

Instructions fetched from storage are buffered in either the A or the B register before being set into the IOP register for initial execution (see FIG. 72 through FIG. 75). The instruction counter register (ICR) contains 24 bits (numbered 0 through 23) and is advanced by means of two adders: the gate select adder for advancing the low order portion IC LO (bits 20-22) and the incrementer for advancing the instruction counter high order portion ICHO (the remaining bits). The gate select adder works in conjunction with the gate select register (GSR) to select gates from the A and B registers to the IOP register.

(11.1) Introduction

All instructions are executed in two parts: an I time and an E time. I time of one instruction may be overlapped with E time of the previous instruction. The instruction counter register GSR, also maintain the ICR with a proper address for interrupt purposes.

The IC controls also generate the instruction fetch addresses and make normal IC fetches. The addresses are generated by adding, in the incrementer, and appropriate, small increment amount to the ICR. The IC controls attempt to make an IC fetch as soon as an empty instruction buffer (A or B REG) condition is detected, but any instruction in the process of execution may block out IC fetches if an IC fetch would cause interference with the instruction execution. If the IC fetches are continuously blocked by instruction executions, the I unit ultimately will exhaust all instructions in the buffers. At this time, the IC block will drop, allowing IC fetches to be made and instruction execution to resume. Normally the instruction buffers will not be exhausted before IC fetches are made. However, special logic has been incorporated to insure that, except in unique situations, both buffers are not emptied. In other words, fetches relating to executions take priority over instructions fetches until the A and B registers no longer have a full instruction left; then, one instruction fetch is allowed notwithstanding the need for operands.

First there is a physical description of the IC data flow. IC addressing, advancing, fetching and recoveries are discussed, in that order.

(12.0) BRANCHING

(12.1) Branch operations

(12.1.1) INTRODUCTION TO BRANCH CONTROLS

In this system branch fetches (i.e., fetches of instructions which are themselves the subjects of branch instructions) are made at TON T2 in the same way as are operand fetches. For branch fetches, however, return addresses are generated for both the J register and the A register or the B register, whichever is appropriate to the branch-to address: if bit 20 of the address is zero, the fetch is returned to A; if bit 20 of the address is one, the fetch is returned to B.

Since two instruction buffers register (A, B) are provided, branch instructions also initiate a fetch to fill the second buffer. This fetch, which is obtained from the storage location following the location of the subject instruction, is called the branch-plus-1 (BR+1) fetch. The address for this fetch is computed during T2 of the branch instruction. The BR+1 fetch request is normally made at the I to E transfer. A return address for this fetch is generated for the register of the AB buffers opposite to the register designated for the branch fetch.

At some predetermined time of the branch execution a tests complete (TSTS CMPLT) latch is turned on. During this cycle a branch successful (BR SUCC M) line attains a value according to whether or not the branch was successful.

If the branch operand returns before TSTS CMPLT of any branch, the operand is inhibited from gating into the AB register; but in any case, the branch operand is returned to the J REG. If a successful branch is detected during TSTS CMPLT, and the branch operand has already been loaded into the J REG, the branch operand in the J REG is then gated to the proper half of the AB register by TSTS CMPLT. If the branch operand returns after TSTS CMPLT has been turned on, the returning operand is gated into the proper register of the AB buffers if, and only if, the branch is successful; if not, the operand is put to no use whatever.

The branch+1 fetch is always made at a time late enough so that the operand returns after TSTS CMPLT has been turned on. If the branch is successful, the BR+1 operand is gated into the appropriate half of the AB register upon its return. If the branch is unsuccessful the BR+1 operand is blocked upon its return, and in fact is put to no use whatever.

If a branch is unsuccessful, normal processing of the next instruction effectively starts at the same time as TSTS CMPLT is turned on. If a branch is successful, the subject instruction effectively starts as soon as the instruction is available in the AB register. During TSTS CMPLT of *successful* branches, the gate select register is updated to the subject address, and the ICR is then set on the cycle following TSTS CMPLT.

The following sections contain detailed discussion of the branch fetch, the branch-plus-1 fetch and the methods of terminating successful and unsuccessful branches. Certain features unique to each branch are also discussed when these features have an impact on the aspects of branching which are being discussed.

For the three RR format branches {Branch on Condition (BCR), Branch and Link (BALR), and Branch on Count (BCTR)} no branch is ever made if the R2 field is zero. If the R2 field is zero in a BCTR instruction, the E unit is utilized to decrement the contents of the general register specified by R1. If the R2 field is zero in a BALR instruction, the E unit is utilized to store the right half of the PSW in general register R1. If the R2 field is zero in a BCR instruction, the IE unit is utilized to perform a NO OP. In all of these, the branch unit is *not* started and no branch fetches are made. Therefore, these instructions are not considered to be branches when R2=0, in the following sections.

The Execute instruction (XEQ) is processed by branch controls and, therefore, is included whenever a general reference to "branches" is made.

(13.0) I UNIT EXECUTION

I unit execution comprises the performance of actual data manipulation within the I unit (rather than within the E unit). The functions executed within the I unit are primarily channel instructions and supervisory type instructions such as setting the program and the system mask, loading the PSW, setting or inserting keys, and diagnose. In addition, the IE unit cooperates with the E unit on the performance of multiple load and store operations. The IE unit comprises essentially a control section (FIG. 277 et seq. of application Ser. No. 609,238) and a channel communications section (FIG. 308b et seq. of application Ser. No. 609,238).

(14.0) INTERRUPTIONS

(14.1) Interruption handling

The sections hereunder describe the response of the system to both internally and externally generated interruption signals.

Interruptions are first defined in general terms; then the individual signals are further defined, classified, and assigned servicing priorities consistent with basic architectural criteria set forth in said System/360 Manual and the implementation plan of the present embodiment. The detection of interruptions and the means by which interruption processing is initiated are examined next, followed by detailed descriptions of the specific sequences associated with each type of interruption. Actual circuits are described in sections hereunder.

(15.0) VARIABLE FIELD LENGTH DATA FLOW

(15.1) Brief description of VFL data flow (FIG. 373)

The variable field length portion of said environmental system is designed as a semi-independent unit, which is part of the execution unit, but is designated herein as "VFL," whereas the binary portion of the E unit is designated herein as "E unit," as well as the term "E unit" meaning both the binary and VFL portions. The VFL portion is concerned primarily with SS format instructions, which include primarily data handling, logical operations, and decimal arithmetic.

The data input to the VFL data flow is from the K and L registers in the E unit, which are used as temporary storage buffer registers for complete 64-bit storage words. Source operands for VFL are fetched from main storage through the J register to the K REG or L REG. The K REG is used for operand No. 1 and the L REG is used for operand No. 2. Results of an operation are placed in the K REG, and at proper times, as determined by rules of storage accessing, those bytes of the K REG which were changed as a result of the operations are returned to storage.

There are several main data paths in the VFL data flow. Normal operands are supplied by the K REG or L REG and are gated through the left byte gate (LBG) or the right byte gate (RBG). From the LBG/RBG, operands can be supplied to the main adder, to the "AND, OR, EXCLUSIVE OR (mask)," which is referred to herein as the AOE. In addition, operands which pass through the LBG may be supplied to the digit buffer-digit counter (DB/DC) as well as to the VFL TO AA & PSW gate.

Another input to the VFL data flow is through the direct data and outkey ingate, which controls the application of a byte of data from an external, non-conforming unit (see said System/360 Manual) or from the outkeys circuit of the BCU, which supplies storage protection keys derived from the storage unit. As is seen in FIG. 373, the DB/DC, the AOE, and the DA may each supply results to the K BUS GATE for application over the K BUS back to the K register in the E unit. In addition, the DB/DC may receive results from the DA, may receive results with the digits reversed in position from the AOE, and the digit buffer portion (DB) may receive outputs from the digit counter portion (DC) of the DB/DC.

Another data path is from main storage to the J and K registers, through the LBG, to the direct data register (DD REG). This data is kept available until the next time it is loaded as the result of a write direct instruction. A non-conforming external unit can make whatever use it wishes of the byte data which is stored therein.

Byte selection from among the eight bytes of a 64-bit storage word is accomplished under control of the S and T pointers. The S pointer output selects a correct byte from the RBG, and the T pointer selects a correct byte from the LBG. In addition, the output of the T latch is utilized to control gating of the result byte back into the K register; it is to be noticed that this is an unincremented amount so that it would be specifying, for instance, byte 3 while the output of the T register (which, when decoded, is called T PTR) would be selecting byte No. 4 in the LBG.

Still another data path shown in the data flow of the VFL portion is from IOP through the Y and Z registers, to the AOE and to the VFL TO AA & PSW gate.

Other data flow paths and main controls for VFL data flow are apparent in FIG. 373.

*(15.2) Right and left byte gates (FIG. 374 through FIG. 376)*

(15.2.1) RBG (FIG. 374)

In FIG. 374, a plurality of RBG signals 0–7, P are generated by corresponding OR circuits 1 in response to a plurality of related AND circuits 2. The AND circuits 2 will select from the K or L register in dependence upon the presence of a signal on a GATE K WITH S TGR or GATE L WITH S TGR lines, respectively. A particular byte of the select register is then chosen by one of the outputs 0–7 of the S which relates to the parity bit (shown at the bottom of FIG. 374) allows forcing the parity bit of the RBG in response to a signal on a FORCE RBG P line.

(15.2.2) LBG (FIG. 375)

In FIG. 375, a plurality of LBG lines 0–7, P are energized by related OR circuits 3 in response to corresponding AND circuits 4. The inputs to the AND circuit 4 are the eight bytes of the K register and the digit counter/ digit buffer (DC/DB). If one of the K registers bytes is to be selected, a signal appears on a GT TD OUT line; when the DC/DB is to be gated, a signal appears on a GT DC/DB TO LBG line. Whenever the K register is selected, the particular byte involved is chosen by a corresponding output 0–7 from the T pointer on T PTR lines.

(15.2.3) BYTE GATE SIGN DETECT (FIG. 376)

Figure 376:
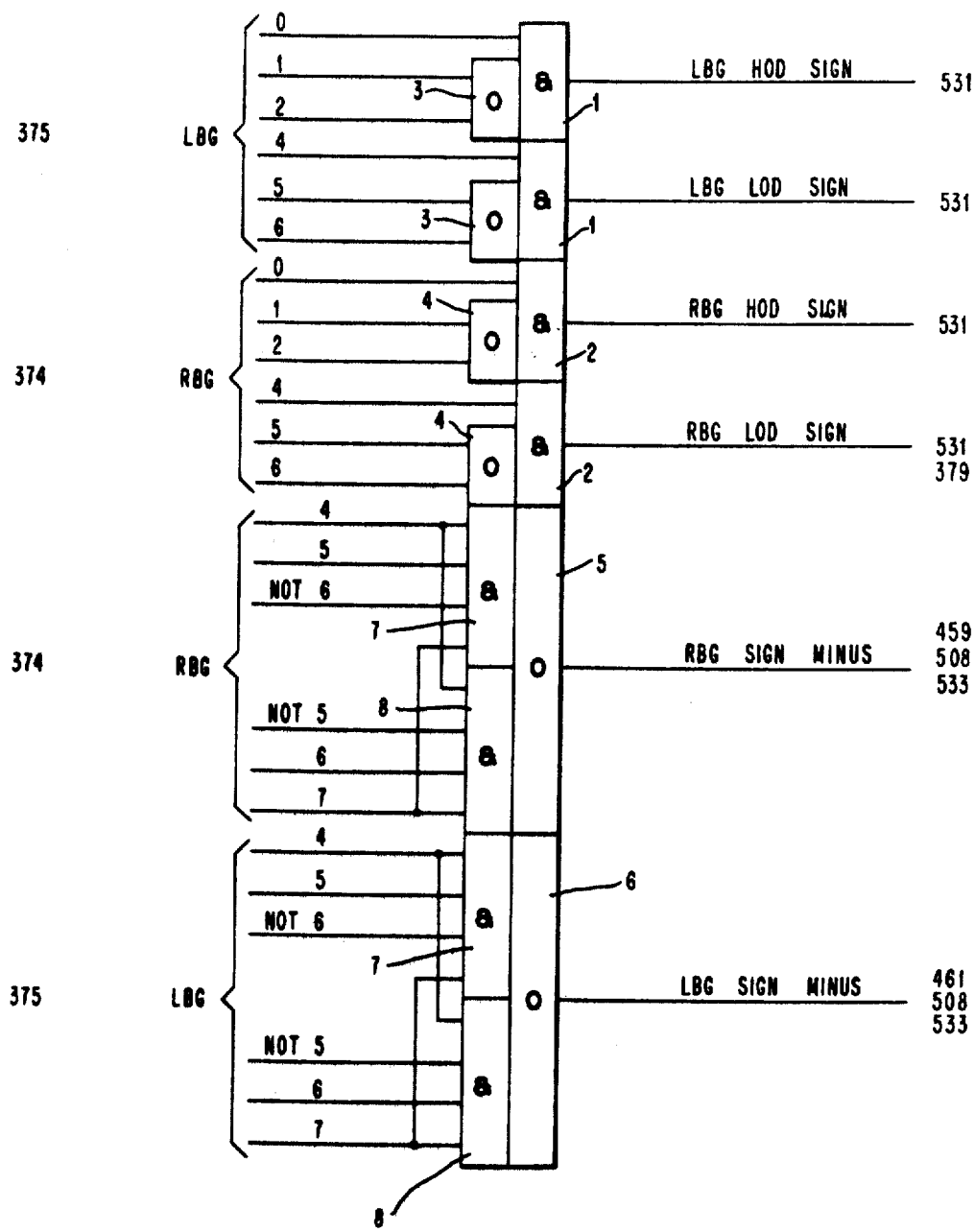

In FIG. 376, the byte gate sign detect circuit comprises a plurality of AND circuits 1, 2 each of which is fed by a related OR circuit 3, 4. The AND circuits 1, 3 respond to bits 0–2 and 4–6 of the left byte gate so as to generate signals on the LBG HOD SIGN and LBG LOD SIGN lines. The AND circuits 2 and OR circuits 4 respond to the RBG to generate signals on the RBG HOD SIGN and LBG LOD SIGN lines. These circuits merely recognize when either the high order digit or the low order digit of either the left or right byte comprises a sign due to the fact that it represents a value of 10 or more in the extended binary coded decimal code, as is fully described in said System/360 Manual.

At the bottom of FIG. 376, right and left minus signs are detected by OR circuits 5, 6 in response to related AND circuits 7, 8. The OR circuit 5 relates to the right byte gate and the OR circuit 6 relates to the left byte gate. The AND circuits 7 both respond to bits 4, 5 and not 6 of the related gate, and the AND circuits 8 respond to not 5, 6 and 7 of the related gate. This detects minus signs as set forth in said System/360 Manual.

(15.2.4) EDIT DECODE (FIG. 377 THROUGH FIG. 379)

*(15.3) Right and left digit gates (FIG. 377 through FIG. 384)*

Figure 377:
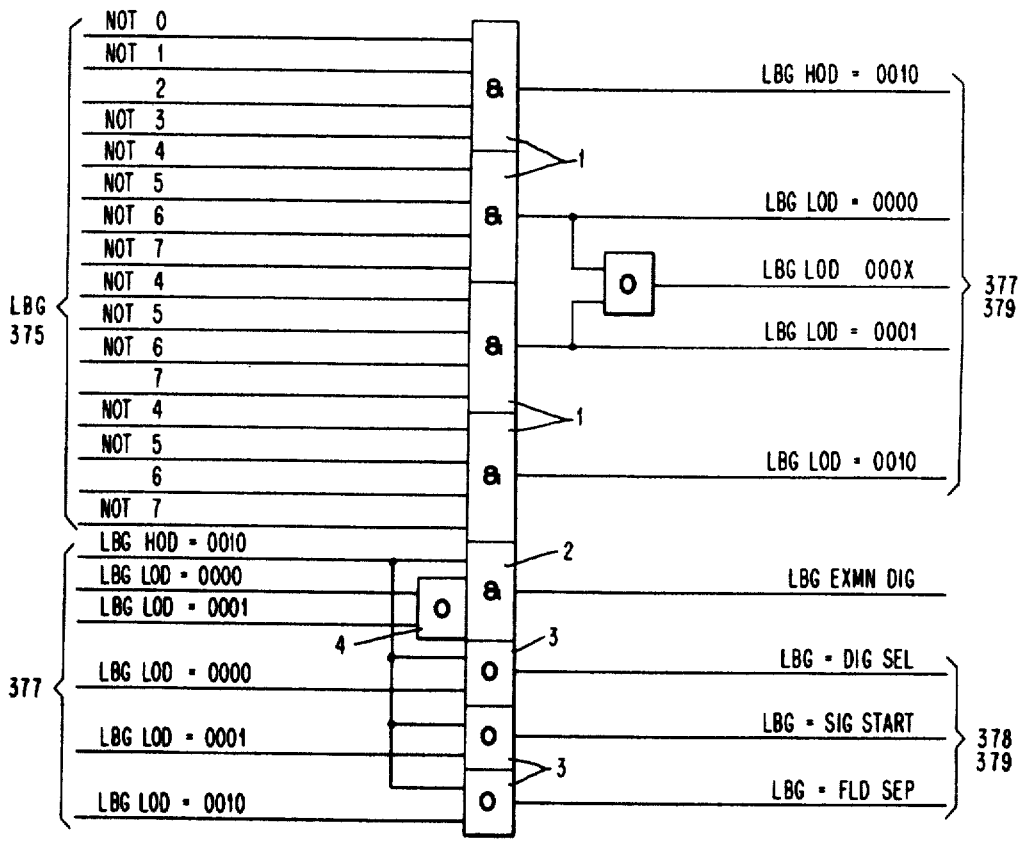

At the top of FIG. 377, a plurality of AND circuits 1 respond to left byte gate signals so as to generate different binary coded combinations thereof in a well-known manner. These are utilized by an AND circuit 2 in a plurality of OR circuits 3 at the bottom of FIG. 377 to decode signals on the LBG EXMN DIG, LBG=DIG SEL, LBG=SIG START, and LBG=FLD SEP lines.

Figure 378:
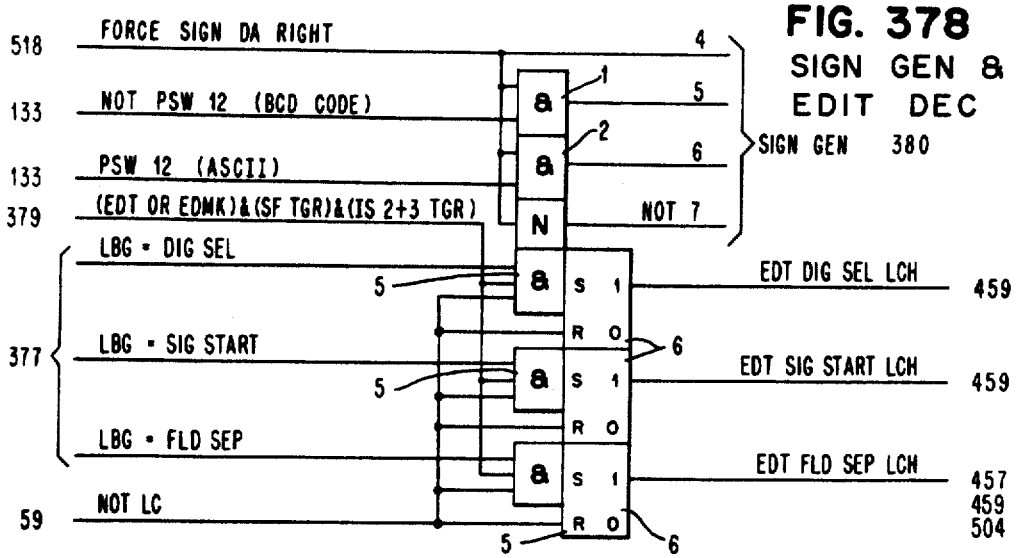

At the bottom of FIG. 378, the signals generated by the OR circuits 3 at the bottom of FIG. 377 are applied to a plurality of AND circuits 5, each of which is gated by an edit control signal, and by a related one of the outputs from the OR circuits 3 in FIG. 377. These cause the setting of related latches 6, which generate signals on the EDT DIG SEL LCH, EDT SIG START LCH, and EDT FLD SEP LCH lines.

Figure 379:
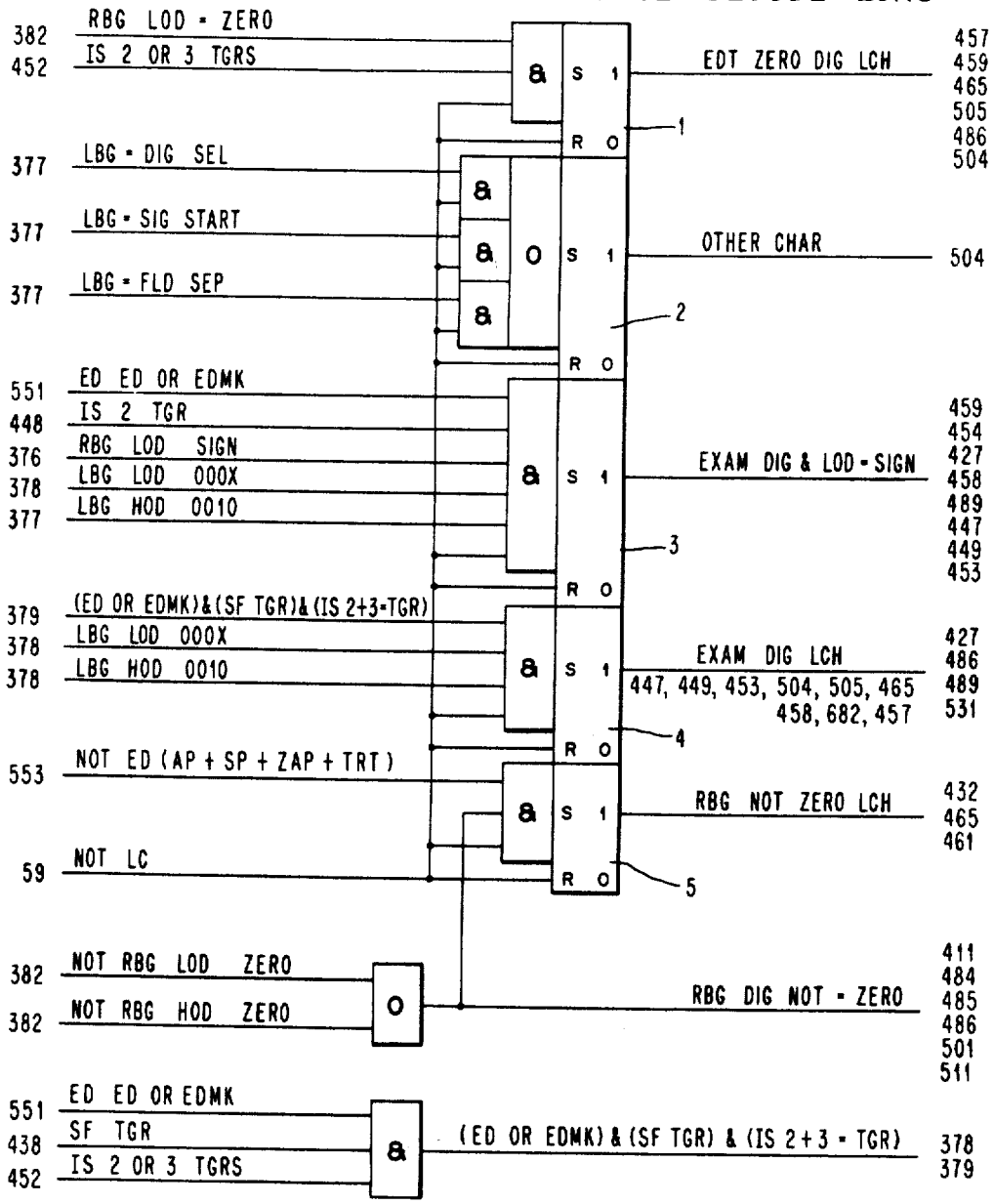

The outputs of FIG. 377 are also applied to the edit source decode latches of FIG. 379, where a latch 1 indicates that a zero digit has been sensed, a latch 2 indicates other characters sensed, a latch 3 indicates that the digit has been examined and that a low order digit is a sign digit, a latch 4 calls for the examination of a digit, and a latch 5 indicates that both the high order digit and the low order digit of the right byte gate are not equal to zero.

(15.3.1) SIGN GENERATOR (FIG. 378)

In FIG. 378, a sign generator generates sign bits for the low order digit input to the right digit gate. This comprises a plurality of signals on SIGN GEN lines 4–7. The operation is in accordance with said System/360 Manual, so as to generate the code 11 00 for a BCD+, or generate the code 10 10 for a + in the ASCII code. Thus, the presence of a signal on the FORCE SIGN DA RIGHT generates a bit 4, and generates a bit NOT 7, and operates a pair of AND circuits 1, 2 in FIG. 378. The AND circuit 1 is operative during the BCD code so as to generate a bit 5, and the AND circuit 2 is operative in the ASCII code so as to generate bit 6.

(15.3.2) RDG (FIG. 380)

Figure 380:
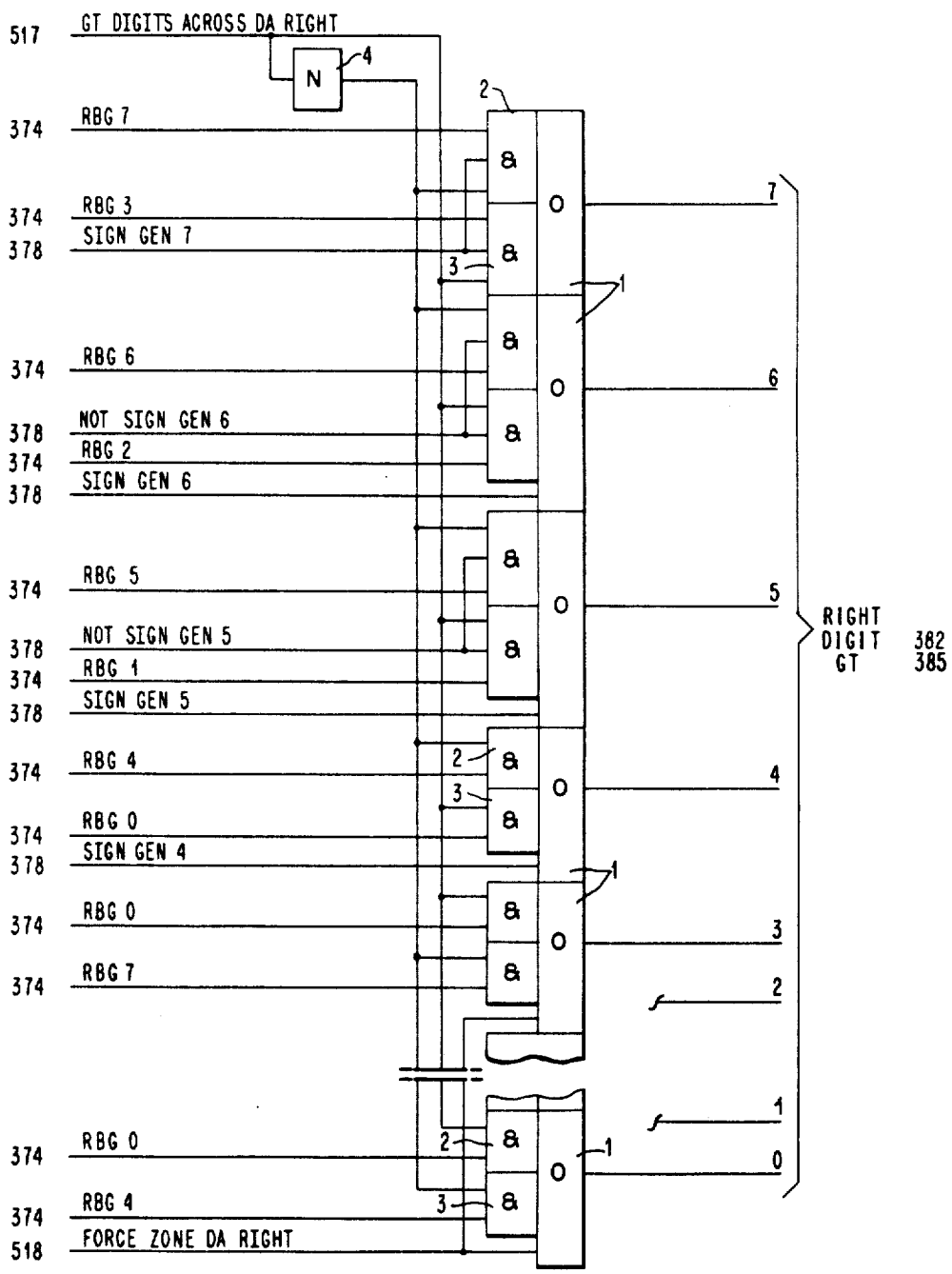

In FIG. 380, a plurality of right digit gate lines 0–7 are each energized by a corresponding OR circuit 1, each of which responds to a related pair of AND circuits 2, 3.

The AND circuits 2, 3 permit gating digits from the RBG through the RBG either straight or crossed. The AND circuits 2 will gate the digits straight in response to a gating signal from an inverter 4 whenever there is no signal on the GT DIGITS ACROSS DA RIGHT line. However, when said signal is present, then the AND circuits 3 will gate digits across, transposing digits 0-3 of the RBG with digits 4-7 of the RIGHT DIGIT GT. Additionally, all of the OR circuits 1 which correspond to bits 0-6 of the RIGHT DIGIT GT are also responsive to single inputs. The low order bits 4-6 respond to SIGN GEN bits 4-6, and the high order bits 0-3 are all responsive to a signal on the FORCE ZONE DA RIGHT line. The OR circuit 1 which corresponds with RIGHT DIGIT GT line 7 does not receive the sign input since when signs are being forced, that position is always forced to 0. This occurs by the lack of a signal on the SIGN GEN 7 line due to the fact that there will be a signal on a SIGN GEN NOT 7 line when a sign is being generated in FIG. 378.

(15.3.3) LDG (FIG. 381)

The left digit gate is shown in FIG. 381. It comprises a plurality of AND circuits 1, 2 each of which corresponds to a corresponding bit from the left bus gate, on LBG line 0-7. Bits 0-3 are gated by a signal on the GT HOD TO DA LEFT line which is applied to the AND circuits 2, and bits 4-7 are generated by an AND circuit 1 in response to a signal on the GT LOD TO DA LEFT line.

(15.3.4) TRUE COMPLEMENT ZERO DETECT (FIG. 382)

In FIG. 382, a circuit which detects zero in either the high order digit or the low order digit of the output of the right digit gate is shown to comprise a pair of OR circuits 1, 2 which generate signals on NOT RBG HOD=0 and NOT RBG LOD=0 lines. The OR circuit 1 will respond to any one of the bits 0-3 from the right digit gate, and the OR circuit 2 responds to bits 4-6 of the right digit gate as well as to an AND circuit 3. The AND circuit 3 responds to an inverter 4 when there is no output from an AND circuit 5. When the AND circuit 5 is operated, that makes it possible to ignore the low order bit from the right digit gate determining whether or not a zero is present. The AND circuit 5 operates in response to signals on the DA CARRY TGR, RSLT BYTE NOT ZERO T3 TGR, CPMNT ADD, VFL T2 TGR, NOT T8 TGR, and IS 2 TGR lines.

(15.3.5) PARITY ADJUST (FIG. 383 AND FIG. 384)

Parity is adjusted for both the right and left gates before the parity bit is applied to the decimal adder. In FIG. 383, a right parity adjust circuit comprises essentially an OR circuit 1 which is set by four AND circuits 2-5. The AND circuit 2 permits using the parity as received from the RBG in response to a signal on a GT RBG P TO DA line. The AND circuit 3 gates the parity of the high order bit only in response to a GT LOD B IN NOT GT HOD line. This parity is generated by an EXCLUSIVE OR circuit 6 in response to the high order bits. The AND circuit 4 responds to an EXCLUSIVE OR circuit 7 when there is a signal on a GT HOD DEC & LOD DEC line, the EXCLUSIVE OR circuit 7 sensing the change in the parity bit as a result of the operation of the decimal converter at the input to the decimal adder, which is described in the next following section. The AND circuit 5 responds to an EXCLUSIVE OR circuit 8 which tests the odd or even character for the combined output of the EXCLUSIVE OR circuit 9 and 10; the AND circuit 5 is operated on the control of a signal on a GT P LOD V INVRT SIGN V HOD 4-5 line.

Left parity adjust is more simple as illustrated in FIG. 384. A signal on the LEFT P ADJUSTED line is generated by an OR circuit 1 in FIG. 384 in response to a signal on a FORCE P LEFT line, or in response to any one of three AND circuits 2-4. The AND circuit 2 responds to parity from LBG when there is a signal on a GT LEFT P STRAIGHT line. The AND circuit 3 responds to the output of an EXCLUSIVE OR circuit 5 which senses the parity of the high order digit, the AND circuit 3 operating when there is a signal on a GT HOD P LEFT line. The AND circuit 4 responds to a signal on a GT LOD P LEFT line when there is an output from the EXCLUSIVE OR circuit 6 which in turn is responsive to the parity of the low order digits and the input parity.

(15.4) Decimal adder

The decimal adder comprises essentially an input decimal converter, a binary adder, and an output decimal converter. Conversion takes into account that the nines complement of decimal +6 is equal to the ones complement of the raw decimal input. The decimal adder also includes parity prediction circuits in accordance with well known principles of arithmetic.

(15.4.1) TRUE/COMPLEMENT AND EXCESS 6 GATE (FIG. 385)

The true/complement and EXCESS 6 gate is shown in FIG. 385 to comprise two portions, one for the low order digits (bits 4-7), and one portion for the high order digits (bits 0-3).

Bits 4-7 of the true/complement and EXCESS 6 gate of FIG. 385 comprises essentially a plurality of OR circuits 1, 2 each of which is fed by related AND circuits 3-5. The AND circuits 3-5 recognize signals on a GT LOD CPMNT, INVRT SIGN, TO P ADJ AND T/C GATE, GT LOD BIN TRUE, and GT LOD DEC TRUE lines to gate correct ones of the right digit gate bits and their complements through to the decimal adder in dependence upon whether the low order digit is to be gated complemented (both for binary and decimal) or whether it is to be gated binary true or decimal true. The manner in which this circuit operates is in accordance with well-known principles of EXCESS 6 arithmetic, so as to create those bits at the adder input which are called for as shown in the following table:

| DIGIT GT DEC | | | | DIGIT GT DEC+6 | | | |
|---|---|---|---|---|---|---|---|
| 4 | 5 | 6 | 7 | 4 | 5 | 6 | 7 |
| 0 | 0 | 0 | 0 | 0 | 1 | 1 | 0 |
| 0 | 0 | 0 | 1 | 0 | 1 | 1 | 1 |
| 0 | 0 | 1 | 0 | 1 | 0 | 0 | 0 |
| 0 | 0 | 1 | 1 | 1 | 0 | 0 | 1 |
| 0 | 1 | 0 | 0 | 1 | 0 | 1 | 0 |
| 0 | 1 | 0 | 1 | 1 | 0 | 1 | 1 |
| 0 | 1 | 1 | 0 | 1 | 1 | 0 | 0 |
| 0 | 1 | 1 | 1 | 1 | 1 | 0 | 1 |
| 1 | 0 | 0 | 0 | 1 | 1 | 1 | 0 |
| 1 | 0 | 0 | 1 | 1 | 1 | 1 | 1 |
| 1 | 0 | 1 | 0 | 0 | 0 | 0 | 0 |
| 1 | 0 | 1 | 1 | 0 | 0 | 0 | 1 |
| 1 | 1 | 0 | 0 | 0 | 0 | 1 | 0 |
| 1 | 1 | 0 | 1 | 0 | 0 | 1 | 1 |
| 1 | 1 | 1 | 0 | 0 | 1 | 0 | 0 |
| 1 | 1 | 1 | 0 | 0 | 1 | 0 | 1 |

In FIG. 385, an OR circuit 6, and an inverter 7 recognize the case where the sign of the low order digit is to be reversed, and an OR circuit 8 causes the AND circuit 4 to operate identically for decimal and binary true insofar as the low order bit is concerned.

At the bottom of FIG. 385, a plurality of circuits 9 operate identically with the circuits 1-8 with the exception of the fact that high order bits and high order control lines are utilized, and there is no invert sign input to the circuit 9.

(15.4.2) BINARY ADDER (FIG. 386)

In FIG. 386, the binary adder portion of the decimal adder is shown. This comprises two 8-bit sections, each of which is identical to the adder groups shown in said environmental system in the address adder and in the main adder. The low order digit portion is shown in block form, whereas the high order digit portion is represented by a single block 1 at the bottom of FIG. 387. A carry can be recognized at the low order portion of the adder by a signal on a DA CARRY IN line. Bits 4–7 of the DA T/C IN lines from the true/complement-+6 circuit as well as bits 4–7 from the left digit gate are applied to the low order half of the adder. These bits together with the DA CARRY IN are utilized to generate half sums 4–7 and binary sums 4–7. In addition, a carry generator 2 generates a carry out of the 4 bit group which is combined in an OR circuit 3 with a signal on a FORCE CARRY TO HOD line. Thus, a signal on a C OUT LOD can be generated as a result of the arithmetic in the low order bit, or as a result of forcing of a carry. The carry out of the low order is applied to the high order adder portion 1. Bit carries are generated in the circuit 4 in a usual fashion, and are combined with transmit and generate bits from a circuit 5 in an AND circuit 6 and an OR circuit 7 so as to compare the predicted carry with a generated carry so as to cause an EXCLUSIVE OR circuit 8 to generate a carry error signal for the low order digit on a C ERR LOD line.

The high order half of the adder operates in a same fashion except for the fact that bits 0–3 are applied thereto along with the signal on the C OUT LOD line, and there is no forced carry into the high order portion 1.

(15.4.3) TRUE/COMPLEMENT-DECIMAL CORRECTION CIRCUIT (FIG. 387)

In FIG. 387, a plurality of latches 1 each correspond to one of the bits 4–7 of the low order portion of the adder. The input to the latches 1 comprise a plurality of AND and OR circuits which operate so as to correct a binary result, as necessary, for complement outputs, and for decimal outputs. The conversion is in accordance with well-known principles of decimal addition with the exception of the fact that the circuit of FIG. 387 assumes the decimal digits having a value of 10 through 15 as well as decimal digits having a value of 0 through 9 may be applied at the input to the binary adder. This permits the decimal correction circuit to provide correct outputs that will match the predicted parity bit and therefore not cause a parity error even though decimal values greater than 9 are received at the input to the binary adder. Since correct parity results are obtainable, the application of an invalid decimal digit (having a value greater than 9) to the decimal adder will not cause a parity check, but instead will permit the sign detecting apparatus to cause a decimal data interruption as described in said System/360 Manual.

The operation of the decimal correct circuit of FIG. 387 is obvious in view of well-known principles of decimal correction, which are described and illustrated in said co-pending application of Robert Keslin. The difference in the operation of the circuit in FIG. 387 is apparent in view of the following charts, which illustrate decimal correction for values including decimal digits greater than 9.

DECIMAL CONVERSION [WITHOUT CARRY 0–9]

| BS0 | BS1 | BS2 | BS3 | C OUT | S0 | S1 | S2 | S3 |
|---|---|---|---|---|---|---|---|---|
| 0 | 1 | 1 | 0 | 0 | 0 | 0 | 0 | 0 |
| 0 | 1 | 1 | 1 | 0 | 0 | 0 | 0 | 1 |
| 1 | 0 | 0 | 0 | 0 | 0 | 0 | 1 | 0 |
| 1 | 0 | 0 | 1 | 0 | 0 | 0 | 1 | 1 |
| 1 | 0 | 1 | 0 | 0 | 0 | 1 | 0 | 0 |
| 1 | 0 | 1 | 1 | 0 | 0 | 1 | 0 | 1 |
| 1 | 1 | 0 | 0 | 0 | 0 | 1 | 1 | 0 |
| 1 | 1 | 0 | 1 | 0 | 0 | 1 | 1 | 1 |
| 1 | 1 | 1 | 0 | 0 | 1 | 0 | 0 | 0 |
| 1 | 1 | 1 | 1 | 0 | 1 | 0 | 0 | 1 |

DECIMAL CONVERSION [WITH CARRY 0–9]

| BS0 | BS1 | BS2 | BS3 | C OUT | S0 | S1 | S2 | S3 |
|---|---|---|---|---|---|---|---|---|
| 0 | 0 | 0 | 0 | 1 | 0 | 0 | 0 | 0 |
| 0 | 0 | 0 | 1 | 1 | 0 | 0 | 0 | 1 |
| 0 | 0 | 1 | 0 | 1 | 0 | 0 | 1 | 0 |
| 0 | 0 | 1 | 1 | 1 | 0 | 0 | 1 | 1 |
| 0 | 1 | 0 | 0 | 1 | 0 | 1 | 0 | 0 |
| 0 | 1 | 0 | 1 | 1 | 0 | 1 | 0 | 1 |
| 0 | 1 | 1 | 0 | 1 | 0 | 1 | 1 | 0 |
| 0 | 1 | 1 | 1 | 1 | 0 | 1 | 1 | 1 |
| 1 | 0 | 0 | 0 | 1 | 1 | 0 | 0 | 0 |

DECIMAL CONVERSION [VALUES OF 10–15]

| BS0 | BS1 | BS2 | BS3 | C OUT | S0 | S1 | S2 | S3 |
|---|---|---|---|---|---|---|---|---|
| 0 | 0 | 0 | 0 | 0 | 1 | 0 | 1 | 0 |
| 0 | 0 | 0 | 1 | 0 | 1 | 0 | 1 | 1 |
| 0 | 0 | 1 | 0 | 0 | 1 | 1 | 0 | 0 |
| 0 | 0 | 1 | 1 | 0 | 1 | 1 | 0 | 1 |
| 0 | 1 | 0 | 0 | 0 | 1 | 1 | 1 | 0 |
| 0 | 1 | 0 | 1 | 0 | 1 | 1 | 1 | 1 |

(15.4.4) DECIMAL CARRY TRIGGER (FIG. 388)

Figure 388:
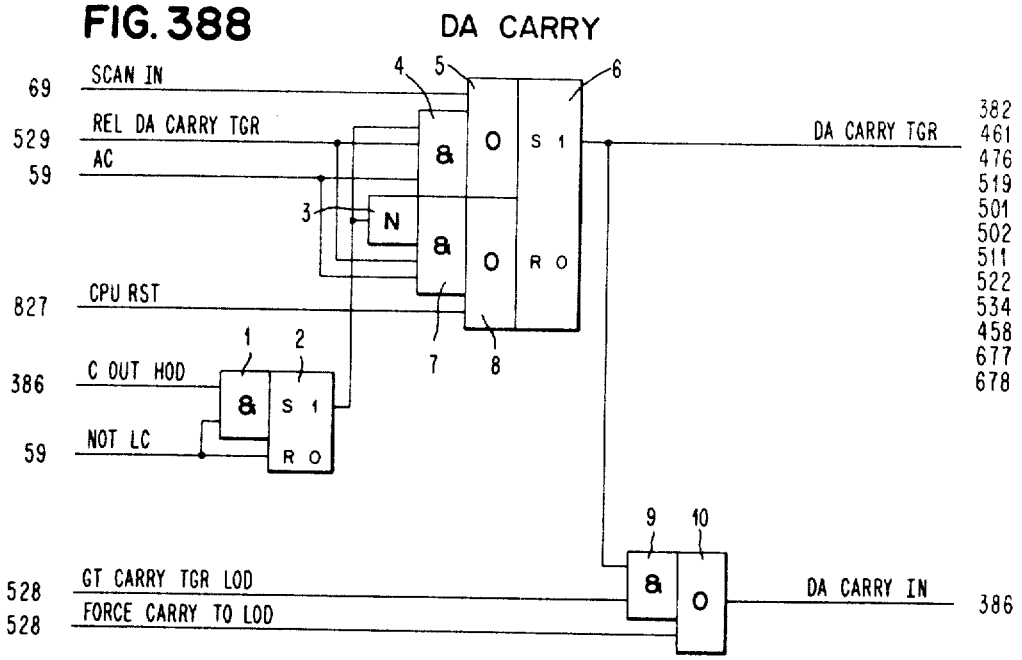

In FIG. 388, the signal on the C OUT HOD line which manifests a carry out of the decimal adder causes an AND circuit 1 to set a latch 2, the output of which is applied to an inverter 3 and an AND circuit 4. The AND circuit 4 causes an OR circuit 5 to set the carry trigger 6 whenever there is a signal present on the REL DA CARRY TGR line concurrently with a signal on the AC line. If there is no output from the latch 2, then the inverter 3 causes an AND circuit 7 to pass a signal through an OR circuit 8 so as to reset the trigger 6. The OR circuit 8 also responds to CPU RST. The output of these triggers 6 on the DA CARRY TGR line can be gated by a signal on a GD CARRY TGR LOD line through an AND circuit 9 so that an OR circuit 10 will generate a signal on the DA CARRY IN line, which carry is utilized as a carry into the lowest bit position of the decimal adder. The OR circuit 10 also responds to a signal on the FORCE CARRY TO LOD line.

Figure 389:
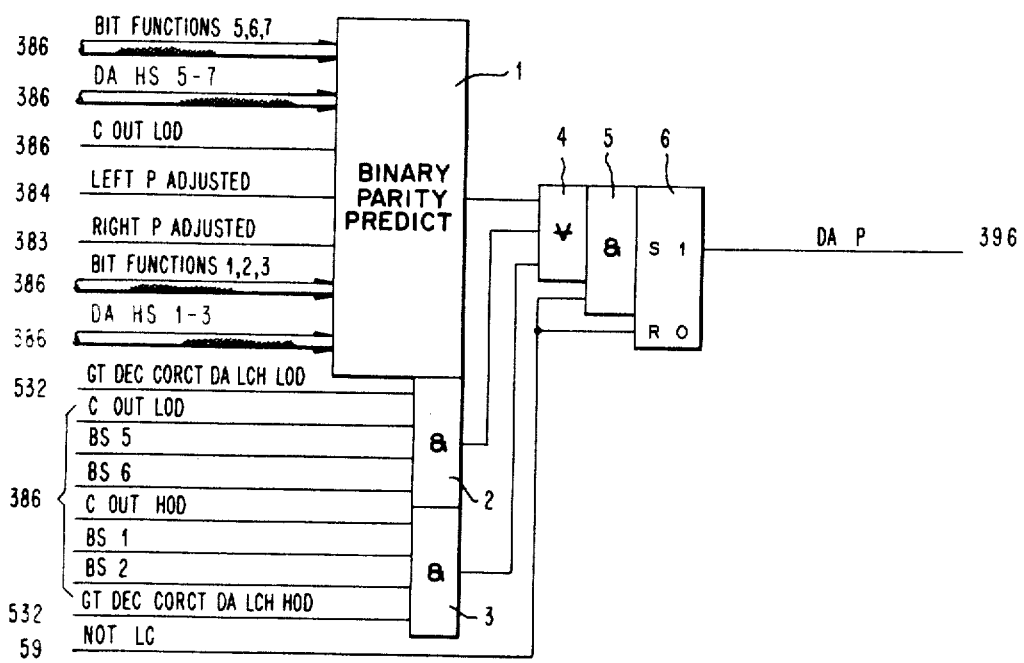

(15.5) DA Checking (15.5.1) DECIMAL ADDER PARITY PREDICT (FIG. 389)

In FIG. 389, an ordinary binary parity predict circuit is combined with the output of two AND circuits 2, 3 and an EXCLUSIVE OR circuit 4 so as to cause an AND circuit 5 to set a latch 6 whenever the output of the decimal adder requires a parity bit in order to achieve total odd parity. The binary parity predict circuit 1 is the same as illustrated in the address and main adders of said environmental system. The outputs of the AND circuits 2, 3 take into account the effect of carries in the parity prediction which is made by the circuit 1.

(15.5.2) DA HALF SUM CHECK (FIG. 390)

In FIG. 390, the digit adder half sums for bits 0–9 are combined in one EXCLUSIVE OR circuit 1 with the adjusted parity inputs from the right and left digit gates which are combined in an EXCLUSIVE OR circuit 2. Thus, an EXCLUSIVE OR circuit 3 will indicate when the total oddness or evenness of the half sums is not identical to the total oddness or evenness of the adjusted parity bits by generating a signal on a DA HS CHK line.

(15.5.3) DA ERROR CIRCUIT (FIG. 391)

In FIG. 391, carry errors for the high order digit and a low order digit are applied to an OR circuit 1 so that an AND circuit 2 can set a latch 3 whenever there is a parity error in either the high or low order digit. Also, the DA HS CHK signal from FIG. 390 is applied to an AND circuit 4 so as to set a latch 5 whenever there is a half sum check. The output of these two latches is gated through a pair of AND circuits 6, 7 so as to set related triggers 8, 9 whenever there is a signal on a SET DA ERR TGRS. Thus, either a decimal adder carry error or a decimal adder half sum error will be manifested on the DA C ERR TGR and DA HS ERR TGR lines, respectively. These two lines are fed to an OR circuit 10 so as to generate a signal on a DA ERR line, which signal is utilized in the I unit so as to effectively alter system response as a result of the error.

(15.6) Direct data and outkey ingate (FIG. 391)

In FIG. 391a, a plurality of OR circuits 1 will generate high order bit DD OR OUT KEY bits 0–3 which correspond to direct data bits 0–3, and which corresponds to outkeys 1–4. These are gated respectively by AND circuits 2, 3 in response to signals on the GT DD IN TO AOE and GT KEY TO AOE lines, respectively. High order direct data bits are gated through AND circuits 4 in response to the GT DD IN TO AOE signals.

Figure 392:
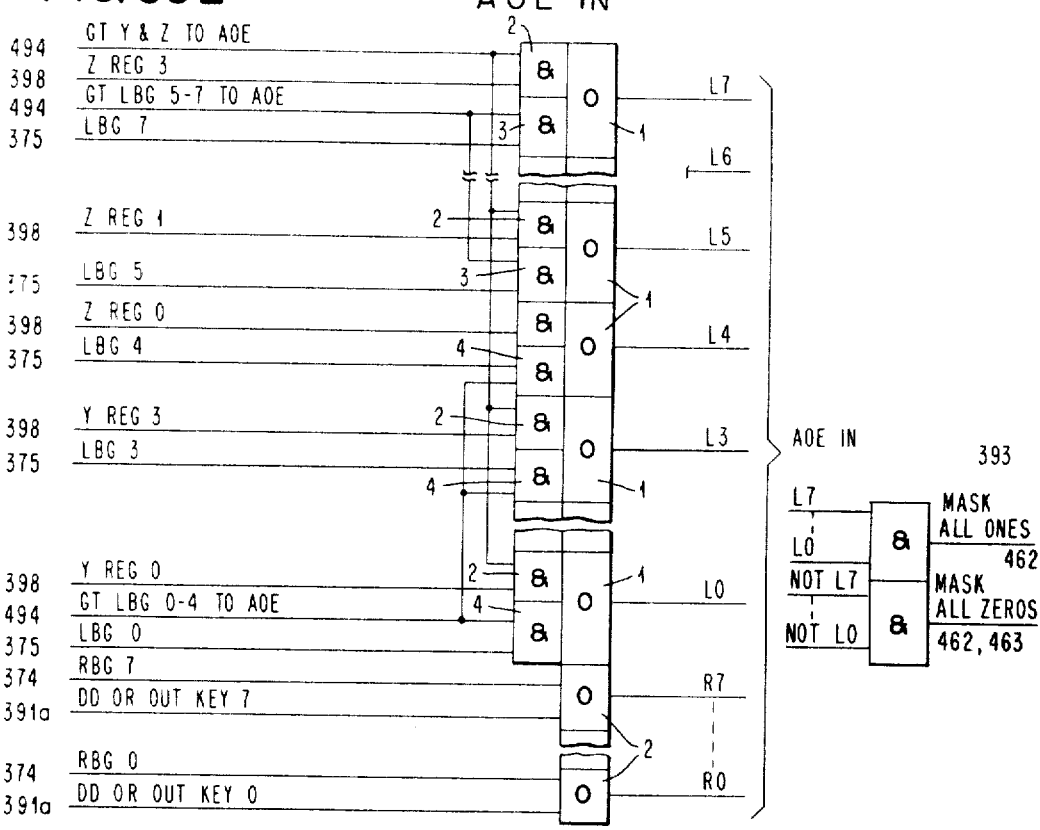
Figure 393:
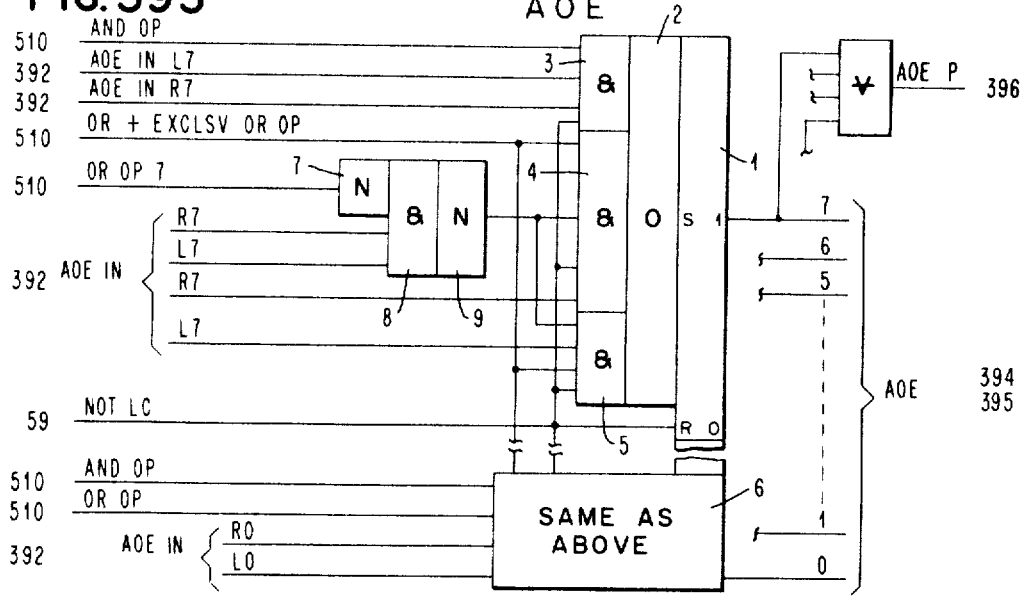

(15.7) AND-OR-EXCLUSIVE OR circuit (FIG. 392–FIG. 393)

In FIG. 392, inputs to the AOE circuit are generated by a plurality of OR circuits 1, 2. The OR circuits 1 are energized by corresponding AND circuits 2, 3, 4 in response to signals on the GT Y & Z TO AOE, GT LBG 5–7 TO AOE, and GT LBG 0–4 TO AOE lines, respectively. These lines correspond to inputs from the Z register, from the low order portion of the LBG, and from the high order portion of the LBG, respectively. In addition, a plurality of OR circuits 2 permit gating the right bus gate (RBG) or the DD OR OUT KEY signals 0–7 to the AOE.

In FIG. 393, the AND-OR-EXCLUSIVE OR circuit is shown to comprise a latch 1 settable by an OR circuit 2 in response to any one of three AND circuits 3–5 for each of the seven bits of the AOE. This is represented by the circuit 6 which would be identical to the circuits 1–5 except for the particular inputs thereto relating to bit 0 rather than to bit 7. The operation of the circuit is relatively simple, calling for the setting of the latch 1 whenever the particular logical operation being called for has been met by the right and left bits at the input thereto. If an AND OP is called for, an AND circuit 3 will cause the OR circuit 2 to set the latch 1 only if bit 7 is present from both AOE IN L and AOE IN R (left and right respectively). If an OR OP is called for, an inverter 7 will block an AND circuit 8 so that there will be a signal from an inverter 9 enabling either the AND circuit 4 or the AND circuit 5 to respond to a right or left bit 7, there also being a signal present on an OR & EXCLSV OR OP line. When the EXCLUSIVE OR is called for, there will be a signal on the OR & EXCLSV OR OP line, but there is no signal on the OR OP line so that an inverter 7 does not block an AND circuit 8, rendering the AND circuit 8 responsive to whether or not both bits R and L are present at the input thereto. If they are, then the AND circuit 8 will operate so that there will be no output from an inverter 9; if one of them is not present, then the AND circuit 8 will not operate, so that the AND circuit 9 will operate, and permit either the AND circuit 4 or 5 to operate in dependence upon which of the two bits is present. Thus, these circuits perform the EXCLUSIVE OR operation as well as the OR and the AND. As is to be expected, when an EXCLUSIVE OR operation is being performed, the latch 1 will be set when either one but not both of the bits are present at the input thereto.

(15.8) Digit buffer digit counter

(15.8.1) DIGIT BUFFER (DB) (FIG. 394)

Figure 394:
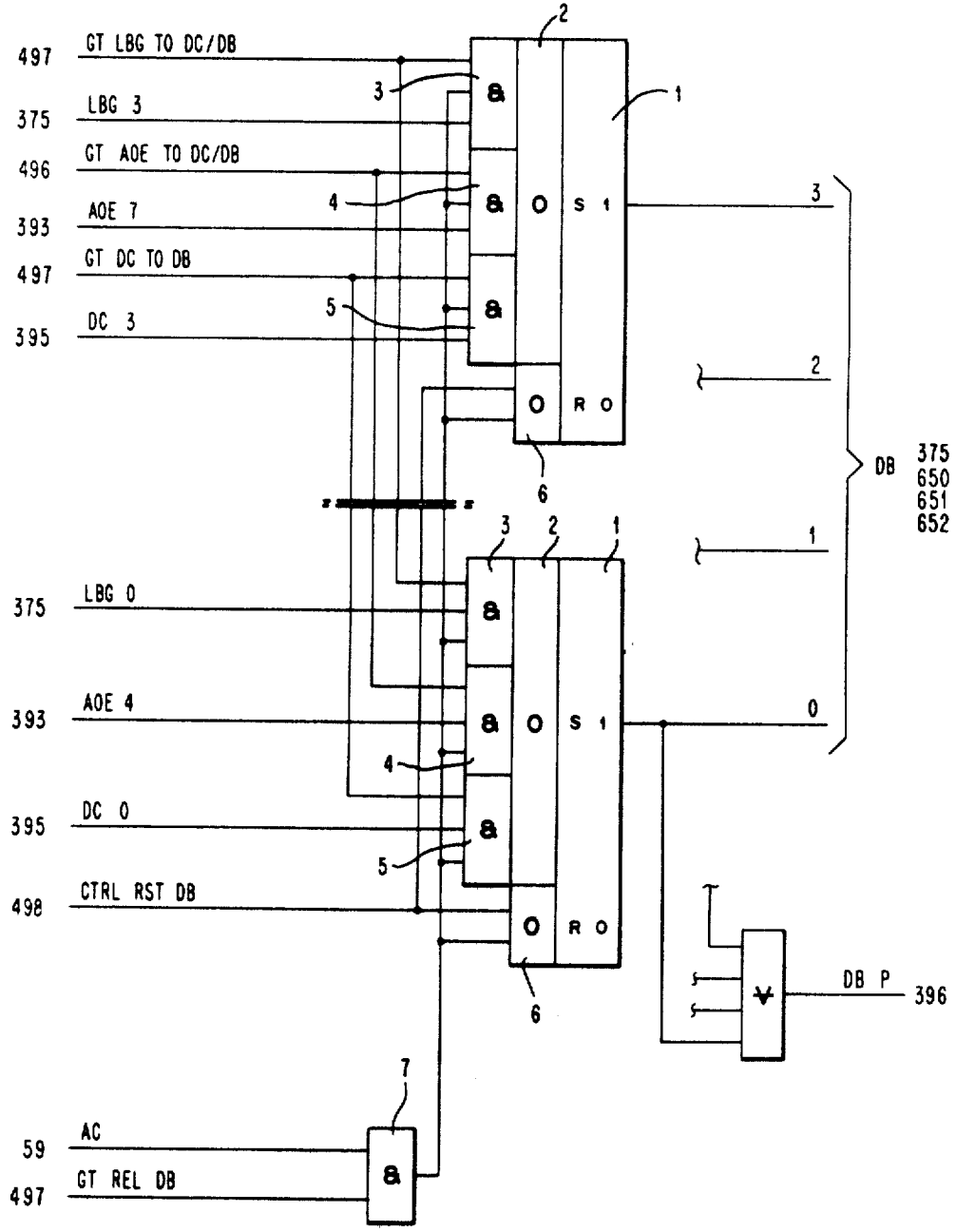

The digit buffer shown in FIG. 394 comprises a latch register including latches 1 which are settable by OR circuits 2 in response to related AND circuits 3–5. The AND circuits 3 respond to bits from the left byte gate when there is a signal on a GT LBG TO DC/DB line. The AND circuits 4 respond to bits from the A-O-E when there is a signal on the GT AOE TO DC/DB line. The AND circuits 5 respond to bits from the digit counter when there is a signal on a GT DC TO DB line. The triggers 1 are reset by OR circuits 6 in response to an AND circuit 7 which recognizes the signal on a GT REL DB line indicating that the triggers are to be released (that is not latched up in a frozen condition). Otherwise, the OR circuit 6 can respond to a signal on a CTRL RST DB line.

(15.8.2) DIGIT COUNTER (DC) (FIG. 395)

Figure 395:
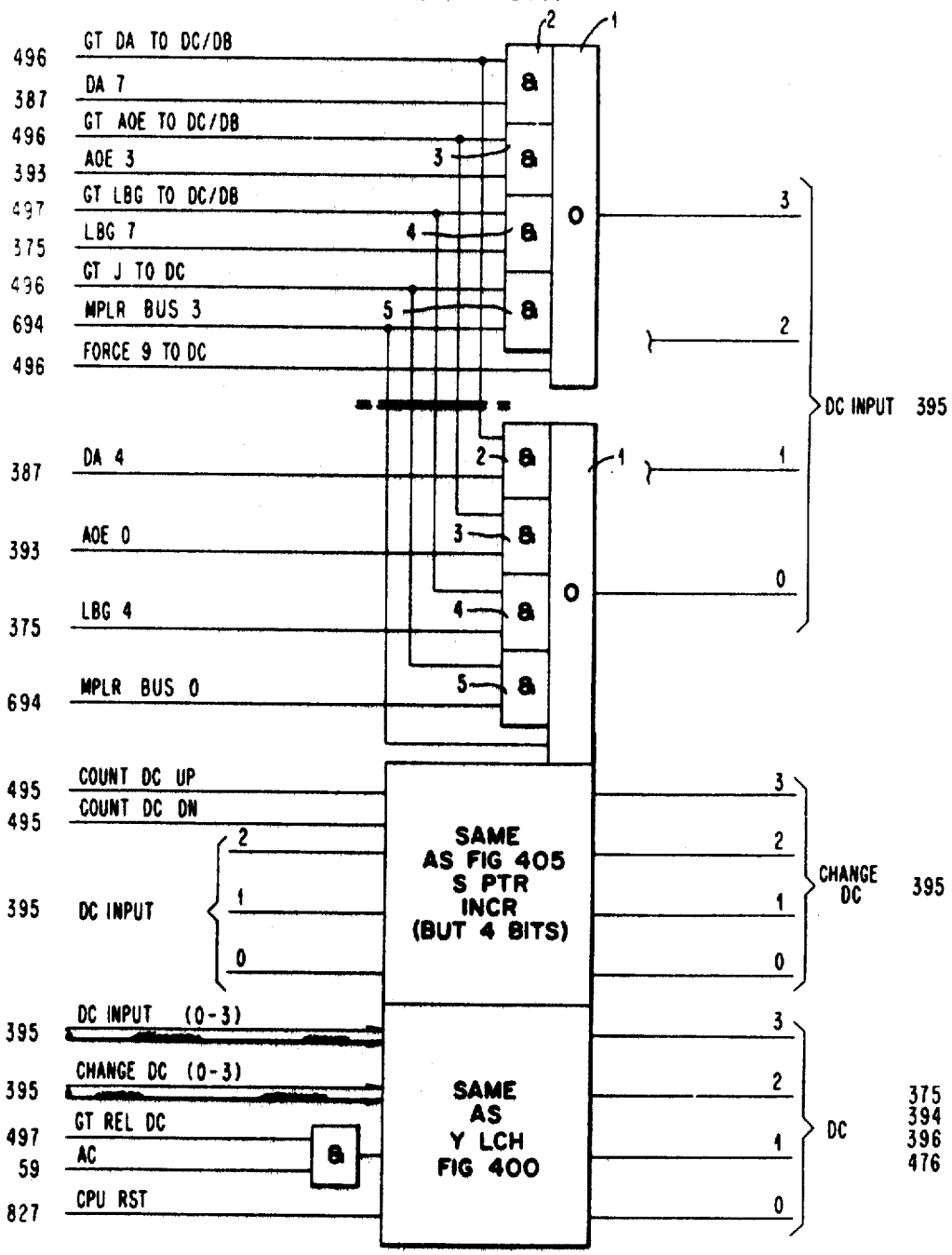
Figure 396:
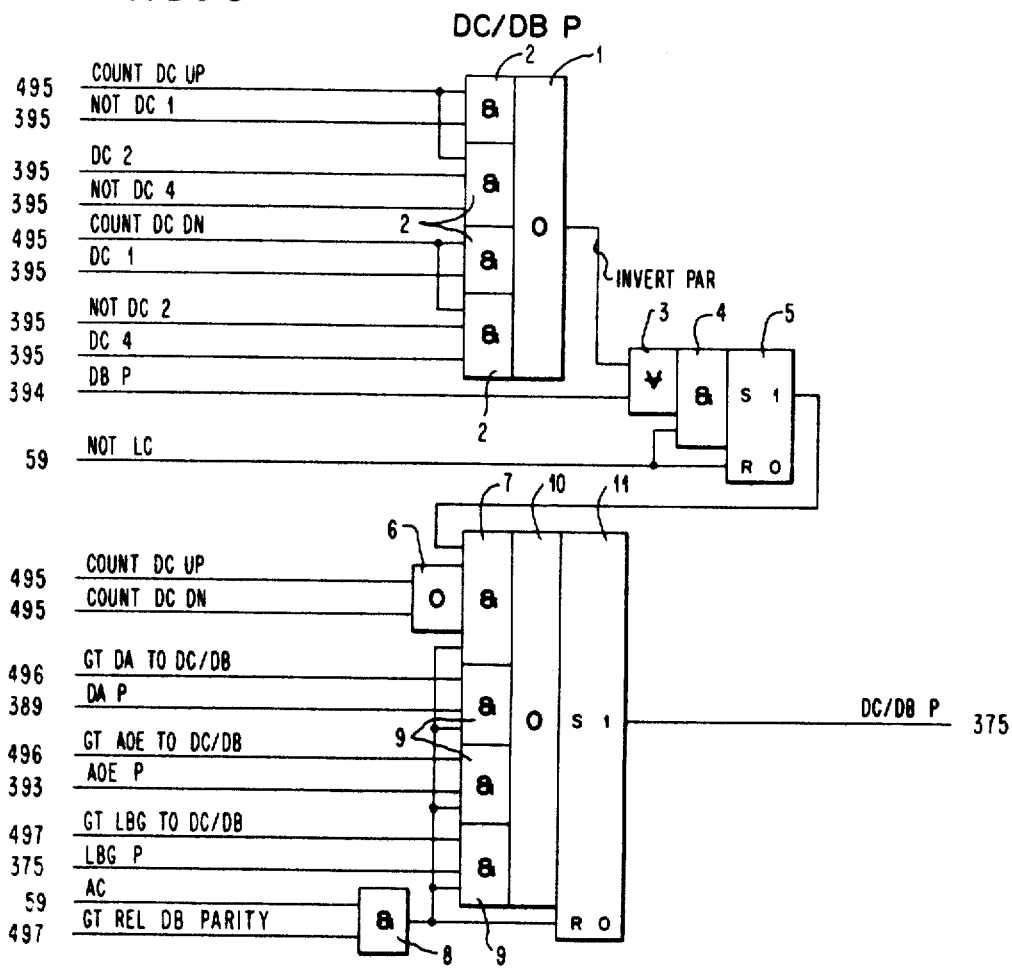

The digit counter shown in FIG. 395 comprises essentially three portions: an input portion, a change generator portion, and a latch portion the input to which comprises the EXCLUSIVE OR of the input bits and the change bits.

The input portion of the digit counter comprises a plurality of OR circuits 1 which recognize different input conditions at AND circuits 2–5. These AND circuits respond respectively to signals on the GT DA TO DC/DB, GT AOE TO DC/DB, GT LBG TO DC/DB, and GT J TO DC lines. Additionally, the OR circuits 1 can respond directly to a signal on a FORCE LINE TO DC line. The FORCE 9 line would be operative for bits 0 and 3 only, so as to generate a decimal value of 9 at the output of the OR circuits 1.

Figure 404:
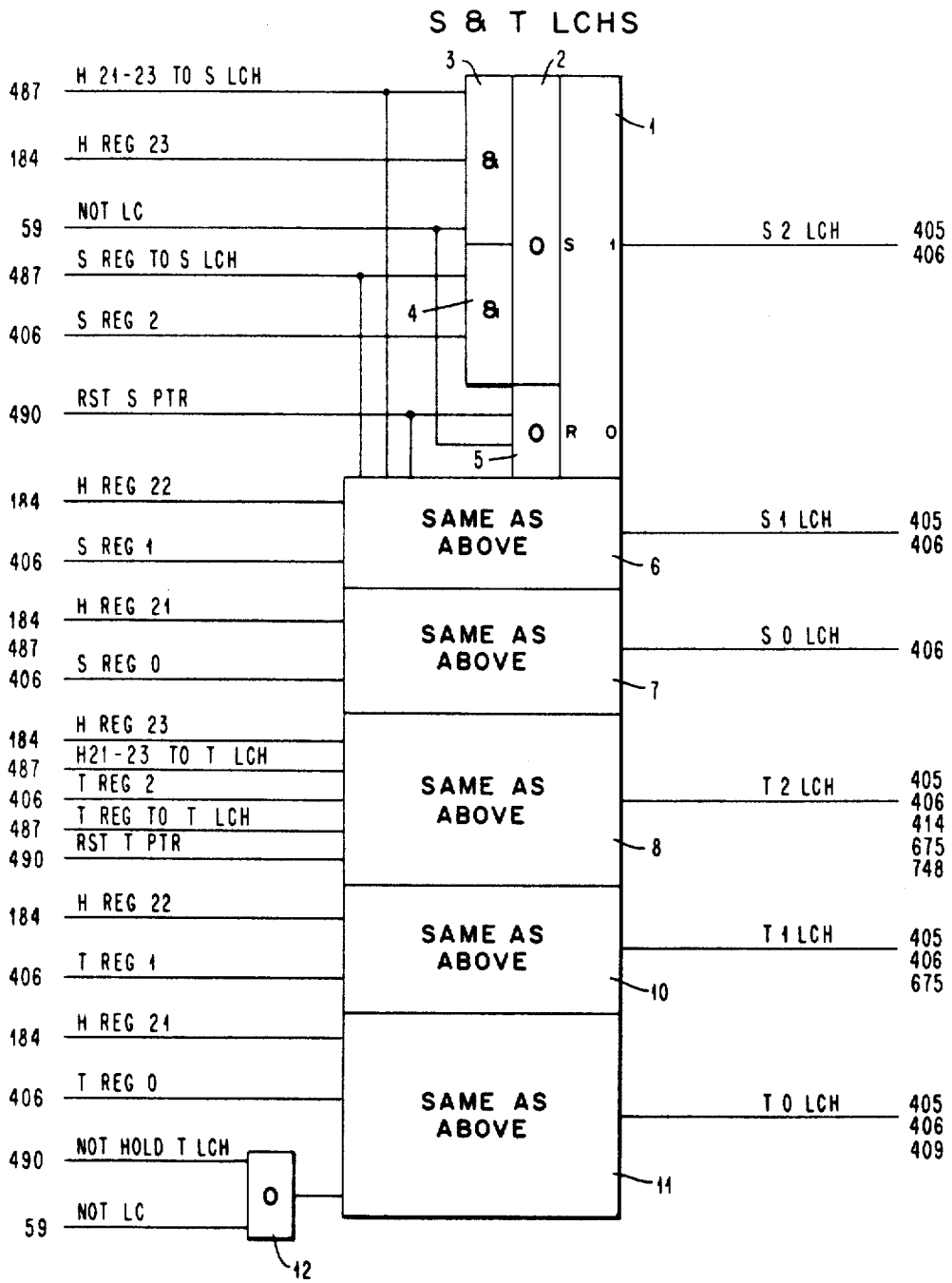

The change portion of the digit counter (shown in the middle of FIG. 395) responds to COUNT DC UP and COUNT DC DN signals so as to generate CHANGE DC signals in a manner which is described in detail with respect to the S pointer, which is shown in detail in FIG. 404, and described in detail with respect thereto.

Figure 399:
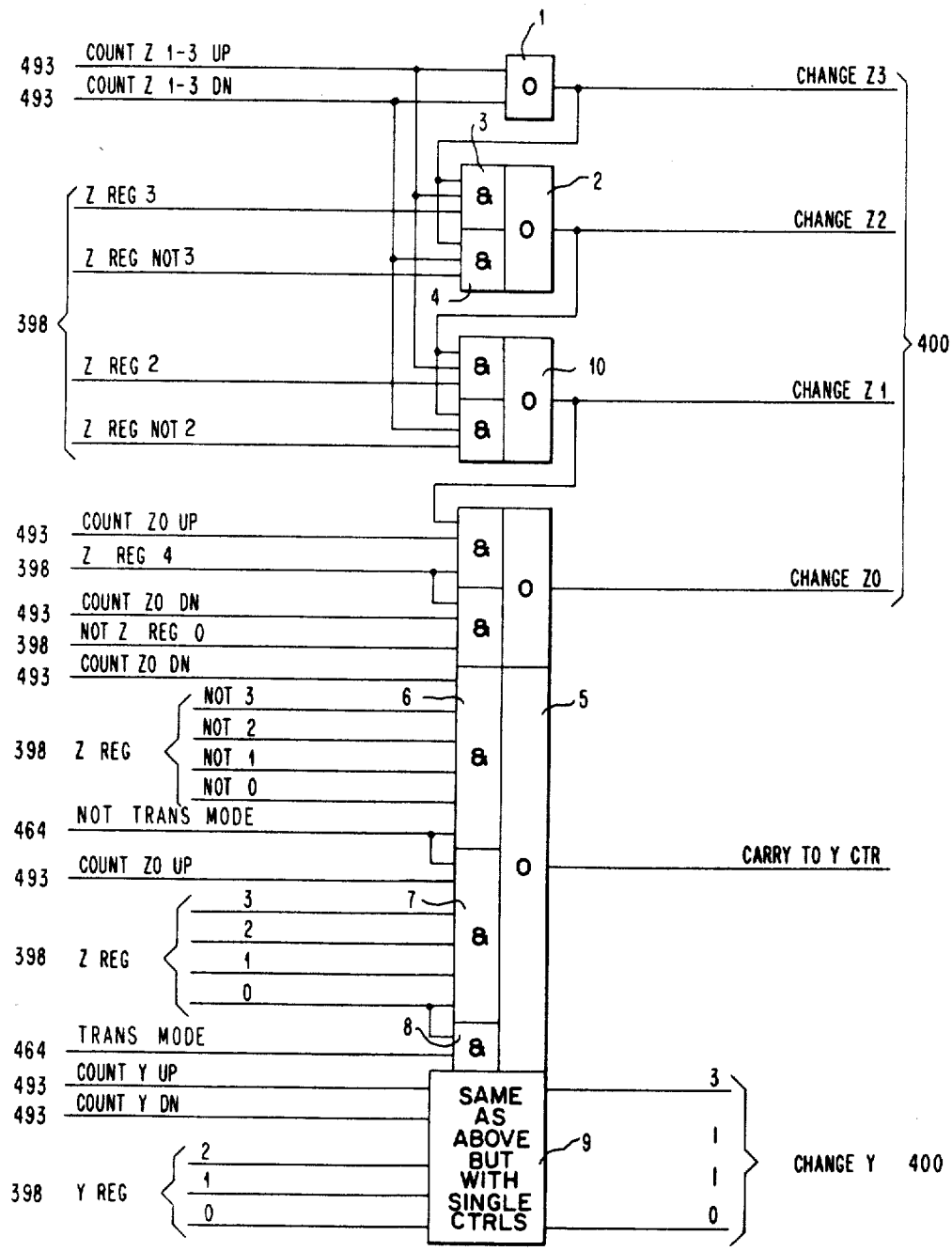

The latch portion of the digit counter shown at the bottom of FIG. 395 responds to the digit counter inputs, and to the change digit counter bits together with a GT REL DC signal and CPU RST so as to provide an incremented output as described in detail with respect to the Y latch shown in FIG. 399.

(15.8.3) DIGIT COUNTER/DIGIT BUFFER PARITY (FIG. 396)

The digit buffer digit counter parity includes an OR circuit 1 which is operated by AND circuits 2 in dependence upon conditions within the digit counter/digit buffer. The AND circuits 2 recognize cases where parity will change as a result of counting up or counting down, alternatively, in dependence upon the various bits in the counter at the time it is incremented. This is in accordance with well-known rules of binary addition, as is described with respect to the addressing adder and the incrementer in said environmental system. The output of the OR circuit 1 is applied to an EXCLUSIVE OR circuit 3 which causes an AND circuit 4 to reflect the change in a latch 5. The latch 5 can respond to the AND circuit 4 to either have an output or not, in dependence upon an output from the EXCLUSIVE OR circuit except that L time due to the signal on the NOT LC line. The output of the latch 5 is gated by an OR circuit 6 through an AND circuit 7 provided there is also a signal from an AND circuit 8 due to a signal on the GT REL DC line at A time. Additional AND circuits 9 select parity bits from the digit adder, from the AOE, and from the left byte gate in response to corresponding gating signals, the output of any one of which will cause an OR circuit 10 to operate a latch 11 so as to provide a signal on the DC/DB P line. The latch 11 is prevented from changing whenever there is no output from the AND circuit 8, and is permitted to be reset at the start of A time by the AND circuit 8.

Figure 397:
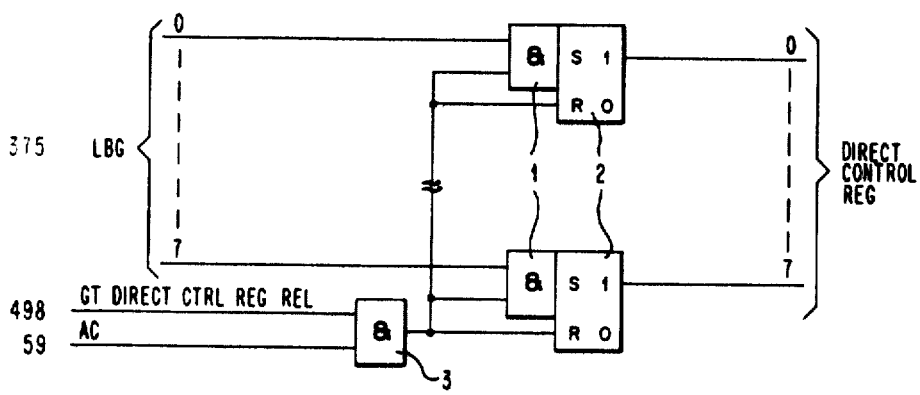

(15.9) Direct data register (FIG. 397)

The direct data register comprises a plurality of latches 1 as shown in FIG. 397. The latches 1 are set by AND circuits 2 in response to a gating signal from an AND circuit 3 when there is a signal on a GT DIRCT CTRL REG REL line, together with an AC clocking signal. Each of the AND circuits 2 respond to corresponding bits of the left byte gate.

(15.10) Y and Z registers and latches

The byte parity must be adjusted whenever a partial byte is gated to the adder or bits are altered as they are gated to the adder. When gating digits Decimal True, the digits 4 and 5 are the only ones that change parity.

| Digit | Bit CT | Digit +6 | Bit CT | Parity Change |
|-------|--------|----------|--------|---------------|
| 0000  | E      | 0110     | E      |               |
| 0001  | O      | 0111     | O      |               |
| 0010  | O      | 1000     | O      |               |
| 0011  | E      | 1001     | E      |               |
| 0100  | O      | 1010     | E      | X             |
| 0101  | E      | 1011     | O      | X             |
| 0110  | E      | 1100     | E      |               |
| 0111  | O      | 1101     | O      |               |
| 1000  | O      | 1110     | O      |               |
| 1001  | E      | 1111     | E      |               |

There are two gating combinations of DT that require parity adjustment:

(a) (HOD DT) & (LOD BT)

(b) (HOD DT) & (LOD DT)

All other parity adjustments are made because either the HOD or the LOD is not gated to the adder. Following is a chart showing the possible gate combinations and the adjusted parity.

| T/C+6 | | | Bits Forced | Digit Gates | Adj'd Parity |
|---|---|---|---|---|---|
| HOD | LOD | SIGN | | | |
| DT  | BT  | I   | SIGN | ST    | HP1    |
| DT  | BT  | NI  | SIGN | ST    | HP2    |
| DT  | DT  |     |      | ST    | HLP    |
| C   | BT  | I   | SIGN | ST    | NOT PL |
| C   | BT  | NI  | SIGN | ST    | PL     |
| C   | C   |     |      | ST    | P IN   |
| BT  | BT  |     |      | ST/CR | P IN   |
| BT  | BT  |     | ZONE |       | PH     |
| BT  |     |     | ZONE | ST    | P IN   |
| BT  |     |     |      | ST    | PL     |
|     | BT  |     |      | ST    | PH     |
| Input From LBG Only | | | | ST | PIN |
| BT  |     |     |      | CR    | PH     |

DT = Decimal True.
BT = Binary True.
C = Complement.
HP1 = HOD 4/5 EXCLUSIVE-OR NOT P LEFT.
HP2 = HOD 4/5 EXCLUSIVE-OR P LEFT.
HLP = HOD 4/5 EXCLUSIVE-OR LOD 4/5 EXCLUSIVE-OR P IN.
P IN = FORCED PARITY.
PH = Parity Adjusted for removal of HOD.
PL = Parity Adjusted for removal of LOD.
CR = CROSSED.
ST = STRAIGHT.
I = SIGN INVERTED.
NI = SIGN NOT INVERTED.
-- = Immaterial.

The LBG is connected straight to the gate into the left side of the adder. This gate is split between bits 3 and 4 for High and Low Order digits. The parity adjust gate has the following possibilities:

(a) P straight (b) PH, adjusted for HOD removed (c) PL, adjusted for LOD removed Parity is forced to the left side of the adder at the parity adjust gates.

(15.10.1) YZ REGISTERS (FIG. 398)

Figure 398:
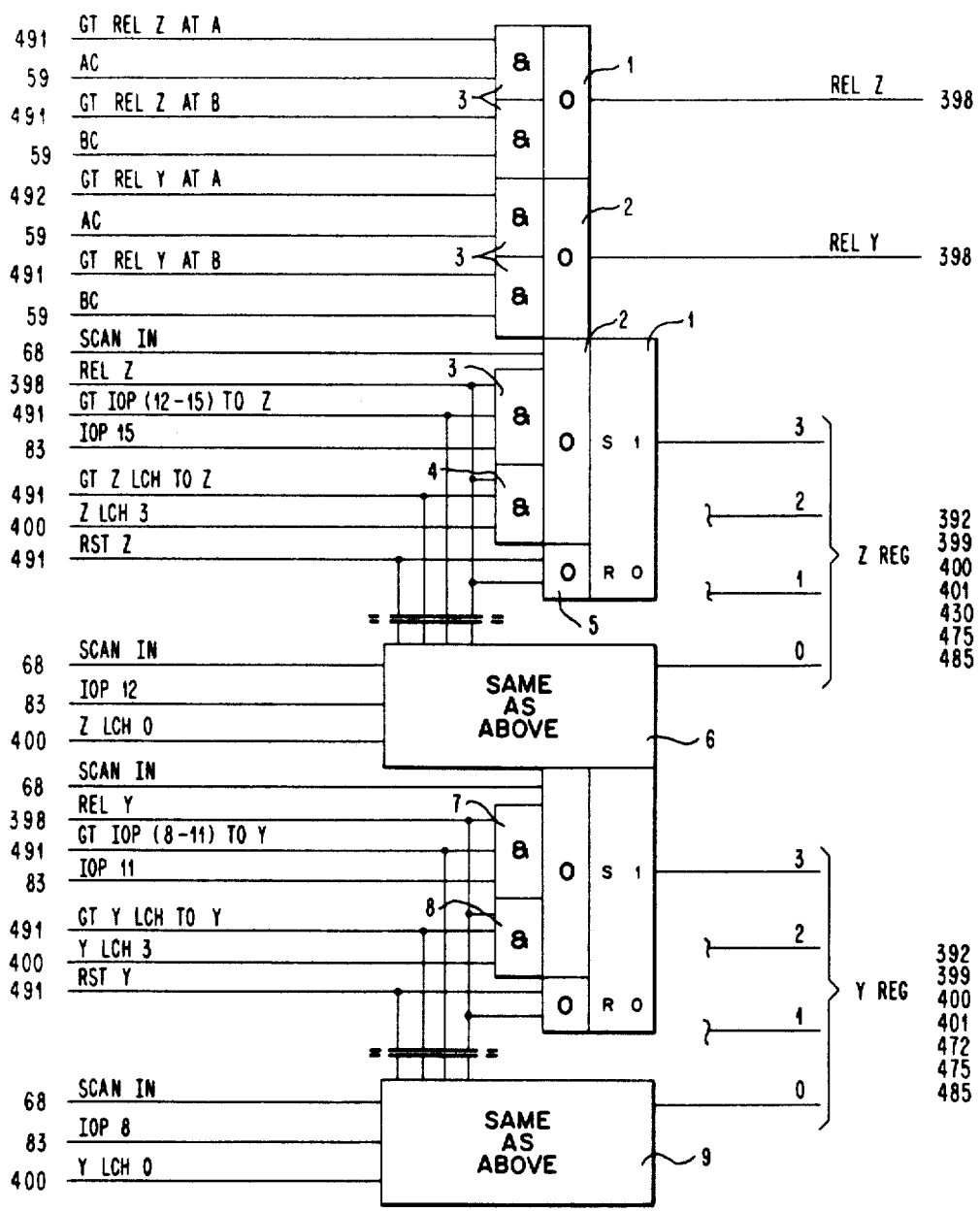

At the top of FIG. 398, a pair of OR circuits 1, 2 generate release signals which permit the state of the Y and Z registers to change. These are responsive to signals on the GT REL Z AT A . . . GT REL Y AT B lines in combination with signals on the AC and BC lines. Thus, the OR circuits 1, 2 will operate at either A time or B time in dependence upon the particular type of signal received at the input to one of a related pair of AND circuits 3.

The release signals generated at the top of FIG. 398 are applied to the Y and Z registers shown in the middle, and bottom, respectively of FIG. 398. The Z register comprises essentially a latch 1 which is set by an OR circuit 2 in response to a SCAN signal or in response to either one of a pair of AND circuits 3, 4. The AND circuit 3 recognizes a signal on a GT IOP (12–15) to Z line so as to gate IOP bit 15; the AND circuit 4 responds to a signal on a GT Z LATCH TO Z line so as to gate the output of the Z latch back into the Z register. This output is an incremented output whereby the contents of the Z register is incremented as it is passed to the latch, and when re- turned to the Z register will have a value which is one greater than it originally was. The latch 1 is reset by an OR circuit 5 in response to the REL Z line, or in response to a signal on an RST Z line. Each bit of the Z register is identical with the exception of the fact that different bit lines are applied thereto, as illustrated by the circuit 6. The Y register is essentially identical to the Z register with the exception of the fact that a pair of AND circuits 7, 8 respond to IOP bits 8–11 and to the Y latch bits, instead of to IOP 12 to 15 and the Z latch. Additional circuits 9 are provided for the other bits of the Y register.

(15.10.2) Y/Z INCREMENTING CIRCUITS (FIG. 399)

In FIG. 399, circuits which recognize the incrementing or decrementing of the Z register operate in accordance with a truth table, by determining whether or not a particular bit will change as a result of incrementing and/or decrementing, respectively. This is in accordance with well-known principles of binary addition. Concerning the lowest order bit (bit 3) of the Z incrementer, an OR circuit 1 will recognize a signal on a CHANGE Z3 line in response to signals on either the COUNT Z1–3 UP or COUNT Z1–3 DN lines. Thus, whether counting up or down, any count will cause a change in a low order bit. Whenever the low order bit is changed from a 1 to a 0, if an up-count is involved, then bit 2 should be changed; on the other hand, when counting down, if bit 3 is changed from a 0 to a 1, then bit 2 ought to be changed. Thus, an OR circuit 2 and a pair of AND circuits 3, 4 recognize conditions under which bit 2 should be changed. Bit 1 should be changed or not in accordance with the same principles as bit 2, in dependence upon whether an increment or a decrement is invloved, and whether bit 2 is a 1 or a 0 at the start of the incrementing operation. For bit 0, the only difference is that independent count lines are provided which correspond to the count lines for bits 1–3; these are COUNT Z0 UP and COUNT Z0 DN.

The Z register is low order in comparison with the Y register, and certain conditions are recognized by an OR circuit 5 so as to generate a signal on a CARRY TO Y CTR line. An AND circuit 6 will operate when the high order bit of Z is being counted down, and the remaining bits of the Z register are 0; similarly, an AND circuit 7 will operate the OR circuit 5 when Z0 is being counted up and the remaining bits of the Z register are 1. The AND circuits 6 and 7 only operate when the system is not in transmit mode, meaning that operations are on a byte basis, rather than on a 64-bit storage word basis. When in the transmit mode, the presence of a count Z up signal, together with a Z0 bit will cause an AND circuit 8 to generate the carry. As illustrated by a circuit 9, additional circuitry is provided for the Y incrementer (with the exception of the carry circuit 5), which circuitry is similar to the circuitry 1–4 illustrated at the top of FIG. 399.

(15.10.3) Y AND Z LATCHES (FIG. 400)

The Y and Z latches comprise essentially latch circuits 1, 2 which are set by related AND circuits 3, 4 in response to a signal from an AND circuit 5 which in turn recognizes NOT L time concurrently with a signal on a NOT HOLD Y & Z LCH line. Other inputs to the AND circuits 3, 4 are related EXCLUSIVE OR circuits 7, 8 which change the setting of the latch with respect to the corresponding register position whenever there is a change signal at the input thereto. The change signals relate to each bit, as is shown in FIG. 399. As an example, if there is a Z register bit 3, and a signal appears on the CHANGE Z3 line, then the uppermost EXCLUSIVE OR circuit 7 will cause its related AND circuit 3 to set the latch circuit relating to bit 3 at the top of FIG. 400. The other circuits operate in a similar fashion. Each of the latches 1 is reset by a related OR circuit 9 in response to the output of the AND circuit 5 or in response to a signal on a RESET Z line. Similarly, OR circuits 10 will reset the latches 2 in response to the AND circuit 5 or in response to a signal on the RESET Y line.

*(15.11) VFL to address adder and PSW gate (FIG. 401)*

Figure 401:
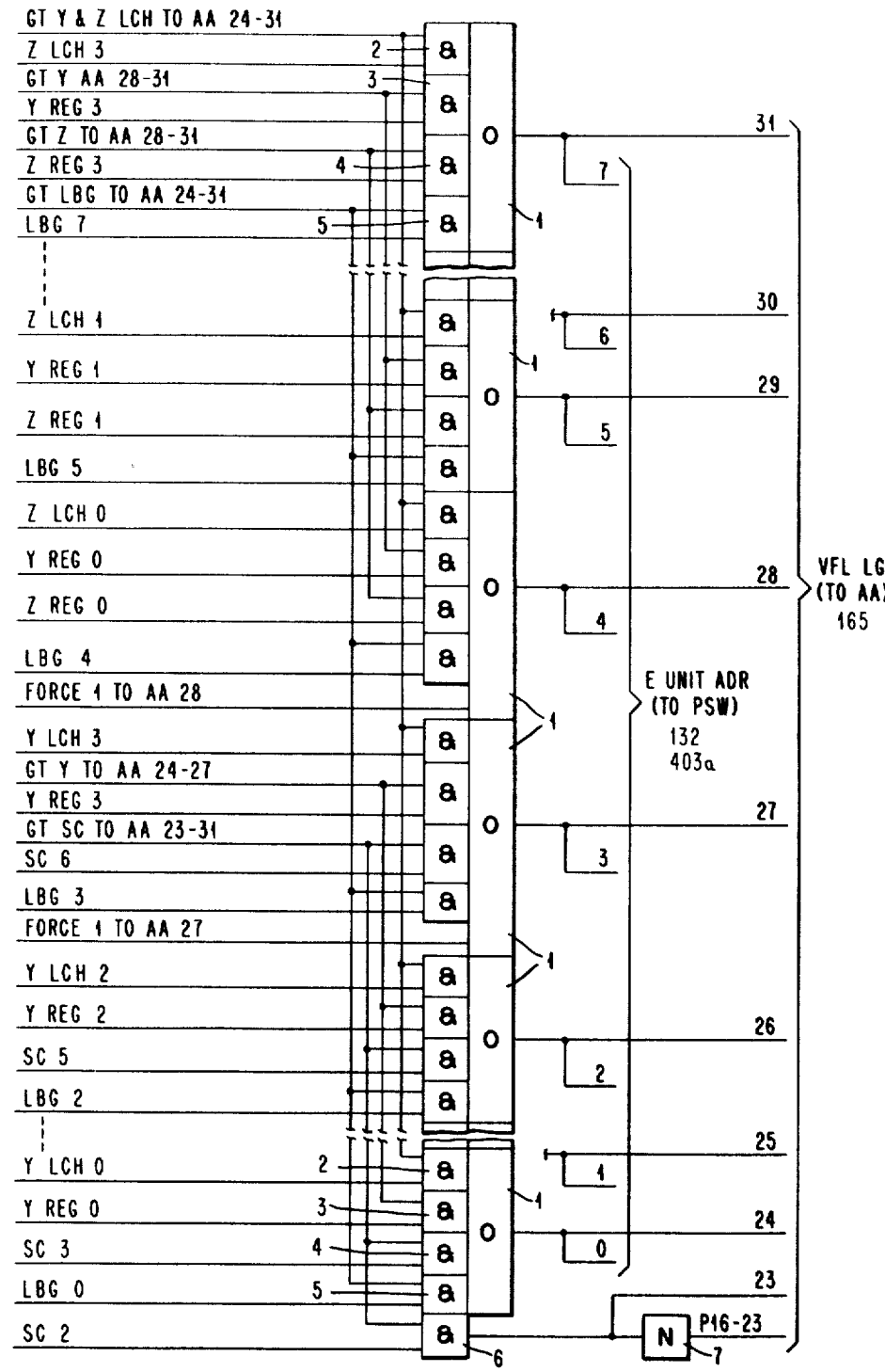

In FIG. 401, a plurality of VFL LGTH lines 23–31 and P 16–23, as well as a plurality of E UNIT ADR lines 0–7 are energized by a plurality of corresponding AND circuits 1. Each OR circuit responds to a related set of AND circuits 2–5. The AND circuits 2 cause gating of Z latch 0–3 to the low order OR circuits 1 (top of FIG. 401) and Y bits 0–3 to the high order OR circuits (bottom of FIG. 401). The AND circuits 3 permit gating the Y register to either bits 28–31 of the address adder or to bits 24–27 of the address adder in dependence upon which gating line is utilized. The AND circuits 4 permit gating the Z register to address adder 28–31, or permit gating the shift counter to address adder bits 28–31, in which case an AND circuit 6 provides bit 23 to the address adder, and an inverter 7 will in that case not provide a parity bit for the byte of the address adder which includes bit 23. Whenever the shift counter is not gated to the address adder, a parity bit is available to the address adder for bits 16–23 from the inverter 7. The AND circuits 5 permit gating the left byte gate to address adder positions 24–31. The operation of the circuit of FIG. 401 should be apparent from examination thereof. At the bottom of FIG. 401, an EXCLUSIVE OR complex 8 responds to E unit address bits 1–7 (which of course is also the same as bits 24–31 of the VFL length bits) so that an inverter 9 will generate parity bits whenever the EXCLUSIVE OR is even, thereby having no output so that the inverter 9 will have an output.

*(15.12) VFL to K register bus*

(15.12.1) K BUS GATE (FIG. 402)

Figure 402:
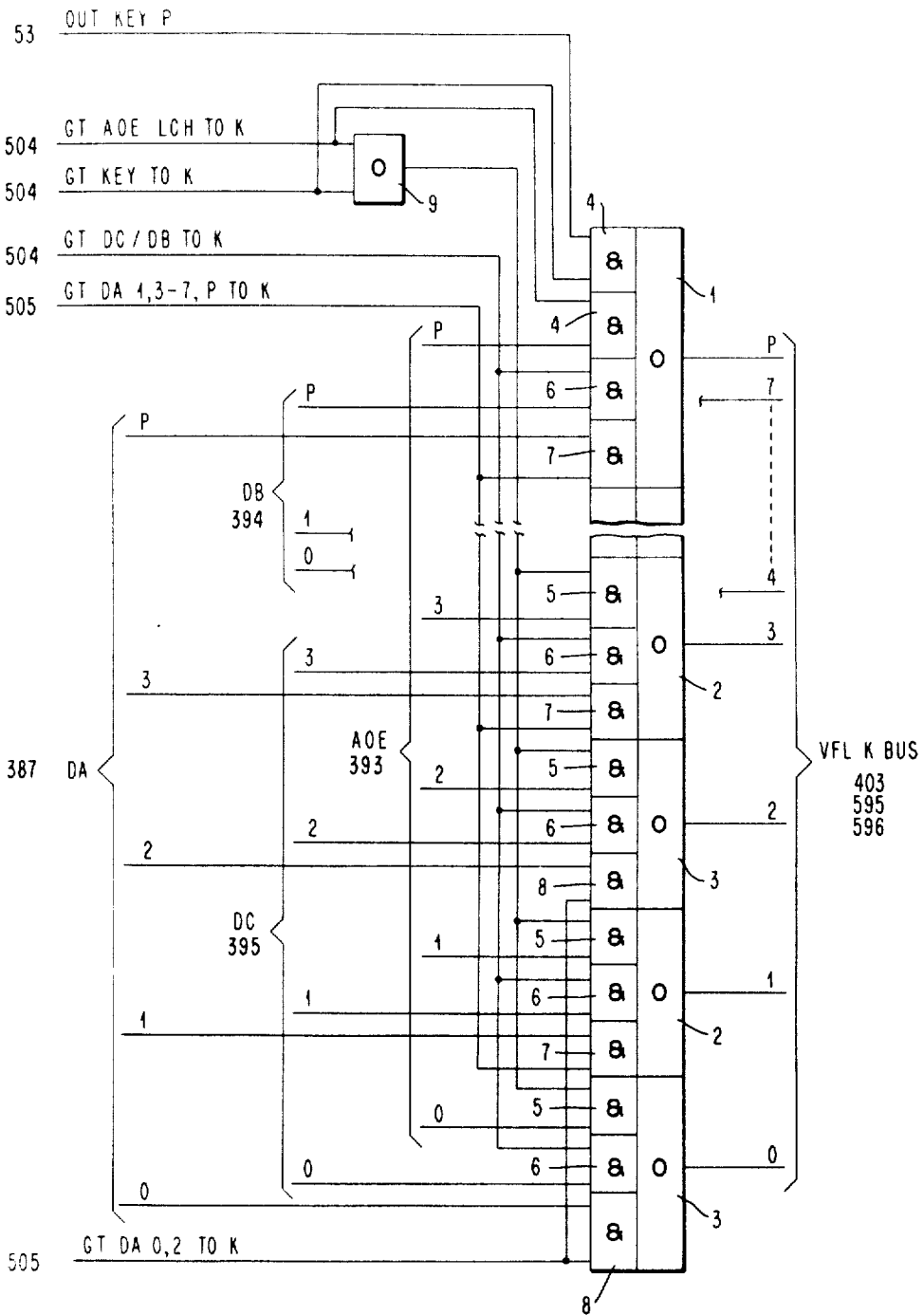

In FIG. 402, a plurality of VFL K BUS lines 3–7, P are each energized by related OR circuits 1–3 in response to corresponding AND circuits 4–8. The two AND circuits 4 are operative in the alternative, one recognizing the case when the out keys are being gated to K the other recognizing the case when keys are being gated to K so as to utilize a correct related one of the parity bits. Otherwise, whether the AOE or the keys are being gated to K, the AND circuits 5 provide gating in response to the output of an OR circuit 9. The AND circuits 6 relate to DC/DB, the AND circuits 7 relate to decimal adder bits 1, 3–7 and P, and the AND circuits 8 relate to bits 0 and 2 of the decimal adder.

(15.12.2) K BUS ZERO DETECT (FIG. 403)

In FIG. 403, a pair of OR circuits 1, 2 sense the various bits of the VFL K BUS, so as to determine that the K bus has a value other than zero. The output of the OR circuit 1, however, is not utilized unless it is gated by an AND circuit 3 in response to a signal on a NOT BLK SIGN SAMPLE ZERO DET line. An output from the AND circuit or from the OR circuit 2 will cause an OR circuit 4 to pass a signal to an AND circuit 5 for gating by a signal on the EN VFL RSLT ZERO DET TGR line at A time. This causes an OR circuit 6 to set a latch 7 which generates a signal on a RSLT BYTE NOT ZERO line. The latch 7 may be reset by an OR circuit 8 in response to CPU RST, or in response to an AND circuit 9 which is operated by a signal on the ELC LCH line

*(15.13) S and T pointers*

(15.13.1) S AND T LATCHES (FIG. 404)

The S and T latches each comprise three bits, each of which includes a latch circuit 1 settable by an OR circuit 2 in response to two AND circuits 3, 4 in dependence upon whether the H register or the S register is to set the latch. Initial data input to the S and T pointer is from the H register, and the S and T latches feed incrementers which feed the S and T registers. The output of the S and T registers is decoded to provide the S pointer and T pointer controls for selecting bytes at the right byte gate and at the left byte gate. The latch 1 is in FIG. 404 is reset by a signal on a RST S PTR line, or by a signal on a NOT LC line, due to the OR circuit 5. Additional circuits 6, 7 relate to bits 1 and 0 of the S latch, and they would be identical to the circuits 1–5 which relate to bit 2 of the bit latch.

The T pointer comprises a plurality of circuits 8, 10, 11 each of which is identical to the circuits 1–5, the T latch being gated and reset by an OR circuit 12 which not only responds to LC time (as does the S latch), but also to a signal on a NOT HOLD T LCH line.

(15.13.2) S AND T INCREMENTERS (FIG. 405)

The S incrementer as shown at the top of FIG. 405 responds to bits 1 and 2 of the S latch so as to provide change signals for bits S0, S1 and S2, which provide incrementing of the S value at the input to the S register. The operation of the S and T incrementers is identical to the operation of bits 1–3 of the Z incrementer shown in FIG. 399. Thus, the OR circuits 1, 2, 3 in FIG. 405 correspond to the OR circuits 1, 2, 10 in FIG. 399. The change circuit 4 for the T pointer is identical to the circuits 10–3 in FIG. 405.

(15.13.3) S AND T REGISTERS (FIG. 406)

Figure 400:
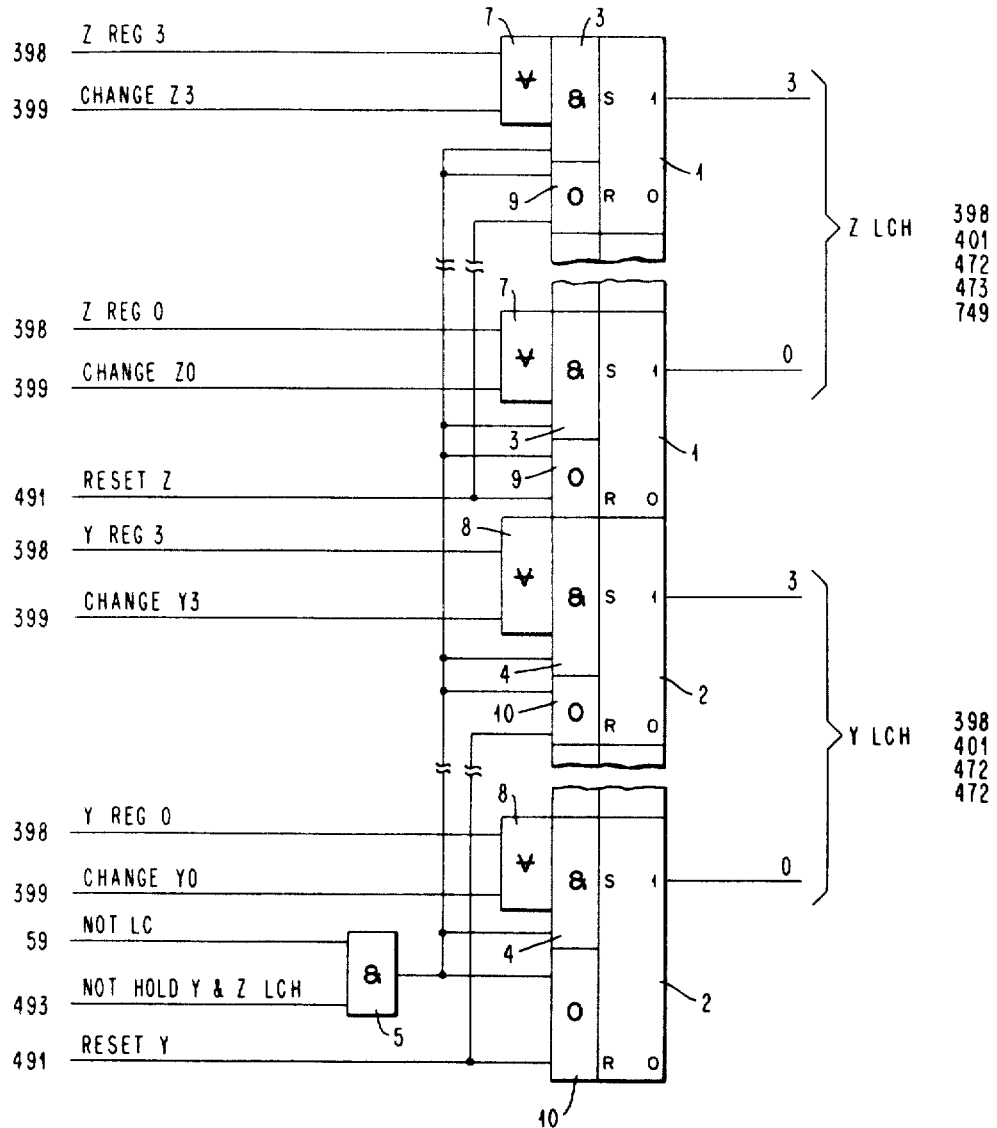

The S and T registers each comprise three bits, each bit thereof including a latch 1 set by an AND circuit 2 when there is an output from an EXCLUSIVE OR circuit 3, in the same fashion as the Z and Y latches shown in FIG. 400. Each of these registers is made operable by a signal from an AND circuit 4, 5, respectively, in response to signals on the REL S PTR and REL T PTR lines. The registers are reset by corresponding signals on RST S PTR and RST T PTR lines.

(15.13.4) S AND T POINTER DECODE CIRCUITS (FIG. 407–FIG. 409)

Figure 407:
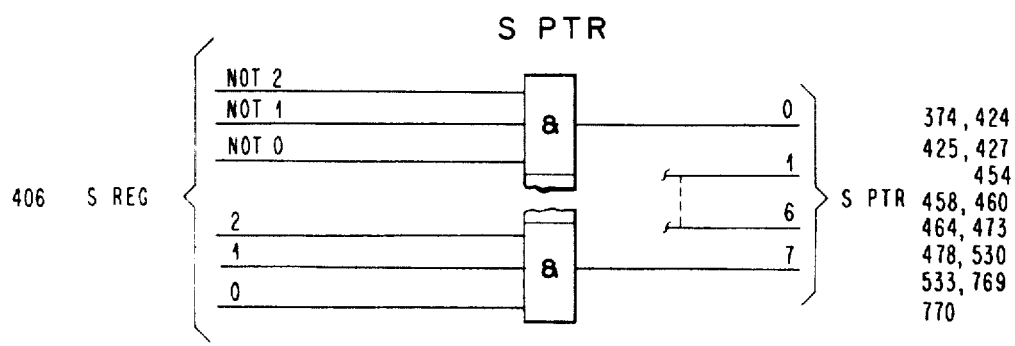

The output of the S and T registers is decoded in a purely binary fashion by the circuits of FIGS. 407–409. The S pointer is decoded in FIG. 407, and the T pointer is decoded in FIG. 409 in purely binary decoders. The T pointer is decoded in FIG. 408 in a binary decoder which has, however, the ability to force a 3 output therefrom in response to a signal on the FORCE K BYTE 3 line which is applied to an OR circuit 1 in FIG. 408. The S pointer output of FIG. 407 is utilized to gate a correct byte from the K register through the left byte gate, and the T pointer output of FIG. 408 is used to select a correct K or L register byte at the right byte gate. The TD IN output of FIG. 409 is used to gate a correct byte from the VFL data flow back into the K register. In other words, the TD IN signals are utilized to cause the VFL K bus (FIG. 402) to be applied to the correct position of the K register.

(16.0) VARIABLE FIELD LENGTH CONTROLS

*(16.1) Introduction of VFL controls*

(16.1.1) EXECUTION SEQUENCES AND INTERRUPTS

The execution of an SS instruction is divided into five sequences:

(A) Set-Up
(B) Iterations
(C) Store-Fetch
(D) Prefetch
(E) Address Put-Away (TRT and EDMK only)

All sequences of Decimal multiply and Divide are described in section 17.0 et seq. and, therefore, this section does not include Multiply and Divide with the exception of the section on interrupts.

The execution of all SS instructions starts with a Set Up sequence. For repetitive byte operations, Iteration sequencers are used. Operand one fetching and storing is done by Store/Fetch sequencers. Operand two fetching is done by Prefetch sequencers. The put-away of operand addresses and result bytes in general registers is done by VFL SEQ's A, B, C, and D.

The following is a general description of each of these sequences.

(16.1.1.1) Set-Up

The Set-Up prepares counters and registers for the start of Iterations. This consists of:

(1) Address calculation (low order three bits to T or S) and set fetch requests, (2) Address comparison for overlapping fields, (3) Initial setting of Y and Z, (4) Transfer words, returned from main storage, from J to K and L, (5) Set initial values in ER and SC, (6) Set VFL gating triggers.

The address comparison for overlapping fields is made because byte operations must be executed in such a way that the result appears to have been generated by operating one byte at a time from main storage. When the operands do not overlap into the same storage word, there is no difference between operating a byte at a time or eight bytes at a time from main storage.

In Decimal operations, the comparison is made to determine if the destination (operand number one) resides in lower order storage than the source (operand number two). In logical operations, the comparison is made to determine if the destination resides in higher order storage than the source.

If the difference between the starting addresses of the two operands is 0–7, there is a possibility that bytes will be taken from the same storage word during execution. When it is detected that the source and destination are in the same word, the RBG is switched to gate from K instead of L and thus both the LBG and RBG take bytes from K.

If the difference between the starting addresses of the two operands is 8–15, then the word which would be fetched by a Prefetch is actually being generated in K. Therefore, Prefetch is blocked and K is gated to M during each Store/Fetch sequence.

(16.1.1.2) Iterations

The Iterations are the actual processing of data, one byte at a time. Each time a source (operand No. 2) byte is processed, Z and S are stepped. Each time a destination (operand No. 1) byte is processed, Y and T are stepped. As mentioned in the Y and Z description, Y and Z are stepped separately for Decimal operations and stepped as one counter for Logical operations. The Iterations are controlled by sequencers IS1, IS2 and IS3.

(16.1.1.3) Store/fetch

The Store/Fetch sequence is initiated whenever a destination word boundary is reached or the end of operation is signaled. The address is calculated and the VFL store request is set. This stores a result word. If there is another word required for the destination, the address is calculated and the VFL fetch request is set. For the end of the operation, SF5 is the last cycle. If it is not the end of the operation, SF6 transfers J to K and the sequence returns to Iterations.

The crossing of a destination word boundary is indicated by the T pointer. When moving right to left through a field, the T pointer equals zero at a word boundary. When moving left to right through a field, the T pointer equals seven at a word boundary.

The end of operation conditions vary for different instructions but the most common conditions are Y or Z going to all ones.

(16.1.1.4) Prefetch

The Prefetch sequence is initiated each time a source word is needed. The Prefetch sequence is normally overlapped with the iterations or setup. The first source word is fetched during Set-Up. The second source word fetch (first Prefetch) is initiated during Set-Up. When the source word returns, it is put in M. The first cycle of Prefetch transfers M to L. The iterations are started again after PF1. The remainder of the Prefetch sequence is allowed to follow PF1 if another source word is required.

(16.1.1.5) Address put-away

Two instructions, Translate and Test and Edit and Mark, put information in general registers as part of their result.

Translate and Test inserts the argument address (operand No. 1 address) in the low order 24 bits of GR1 and the translated byte (non-zero byte from the translation table, operand No. 2) in the low order 8 bits of GR2. These results are inserted in GR1 and 2 only if a non-zero byte is found.

Edit and Mark inserts the byte address of the first significant result digit in the low order 24 bits of GR1.

Sequencers A, B, C, D, IS1 and IS3 are used for the TRT address put-away and sequencers A, B, C, D and IS1 are used for the EDMK address put-away.

(16.1.1.6) VFL interruptions

VFL operations can have the following interrupts:

Invalid Address
Data
Specification
Decimal Overflow
Decimal Divide Check

The invalid address interrupt can occur on any fetch, and all SS instructions have at least one fetch. The address invalid trigger is reset at the beginning of each SS execution, and when set, remains on, even though valid words may return to J after the trigger is set. For all SS instructions except Multiply and Divide, the address invalid trigger is sampled at SU7, SU9, and SF6. For SS Multiply and Divide, the address invalid trigger is on, the sequence is switched to SF3. The E interrupt trigger blocks the set of VFL request triggers and causes the VFL end sequence trigger to be set.

The data is checked on each iteration cycle and the interrupt triggers are set if a sign or digit is detected in the wrong place. During the next Store/Fetch sequence, the E interrupt trigger causes VFL end sequence to be set and blocks the set of both VFL request triggers.

The specification interrupt can occur for Decimal, Multiply, or Divide. L1 and L2 are checked during SU2. If L $2 \leq L1$ or $L2 < 7$, the Store/Fetch trigger is set and the ending sequence follows.

Decimal Overflow can occur on AP, SP and ZAP. The occurrence of the overflow interrupt does not alter the execution of the instructions.

Decimal Divide Check is sampled during SEQ A of Divide Test. A Divide Check switches the sequence to SF3 which starts the end sequence.

(16.1.2) MISCELLANEOUS CONTROL TRIGGERS AND SEQUENCES

(16.1.2.0) VFL T1–8 triggers

VFL T1–8 triggers are a group of multi-purpose control triggers. All of these triggers are set at A time and VFL T2, VFL T3, and VFL T5, have latched outputs. The details of each trigger's use are given in the individual instruction descriptions.

(16.1.2.1) VFL store request and fetch request triggers

These are two intermediate request triggers used for E unit storage requests. They have two outputs. One output is to the BCU and the other to the I units. The I unit uses store request to initiate an address compare and the fetch request to return the word to J. The BCU sets their request triggers at A time following the rise of the VFL line.

The VFL request triggers are set at B time and are reset with A time and Accept. The set for these triggers is latched to generate the gating line "Gate AA to SAR and H."

(16.1.2.2) Store/fetch trigger

There are twelve sequence triggers used for Set-Up and Store/Fetch. The Store/Fetch trigger is a supervisory trigger which controls which functions the sequences perform. With the Store-Fetch trigger off, VFL SEQ's 1–12 are Set-Up sequencers (SU1, SU2, etc.). With the Store/Fetch trigger on, VFL SEQ's 1–6 are Store/Fetch sequencers (SF1, SF2, etc.).

(16.1.2.3) Y and Z counting

The length counters start with the specified operand lengths and count them down to zero for all instructions except DP, ED, EDMK, TR and TRT.

Counting the length down means that the length count maintains a count of the remaining bytes to be processed. The value in the length counter can then be used to determine if another source word should be fetched once a prefetch is started. The first cycle of prefetch transfers the prefetched word from M to L. If another word is needed, (LENGTH COUNTER shows more than eight bytes remain), the prefetch continues and it prefetches the next word.

For EDM EDMK, TR and TRT there is no actual prefetch. The prefetch sequence is used to fetch source words but it is not overlapped with the iterations. For EDMK and TRT, the byte address of a byte in operand one is put in GR1. The most convenient method of generating this address is to start Y and Z at zero, count them up as operand one bytes are processed, and add Y and Z to B1+D1 when the byte address is required. The end of the operation is indicated by Y and Z equal IOP (8–15).

In Decimal Divide, the number of quotient bytes to be generated is L1–L2. Therefore, L2 is set in Y and it is counted up until Y=IOP (8–11).

When counting down, the counters are stepped with the set conditions for the iteration sequencers. Since the specified lengths are the number of bytes minus one, a counter value of all ones indicates the end of operation instead of a zero value (counter is stepped past zero to fifteen). Furthermore, the counter latch is decoded instead of the register because the decoder output is used to set and reset triggers at A time. This means that the counter value of 1110 for decimal or 1111–1110 for logical operations indicates all bytes have been processed.

(16.1.2.4) End sequence and ELC

The VFL end sequence trigger is set by all SS instructions. With one exception, it is set two cycles before the end of the operations. The one exception is Translate and Test ending in an address put-away sequence. The set for VFL end sequence trigger is also the VFL Thru signal to the I unit. The E last cycle trigger is set for the last cycle of every SS instruction. This is done to take advantage of the built-in end operation control functions of the ELC trigger.

(16.1.2.5) VFL zero detects

The VFL data flow has two zero detects, one on the output of the digit gates (RBG ZD) and the other on the result bus back to K (Result ZD).

The RBG ZD is connected to two latches. The low order digit is latched for Edits and both digits are ANDed and latched as a Byte Not Zero latch. This is used in TRT and Overflow detection.

The Result ZD sets a trigger which has a latched output. The zero detect logic has a control line to force zero in the low order digit (sign position) for arithmetic operations. The trigger is actually set if a non-zero byte is detected and is in the off state at the end of any operation with a zero result. The Result ZD is used by Decimal Arithmetic and Logical Compare operations.

(16.1.3) SEQUENCE HARDWARE

The various sequencers are shown in respective groups of figures, as illustrated by FIG. 409a of application Ser. No. 609,238. In some cases, a particular sequence control (such as PF1 TGR) may be generated in more than one place. This illustrates the well-known expedient of multiple-generation for powering purposes. In other cases, a particular combination of sequences (such as SU2 or SF1) may not be explicitly generated, but the figures referred to in the chart of FIG. 409a fully illustrate how any such combination can be generated.

(16.2) VFL set-up sequences

(16.2.1) INTRODUCTION TO SET-UP GROUPS

The SS instructions are divided into four groups by Set-Up function:

I. Move-With-Offset, Pack, Unpack, Zero-and-Add, Decimal Compare, Decimal Add and Decimal Subtract.

II. Move Numeric, Move, Move Zone, AND, Logical Compare, OR, EXCLUSIVE OR, Edit, Edit-and-Mark.

III. Decimal Multiply, Decimal Divide.

IV. Translate, Translate-and-Test.

(16.2.2) GROUP I (MVO, PACK, UNPK, ZAP, CP, AP, SP)

(16.2.2.1) General objectives

It is the general objective of Set-Up, for the Group I instructions, to:

(a) Fetch the words from storage that contain the first byte to be processed for both operands.

(b) Compare the starting addresses for the possibility of overlapping fields.

$$0 \leq (B2+D2+L2)-(B1+D1-L1) < 8$$
$$8 \leq (B2+D2+L2)-(B1+D1+L1) < 16$$

(c) Set the starting byte addresses in S and T.

(d) Initiate first Prefetch, if required.

(e) Put fetched words in K and L.

(f) Set VFL gating triggers.

(g) For Pack and Unpack, put H bits 19 and 20 (the two low order word address bits, H (21–23) being the byte address) in ER (1, 2) for operand 1 and in SC (1, 2) for operand 2.

(h) For Pack and Unpack, compare ER to SC for equal as part of overlapping field detection. A few of the relationships used in this Set-Up will be discussed first.

If operand No. 2 is in more than one word in storage, the fetch request for the second word is made during Set-Up. This request is called the first prefetch. The length of the operand alone does not indicate how many words operand No. 2 is in. As an example, operand No. 2 could have only two bytes (L2=1) but start at byte address zero and reside in two storage words. However, L2 could be seven with a starting byte address of seven and the operand resides in one word. Therefore, a comparison between L2 and S is made to determine if the first prefetch should be initiated. If L2 is greater than S (operand No. 2 starting byte address), operand No. 2 resides in more than one storage word. A second prefetch is started when the first operand No. 2 word boundary is crossed. At this time, the length counter indicates how many bytes remain to be processed. If Z is greater than 7, a prefetch is initiated, otherwise no request is made.

With the exception of Pack and Unpack, all instructions that require detection or processing of overlapping fields move through both operands at the same rate. This means that the relative position of the two operands at the start of execution remains unchanged throughout the execution.

On Pack and Unpack, the starting addresses are checked for an absolute difference of 0 to 7. If the difference is 0 to 7, the two low order word address bits are updated, in the exponent register and shift counter, each time a word boundary is crossed. When these two partial addresses become equal, the crossing of the boundary moves both operands into the same storage word and one register (K) must be used for both operands.

When the difference of the starting addresses is 0-7, i.e. $0 \leq (B2+D2+L2)-(B1+D1+L2) < 8$, a comparison of the byte addresses indicates whether or not the two operands start in the same word. The starting byte addresses are in the S and T pointers. If $S \leq T$, the two operands start in the same storage word. If $S<T$, the two operands start in adjacent storage words, the first destination word being the second source word required.

When operating in Single Cycle mode, the first Set-Up fetch request is advanced to SU1. This allows the word returned to J to be transferred to M during SU2. The rest of the Set-Up is unchanged with the exception of the start of prefetch. The start of prefetch is delayed to SU9 so that the word fetched does not return to J and destroy the first word of operand two which returned to J during SU5.

The sequence triggers and latches are denoted as SU T2 for Set-Up trigger two and SU L2 for Set-Up latch two.

(16.2.2.2) SU1

Y is gated to AA with {SU L1 or SU T2} to calculate $B1+D1+L1$. The extended gate is due to the path length from VFL controls to the AA.

(16.2.2.3) SU2

The VFL fetch request trigger is set with the B clock. The output of this trigger goes to the I unit to indicate J as the return address, and to the BCU to set their fetch request. The set of both VFL request triggers (Fetch register and Store register) is latched to generate the gate of the AA to SAR and H.

(16.2.2.4) SU3

Z is gated to the AA with (SU L3 or SU T4) to calculate $B2+D2+L2$. The VFL address advance line is up during cycle three so that B2 and D2 will be in the AA during cycle four. The low order three bits of H are gated to the T LTCH and T is released with SU L3. This puts the starting byte address of operand one in the T pointer. H (0–23) is gated to the incrementer. The latched output of the incrementer and incrementer extension is gated to K (0–31). Since nothing is gated into the incrementer extension, its output is zero with correct parity. The AOB (32–63) is gated to K (32–63) at the same time to put zeros with correct parity in the low order half of K.

The sequence is held up here until an Accept is received from the BCU. If an immediate Accept is received, SU3 takes only one cycle. This prevents a second request being made in SU5 without an Accept from the first request.

(16.2.2.5) SU4

The VFL fetch request trigger is set and the AA is gated to SAR and H. Operand one address is gated from K to L.

H (19, 20) are gated to AE (1, 2) and AEOB to ER for Pack and Unpack. If the overlap triggers are not set, these bits are not used.

(16.2.2.6) SU5

The second operand byte address is gated from H (21–23) to the S LTCH and S is released. The entire second operand address is gated from H to incrementer to K, as in cycle three.

The sequence waits in SU5 for an Accept from the BCU.

(16.2.2.7) SU6

The VFL address advance line is up during SU6 in preparation for the addition of $B2+D2+$DELTA in SU7. The DELTA can be 0 or 1. If DELTA=1, a one is forced into AA (28), the low order word address bit.

A one is forced to AA (28) if Z (1, 2, 4) is greater than S (1, 2, 4) and Z (8) is on.

This fetch request is actually initiating the first prefetch. The following table shows the number of storage words involved for the various length and starting byte address relationships.

| Number of Wds. | Z (1, 2, 4) | Z<(8) (1, 2, 4) |
|---|---|---|
| 1 | 0 | No |
| 2 | 0 | Yes |
| 2 | 1 | No |
| 3 | 1 | Yes |

The starting address comparison is started in SU6 by substracting L from K and putting the result in K. This is the desired result for all instructions except Unpack. In Unpack, if this result is negative (no AM C Out 1), L is complemented through the adder and put in K at the end of SU7. This checks the magnitude of the difference since operand one can start to the right of operand two and move to the left during the execution.

H (19, 20) are gated to AE (1, 2) and AEOB to SC in anticipation of overlapping fields.

The GT L with S trigger is set here for all instructions. The GT L with S trigger is reset as GT K with S trigger is set.

(16.2.2.8) SU7

If $Z (1, 2, 4) < S(1, 2, 4)$ or $Z (8) = 1$, the VFL fetch request trigger is set and prefetch trigger 3 is set with SU L7. PF3 is the Accept Wait cycle of the prefetch sequence and is followed by PF4, which transfers J to M. L is gated to AM T/C and the complement trigger is set. For Unpack, if there was a carry out of AM (1) at the end of SU6, AOB is gated to K with SU L7. The AM Carry Out 1 trigger is blocked from changing with SU L7.

(16.2.2.9) SU8

The address comparison is completed in this cycle by setting 0–7 Overlap or 8–15 Overlap trigger if the conditions are met. The K zero detect generates two lines, K0–27 Equal Zero and K0–28 Equal Zero. Set 0–7 Overlap if K0–28 Equal Zero. Set 8–15 Overlap if K0–27 Equal Zero and not K0–28 Equal Zero.

The GT TD Out trigger is set during SU L8 for the instructions that use data from operand one.

For Pack and Unpack, the ER and SC are gated to AE during SU8 and SU9. The AE complement trigger is also set for two cycles. This is done to check the ER/SC for equal. The gates are up for two cycles because the AE HS Equal Zero line has a long path to set the GT K with S trigger at SU L9.

Operand one is gated from J to K when J Loaded is on and not Single Cycle mode. For Single Cycle, operand one was put in M during SU2 and is gated from M to K during this cycle.

(16.2.2.10) SU9

Operand two is gated from J to L when J Loaded is on. SU L9 is enabled with the J Loaded trigger on.

The overlap triggers and AE HS are sampled for a set to GT K with S trigger at SU L9.

For Single cycle mode, the prefetch storage request is delayed from SU7 to SU9. Delayed with the fetch request is the set of PF T3.

SU L9 sets the first iteration sequencer.

(16.2.3) GROUP II (MUN, MVC, MVZ, NC CLC, OC, XC, EDT EDMK)

(16.2.3.1) General objectives

It is the general objective of Set-Up, for the group II instructions, to:

(a) Fetch the words from storage that contain the first byte to be processed for both operands.

(b) Compare the starting addresses for the possibility of overlapping fields.

$$0 \leq (B1+D1+L1)-(B2+D2+L2) < 8$$

(c) set the starting byte addresses in S and T.
(d) initiate the first prefetch, if required.
(e) put fetched words in K and L.
(f) set VFL gating triggers.
(g) set up the ER and SC to be used as a word count.
(h) for Edit and Edit-and-Mark, put the Fill Character in DB/DC.

There are many similarities between the Group I and II Set-Up sequences. Therefore, only the differences will be described for Group II.

All of the instructions in Group II process from low order to order storage and use Op-code bits 8–15 as an eight bit length which applies to both operands.

A word count is maintained in the ER, which is reset to zero during Set-Up. The ER register is advanced by one each time a result word is stored. The increment gated to AA for address generation comes from the SC. The amount in the SC is the increment needed for the next fetch, i.e., if operand one is crossing word boundaries ahead of operand two, the $SC=ER+2$ for prefetch, and if operand one is crossing word boundaries ahead of operand two, the $SC=ER+1$ for prefetch. At completion of prefetch, $SC=ER+1$ for the next operand one fetch.

A status trigger (T5) is set during Set-Up is $S<T$. T5 on indicates that operand two will cross word boundaries ahead of operand one.

The first prefetch is initiated if $Z(1, 2, 4)<S$ NOT $(1, 2, 4)$ or $Z(8)$ or $Y(1, 2, 4, 8)$ is not equal to zero. The Z and S comparison is made with complement S because the operands are processed from left to right (low order to high order storage).

The results of an Edit or Edit-and-Mark with overlapping fields are specified to be unpredictable. Therefore, these two instructions are always handled as though their operands do not overlap. Address comparisons are degated during Edit and Edit-and-Mark Set-Up.

(16.2.3.2) Set-up functions

SU1

No increment is gated to AA since the desired starting address is $(B1+D1)$.

SU2

The AEOB is gated to the ER as a means of resetting ER to zero with correct parity.

SU3

No increment is gated to AA since the desired second operand starting address is $B2+D2$.

SU4

One is forced to AE (7) and the AEOB is gated to the SC. This is preparing the first address increment required for fetching.

The Y and Z counters are reset to zero during SU4 for Edit or Edit-and-Mark because Y and Z are counted up in these instructions.

SU7

The AOB is always gated to K with SU L7 for this group. The add during SU6 generated $$(B2+D2)-(B1+D1)$$

and the desired difference to be checked is $$(B1+D1)-(B2+D2)$$

or NOT $(B2+D2)-(B1+D1)$.

SU8

If T5 is on, indicating the first word boundary to be crossed will be in operand two, one is added to the SC. This puts two in the SC, the increment needed for the first prefetch.

SU9

For Edit and Edit-and-Mark, the first byte of operand one is put in DB/DC, where it is held throughout the execution. This byte is the fill character. The length counters and pointers are not stepped because this character is examined as all other pattern characters are.

The GATE L with S trigger is set with SU L9, for Edit or Edit-and-Mark. This set is delayed because there is no gate for the RBG to AOE and the AOE is used during SU9 for Edit and Edit-and-Mark.

The T2 trigger is set with SU L9 for MVC if, $$(T=O) \& (S=0) \& (Y \text{ and } Z \leq 7)$$

The T2 trigger on causes Move to move 64 bit words instead of eight bit bytes. This type of Move is called Transmit Mode. Transmit Mode is entered on any MVC when both operands start on word boundaries and there is at least one 64 bit word to be moved. The byte mode is initiated to move any partial words on the end of operand No. 2.

For this group of instructions, SU L9 sets Iteration Sequencer 2 (IS2) with one exception. For MVC Transmit, SU L9 sets SF3.

(16.2.4) GROUP III (MP, DP)

The description of Multiply and Divide Set-Up is included in the Multiply-Divide description.

(16.2.5) GROUP IV (TR, TRT)

(16.2.5.1) General

The Translate instructions differ from other SS instructions in that the byte addresses move irregularly through a translation table in storage. Operand one is still processed sequentially starting with the low order storage byte $(B1+D1)$. For this reason, source bytes are fetched one at a time from storage. Each operand two address that is formed is compared to the word address of the operand one word currently in the K register. If the table byte is in K, the GT K with S trigger is set and K is used for the source byte.

When the operand one address is formed, it is transferred to K. From K, bits (24–28) are gated to AOE and the AOE is gated back to K (24–31), thus setting K (29–31) to zero. K is transferred to M and subtracted from each operand two address. If any difference is within zero to seven, the 0–7 Overlap trigger is set and this causes the GT K with S trigger to be set. When operand one word boundaries are crossed, the Y and Z latch is added to $B1+D1$ to generate the fetch address. Using this method of generation gives an address with the low order three bits zero.

(16.2.5.2) Set-up functions

SU1

The VFL fetch request trigger is set with SU T1 for Single Cycle operation. This early set is not required for Translate but is used for simplicity since all other SS instructions advance the request for Single Cycle.

SU2

Set VFL fetch request trigger and gate AA to SAR and H.

SU3

Gate H (21–23) to the T pointer and H (0–23) to K.

SU4

The low order three bits of the address in K are set to zero by gating K (24–28) to AOE and AOE (0–7) back to K (24–31).

The Y and Z counters are reset to zero. For the Translate instructions, Y and Z start at zero and are counted up until equal to IOP (8–15).

SU5

The adjusted address in K is transferred to M. From there, it will be compared to each operand two address for possible overlap.

SU8

The first word to be translated is transferred from J to K. The GATE TD OUT trigger is set with SU L8. This allows the byte from K, specified by T to pass through the LBG.

SU9

The first iteration sequencer, PF T1, is set by SU L9.

(16.2.6) INTERRUPTS

The only interrupt that can be initiated during Set-Up is Address Invalid. The Address Invalid trigger is normally set to the value of the Address Invalid line with each J Advance. For SS instructions, the trigger can be set but not reset with J Advance. With this arrangement, Invalid Address indications are accumulated and then the trigger is sampled at the end of Set-Up. The Address Invalid trigger is reset with SU1.

The Address Invalid trigger is sampled at SU7 and SU9. If it is on, the sequence is switched to SEQ T4 and the Store/Fetch trigger is set. These two together make SF3 which is the start of the End Sequence.

(16.3) Iterations (and direct control)

(16.3.1) DECIMAL ITERATIONS

This section describes the iterations for all SS decimal instructions except Multiply and Divide. Multiply and Divide are described in the next section. All iterations start with the following initial conditions:

(1) Word B1+D1+L1 in K,
(2) Word B2+D2+L2 in L,
(3) IOP (8–11) in Y,
(4) IOP (12–15) in Z,
(5) Starting byte address for operand No. 1 in T,
(6) Starting byte address for operand No. 2 in S,
(7) Either GT L with S or GT K with S on, depending on the state of the 0–7 Overlap trigger,
(8) GT TD OUT trigger on for MVO, CP, AP, SP.

The first iteration sequencer is set with the SU9 latch. The iteration cycles continue until a word boundary is encountered or the execution is complete.

(16.3.1.1) Move with offset (MVO)

Move With Offset is a combination move and shift left one digit as the name implies. The DB/DC is used as a buffer to hold the HOD of each byte until the next cycle when it is gated into the DA as the LOD. The L1 length determines the end of the operation. If the source is exhausted before the destination, the GT K/L with S triggers are reset and parity is forced to the RBG. All other gates are unchanged. This fills out the remainder of the destination with high order zeros.

(16.3.1.2) Pack (pack)

The DB/DC is used as an intermediate result buffer. DB/DC must be used because K is used as temporary storage and the result byte cannot be put in storage until it is complete.

One destination byte is put in K at the end of IS1 and every IS3. This means that the Store/Fetch sequence is entered from IS1 or IS3 and always returns to IS2. A source byte is used for each cycle, IS1, IS2 and IS3. The prefetch sequence can be entered from any of the three sequencers. Therefore, the VFG T2 trigger is set with (S PTR=0) & (IS2 LTCH) to remember which sequencer should be turned on after the prefetch.

The destination length determines the end of the operation. If the source is exhausted before the destination, the GT K/L with S triggers are reset and parity is forced to the RBG. This fills the remaining destination bytes with high order zeros.

(16.3.1.3) Unpack (UNPK)

The first cycle is the same for Pack and Unpack. For Unpack, one source byte generates two destination bytes. The source bytes must be "fetched" from K or L only once because the first destination byte generated for a given source byte may be stored on top of the generating source byte. As an example, assume the two operands were located in the same storage word. The source byte 3 could be generating unpacked destination bytes 3 and 4. For this reason, the source bytes are put in DB/DC during IS2 and DB/DC is used as the source during IS3. Here, as in Pack, DB/DC is only needed for overlapping fields. Since it gives the correct result for non-overlapping fields also, only one method of execution is used.

The Prefetch sequence is entered from IS1 or IS3. The Store/Fetch sequence can be entered from IS2 or IS3. Therefore, the VFL T2 trigger is set with (T PTR=0) & (IS2 LTCH) to remember which sequence should be set after the Store/Fetch is completed.

PSW bit 12 determines which zone code is used for the unpacked result. PSW bit 12 equal to zero gives the BCD zone of 1111. PSW 12 equal to one gives the ASCII zone of 0101. The BCD zone is forced at the digit gates and PSW bit 12 controls the gating of DA bits 0 and 2 back to K. Removing bits 0 and 2 from the BCD zone gives the ASC zone but does not change the parity.

(16.3.1.4) Zero and Add (ZAP)

The first source word is set into L with the SU9 latch and, therefore, IS3 is used to examine the source sign. The polarity of the sign must be known so that the machine preferred sign can be forced.

When the ZAP source is exhausted and the destination is filled out with high order zeros, the destination may be exhausted first and the remaining bytes of the source zero detected for overflow. VFL T6 trigger is set if an overflow condition occurs. VFL T1 and T2 triggers are set when Z and Y are counted down to 1110. These are used to generate gates for exhausted source and destination conditions.

The Condition Register is set during the last Store/Fetch sequence with the SF4 latch.

(16.3.1.5) Decimal compare (CP)

In Decimal Compare, if the two operands have like signs, operand two is subtracted from operand one to determine which is the larger. If the two operands have unlike signs, operand two is added to operand one and the sum is zero detected. If the sum is non-zero, the positive operand is the larger. If the sum is zero, the two operands are both zero, and therefore, equal.

The execution is not complete until all bytes in both operands have been examined. Gates are provided for validity-checking both operands.

The VFL T3 trigger is used as a true/complement trigger for CP, AP and SP. Therefore, VFL T3 controls the true/complement and parity adjust gates. VFL T3 is off for true add and on for complement add. When doing a true add, the right side parity must be adjusted for the excess six gating into DA. When doing a complement add, the right side parity is adjusted for the sign removal only.

The Condition Register is set during the last Store/Fetch sequence with the SF4 latch.

(16.3.1.6) Decimal add and decimal subtract (AP and SP)

The only difference between AP and SP is the setting of the True/Complement trigger, VFL T3.

The first cycle (IS3) is for examining the signs and setting the sign trigger. Since the pointers are not stepped during IS1, the sign decoding does not need to be latched to set VFL T3 as IT1 with A time.

When doing a true add, the right side parity adjust must correct for the excess six gating into DA. The GT HOD DEC TRUE TO PAR ADJ line gates HOD Equal 4/5 to an EXCLUSIVE OR with INVERT SIGN. The two phases of the EXCLUSIVE OR gate the left parity or its complement, alternatively, as the adjusted parity. This adjusts for the three possible changes to the sign byte: One—the incoming sign is degated and the machine-preferred plus sign (for BCD or ASCII, alternatively) is forced at the Digit gates; two—if the high order digit is gated Decimal True, a 4 or 5 changes the parity; three—if the LBG sign is negative, the low order bit of the forced sign is inverted to make the result sign minus. The RBG HOD equal 4 or 5 is derived from RBG1 and not RBG2.

The operation is not complete until every byte in both operands has been examined. When operand one is exhausted, VFL T2 is set, the GT TD OUT trigger is reset and parity is forced to the left side of the DA input. When operand two is exhausted, VFL T1 is set, GT K/L with S triggers are reset and parity is forced to the RBG. When both operands are exhausted, SF1 is set instead of IS2. During this Store/Fetch sequence, the last result word is stored and one of the following happens:

(1) The operation is terminated if the result is correct as stored.

(2) The sign of the result is set plus for a negative zero result and the operation is terminated.

(3) The first word of operand one is fetched to start recomplementation if the result is in complement form.

The S and T pointers contain the same byte address: the S pointer controls gating of K bytes to the true/complement input of DA; the T pointer controls putting the bytes back in K.

For a true add, the DA CARRY TGR is not released after the destination is exhausted. A carry from the high order byte of the destination is held in the carry trigger until both operands are exhausted, at which time VFL T6 is set. (VFL T6 is set with DA CARRY TGR and TRUE ADD, T1, T2 and SF1 latch.) For both true and complement adds, the RBG is zero detected after the destination is exhausted. If a non-zero digit is detected, VFL T6 is set. The decimal overflow interrupt is set with: (AP or SP or ZAP) and (VFL T6) and (PSW bit 37) and (VFL END SEQ TGR).

The condition register is set during the last store/fetch sequence with SF4 latch.

(16.3.2) LOGICAL MOVE, CONNECTIVE AND COMPARE ITERATIONS

This section describes all logical SS instructions except the Edits and Translates. One iteration sequencer, IS2, is used for all these instructions with the exception of Move Transmit Mode. Move Transmit Mode uses the Store/Fetch and Prefetch sequences only. The iterations start with the following initial conditions:

(1) Word $B1+D1$ in K
(2) Word $B2+D2$ in L
(3) IOP (8–15) in Y and Z
(4) Starting byte address for operand No. 1 in T
(5) Starting byte address for operand No. 2 in S
(6) Either GT L WITH S or GT K WITH S on, depending on the state of the 0–7 OVLP TGR
(7) The GT TD OUT trigger is on for all instructions except MVC The first iteration sequencer is set with the SU9 latch. The iterations continue until a word boundary is encountered or the execution is complete. The CR is set for CLC, NC, DC, XC, TRT and EDMK during the last Store/Fetch sequence with SF4 latch.

(16.3.2.1) Move (MVC)

Move does just what it says: it moves data from one location to another. Normally, its execution is one byte at a time. However, if the two operands are (1) *not overlapped*, (2) *start on word boundaries*, and (3) are *more than one word in length*, the move will be done one 64-bit word at a time. This is called Move Transmit Mode. If the operands do not end on word boundaries, the Transmit Mode reverts back to the normal byte mode.

The first destination word is fetched during set-up because it may be needed for execution of overlapping fields. After set-up, the destination is stored but not fetched. When the two operands start within eight bytes of each other, but in different words, the source bytes in the second word that do not actually overlap the destination must be fetched. This is done by fetching the first destination word. Once the source actually moves into the overlap area, no more storage words are required because the source is being generated in K.

Bytes are moved (in a byte type move) from L to K, or from K to K, depending on overlap conditions. Both HOD and LOD are gated Binary on the DA right side and parity is forced to DA left. The DA output is put in K.

If both operands (1) start on 64 bit word boundaries, (2) at least *two words apart* in storage, and (3) there are *more than eight bytes* to be moved, the Move Transmit Mode is entered. Move Transmit Mode moves 64 bit words. In the Transmit Mode, the first source word fetched is transferred to the K REG and stored just as soon as an accept is received from the second source fetch. When each store is completed, another Prefetch is started. The first cycle gates the prefetched word from the M REG to AM T/C. The AOB is gated to the L REG as usual, and is also gated to the K REG. This is the next word to be stored. If another source word is to be fetched, the Prefetch sequence continues after PF1. If the word in the K REG is the last full word to be moved, the Store/Fetch sequence follows PF1. If a partial word remains, the move reverts back to the byte mode and the IS2 sequence follows PF1. The VFL T2 trigger is turned on with SU9 latch if the conditions are met for Transmit Mode.

The Y/Z length counters are decremented by eight with each setting of the SF3 latch when in the Transmit Mode. If an even number of words are to be moved, the low order three bits of the length would be ones ($Z=X111$). Therefore, the Y/Z counters will be equal to 1111–1111 when one word remains to be stored. This value in Y/Z causes SF3 to follow PF1 and the last full word is stored. If there are two odd bytes in addition to the full words to be moved, the three low order bits of the length will be 001. With this value in Y/Z, IS2 follows PF1. The partial word is moved one byte at a time in order to set the mark register correctly. The sequence is switched from IS2 to SF3 when the Y/Z latch equals 1111–1110. This is the end of operation condition for the byte move.

(16.3.2.2) Move numerics and move zones (MVN and MVZ)

These two moves take a part of each source byte and put it in a destination byte, leaving the remainder of the destination byte unchanged. For MVN, the LOD is gated to DA right and the HOD is gated to DA left. For MVZ, the HOD is gated to DA right and the HOD is gated to DA left. For MVZ, the HOD is gated to DA right and the LOD is gated to DA left. Both operands are fetched from the L or K registers, depending on the overlap conditions.

(16.3.2.3) AND, OR and EXCLUSIVE OR (NC, OC and XC)

The SS logical connectives use the AOE. The output of the AOE is normally the OR of the two inputs. If either the AND or the EXCLUSIVE-OR function is desired, a gating line must be activated.

Parity is generated for the output of the AOE; the incoming parities are checked by gating the two bytes into the DA and checking the half sums.

(16.3.2.4) Logical compare (CLC)

The SS logical compare moves from left to right through the operands, making a byte by byte comparison. The operation continues until (1) an unequal comparison is found (DA sum non-zero) or (2) the operands are exhausted.

(16.3.3) TRANSLATE AND TRANSLATE-AND-TEST (TR AND TRT)

The initial conditions for TR and TRT are as follows:
(1) Word $B1+D1$ in to K REG,
(2) Address $B1+D1$ in the M REG (with the low order three bits zeroed),
(3) Y and Z reset to zero,
(4) Starting byte address for operand No. 1 in the T LCH,
(5) GT TD OUT trigger on.

TR and TRT are very much the same; their differences are:
(1) TR does not examine the translated bytes before storing them; TRT translates destination bytes for examination and does not store any bytes.
(2) TR is complete when all destination bytes have been translated; TRT is complete when a non-zero byte is found or all bytes have been translated.

For Translate, the word address of the word in the K REG (destination word) is compared with each table address. If the difference is 0–7, the word being fetched is actually in the K REG. In this case, the table byte is taken from K instead of from the word returning from storage. Each time another destination word is fetched, the low order three bits of the address are set to zero and the address is put in the M REG. Each table address is transferred from the H REG to the K REG and the value in M is subtracted from the value in K. The difference is put in the K REG and is sensed for a value of 0–7. If K does not equal 0–7, GT L WITH S is set; if K does equal 0–7, GT K WITH S is set. While the address comparison is being made, the current destination word is held in the J REG.

Overlapping the table word return with the address calculation for the next fetch requires two destination byte addresses. One is the byte address where the translated byte is to be stored (temporarily in K). The other byte address is that of the next byte to be translated. A hold is used on the T pointer latch to prevent it from changing after the T pointer has been advanced. This holds the store byte address in the T latch which selects the byte to be stored in the K REG. The T register is advanced to control the gating out of the K REG. This gates the next destination byte through the LBG to the AA for the address calculation.

VFL T8 trigger is used to prevent YZZ from being stepped until after the first byte is translated. YZZ is stepped until it equals IOP (8–15). Therefore, YZZ is stepped for each byte process after the first byte. This corresponds to the definition of the operand length, i.e. the number of bytes to the right of the first byte.

After the Set-Up and Store/Fetch sequences, the VFL T1 trigger is off, and is then set with the PF1 latch. The VFL T1 trigger gates operations on data returned from storage, but in the first sequence after Set-Up or Store/Fetch, there are no words returning.

For TRT, if a non-zero function byte is found, the mark sequence is started. The mark sequence starts with VFL SEQ A. For TRT, the mark sequence ends the operation. The current byte count in YZZ is added to $B1+D1$ to arrive at the byte address of the destination byte, which translated to a non-zero byte. This address is put in the low order 24 bits of GR1. This is accomplished by first putting the address in the K REG and then gating the high order eight bits of GR1 to the K REG. K (0–31) are then put in GR1. Then the contents of GR2 is put in K and the non-zero table byte is inserted in K (24–31). K (0–31) is then put in GR2.

Because a General Register is being set during the last cycle, the VFL THRU signal is delayed until the IS1 latch comes on, just one cycle before the end. VFL THRU sets the VFL END sequence trigger.

(16.3.4) EDIT AND EDIT-AND-MARK (EDT AND EDMK)

The initial conditions for the Edits are:
(1) Word $B1+D1$ in the K REG
(2) Word $B2+D2$ in the L REG
(3) Y and Z reset to zero
(4) Starting byte address for operand No. 1 in T
(5) Starting byte address for operand No. 2 in S
(6) GT L WITH S trigger on
(7) GT TD OUT trigger on
(8) SC set to one
(9) The first byte of operand No. 1 in DB/DC.

This is the fill character. The two sequencers used for Edit iterations are IS2 and IS3. The IS2 sequencer conditions the gates to unpack and validity check the HOD and sign detect the LOD of a source byte. The IS3 sequencer conditions the gate to unpack the LOD of a source byte. One pattern byte is examined every cycle. Once a sequencer is turned on, it stays on until the conditions are met to unpack a digit. (These conditions being met are referred to as Examine Digit.)

Sequencer IS2 is set with SU9 latch. When the HOD is unpacked, IS2 goes off and IS3 is turned on. When the LOD is unpacked, IS3 goes off and IS2 is turned on. The S pointer is stepped when going from IS3 to IS2. The iteration sequencers are on for an unpredictable number of cycles. The pattern bytes and S trigger (VFL T5) determine when a digit is unpacked. When IS2 is on and the conditions are met to unpack a digit, if the LOD is a sign (1010–1111) the S pointer is stepped and IS2 remains on. Stepping S and not turning IS3 on skips over the sign so it is not unpacked into the result. When a positive sign is detected (1010, 1100 or 1111) the S trigger is reset.

On each cycle that a source digit is not examined, either the fill character is gated from DB/DC to K or K is left unchanged.

The zone that is forced in unpacking digits will be either 1111 for BCD mode or 0101 for ASCII mode, depending on the PSW bit 12: if zero, it indicates BCD mode and if 1 it indicates ASCII mode. The BCD zone is forced at the RDG, on the DA right side input. If the PSW bit is on, bits 0 and 2 of the AV output latch are degated and do not go to the K REG. This changes the BCD zone to an ASCII zone but does not change the parity since an even number of bits are removed.

The VFL status triggers are used for Edits, as set forth in the following paragraphs.

VFL T1 remembers that the S pointer should be stepped when returning to the iterations from a Store/Fetch or mark sequence. VFL 1 is set by:

IS3 LTCH, or
IS2 LTCH and EXAMINE DIGIT LTCH and EDIT SIGN LTCH

It is reset by IS2 LTCH (Set blocks reset).

VFL T2 remembers which sequencer should be turned on when returning to the iterations from a Store/Fetch or mark sequence. ON indicates IS3, and 0.

VFL T2 is set by: IS2 LTCH and EXAMINE DIGIT LTCH.

VFL T2 is set by: IS2 LTCH and EXAMINE DIGIT LTCH and NOT EDIT SIGN LTCH, or IS3 LTCH and NOT EXAMINE DIGIT.

It is reset by: IS2 LTCH or IS3 LTCH (Set blocks reset).

VFL T1 and VFL T2 combinations and sequences are as follows:

IS2: Step FT1 & A NOT T2
IS2 SF: IS2 NOT T1 & NOT T2

IS2: SF+MARK: IS3 Step S T1 & T2
IS3: SF+MARK: IS2 Step S T1 & NOT T2
IS3: SF: IS3 NOT T1 & T2

VFL T3 remembers the zero field condition for a source number. It is used to set the Condition Code.

VFL T3 is set by: SU9 LTCH or EDIT FIELD SEP LTCH.

It is reset by: EXAMINE DIGIT LTCH and NOT ZERO DIGIT LTCH.

VFL T4 remembers that a prefetch is required after a Store/Fetch. The S pointer being equal to seven is not sufficient information to start a prefetch. Examine Digit and Edit Sign LTCH indicate whether the last digit has been used. At the end of a Store/Fetch this information is gone.

VFL T4 is set by: IS3 LTCH and S PTR=7 and EXAMINE DIGIT or EDIT SIGN LTCH.

It is reset by: PF1 LTCH.

VFL T5 is used as the S TGR control.

VFL T5 is set by: DIGIT SELECT LTCH and NOT EDIT ZERO DIGIT LTCH or SIGN START LTCH.

VFL T7 holds the address invalid indication for the source field until a digit is used from the invalid word. VFL T7 and the Examine digit set the interrupt triggers.

VFL T7 is set by: ADDRESS INVALID LTCH and PF4 LTCH.

It is reset by: ELC LTCH.

The following latches are used for Edits to hold the control condition over A time:

EDIT DIGIT SEL LTCH: turned on by LBG EQUAL DIGIT SELECT.

EDIT SIG START LTCH: turned on by LBG EQUAL SIG START.

EDIT FIELD SEP LTCH: turned on by LBG EQUAL FIELD SEP.

EXAMINE DIGIT LTCH: turned on by LBG equal to a DIGIT SELECT or SIGNIFICANCE START character.

OTHER CHARACTER LTCH: title which refers to the off output. Turned on by LBG equal to Digit Select or Significance Start or Field Separator character.

EDIT SIGN or RBG NOT ZERO LTCH: turned on by (RBG LOD SIGN and EXAMINE DIGIT and IS2 TGR and ED+EDMK) OR (AP+SP+ZAP+TRT AND RBG not zero).

EDIT POSITIVE SIGN LTCH: turned on by ED +EDMK and IS2 TGR and RBG SIGN PLUS.

The HOD of each source byte is validity checked when it is examined. If it is invalid, the Data Check interrupt triggers are set if T7 is off. T7 on indicates that the word came from an invalid address and the Invalid Address interrupt is given priority.

The byte address is calculated by adding $$B1+D1+(Y-Z)$$

The current pattern word is transferred to J while the address is inserted in GR1 and brought back to K during SEQ D. The address is put in K (8–31) and then the high order eight bytes of GR1, which is brought out to the M register, are gated into K (0–7). K (0–31) is then put away in GR1. IS1 returns the execution to:

(1) IS2 if NOT T2 and NOT SET (SF1 or SF3)
(2) IS3 if T2 and NOT SET (SF1 or SF3)
(3) SF1 if Y & Z≠IOP (8–15) and T PTR=7
(4) SF3 if Y & Z=IOP (8–15)

The Pattern field (Operand No. 1) is:

b SS DS6 DS DS DS b DS DS DS
                 b b b FS DS DS DS DS b SS A T
FS DS DS·DS DS DS FS b DS DS
                       DS SS DS·DS DS

The source field is:

00 12 34 56 00 02 5+00 00 03 4+00 00 08 5+

The result is:

bbbb123b456bbbbbb25bb A Tbbbb-034bbbbbbb0-85
0 123 456    25 AT  .034  0-85 where the second line shows how the result would be on a printer when the "b's" are replaced by blanks.

(16.3.5) DIRECT CONTROL

The Store/Fetch sequencers are used for the WRD & RRD instructions. The Store/Fetch trigger is set with the E GO condition which also sets VFL SEQ T2. The sequence is SF1–5 FOR BOTH INSTRUCTIONS.

The timing for the pulsed signals is generated by oring together three sequencers and their latches. The three sequencers used are A, B and C. To preserve the correct timing when in single cycle mode, the B and C sequencers are set with the A running clock. This means once the A sequencer is set, the other two follow with the normal timing relationship.

The Y & Z counters are set during the last cycle of every instruction, regardless of format, and during every cycle between ELC and the first cycle of the next instruction. Therefore, at the beginning of either RDD or WRD, Y & Z contain IOP (8–15). Y & Z are gated to the direct data register with the timing signal described above. This timing signal also generates Read Out and Write Out.

(16.3.5.1) (Write direct (WRD))

Write Direct fetches a word from storage, puts it in K and gates the addressed byte to the direct control register. The direct control register is set with a running A clock and its release is gated with VFL SEQ LTCH. This maintains the correct relationship between the register setting and the rise of the Signal Out.

Read Direct gates Direct In data lines to the AOE. The AOE generates parity and the AOE output is put in the addressed-byte of K. The parity check on K is blocked until the byte read in has been through the AOE a second time to generate parity. This prevents a data change at the input to the AOE, just before the latch is locked, from causing a machine check (K register parity error). If the data changed just before the latch locked, the parity generator might not have time to adjust before the fall of the A clock that sets K. As the byte goes from K, to the AOE, to K, the VFL store request trigger is set.

The Hold In line being down when SF1 latch or SF2 trigger are one, allows VFL T2 to be set. The VFL T2 latch sets SF3 and resets SF2. VRL T2 is used as a buffer to prevent timing malfunctions on the Hold In line from causing sequencing faults. VFL T2 LTCH blocks the release of K so that the byte which is set in K when VFL T2 is set, is the byte stored.

(16.4) Store/Fetch (SF)

(16.4.1) INTRODUCTION

The Store/Fetch sequence handles operand No. 1 storage words. The primary function of the sequence is to store a completed result word and fetch the next word to be processed. There are variations of the sequence that store only, fetch only, make two stores, or make no store or fetch. A store only sequence starts with SF3. A fetch-store sequence and a fetch only sequence start with SF1.

In all of these sequences, if the end execution conditions exist, VFL End Sequence is set with SF3 latch and SF5 is the last cycle. The SF5 sequencer is the last cycle for all instructions with one exception, TRT. For TRT, if a non-zero function byte is found, the excution is completed with a put-away sequence of A–B–C–D–IS1–IS3.

(16.4.2) STORE/FETCH FOR AP, SP

There are two conditions that cause a Store/Fetch to be initiated:

(1) T=0, a word boundary is being crossed.
(2) Y=1110 and Z=1110, both operands have been processed.

Both of these conditions start the Store/Fetch sequence at SF1. The sequence has three different functions.

(16.4.2.1) Crossing a word boundary or last store

This sequence is used for add/subtract first pass, and the recomplement pass. When crossing a word boundary, a result word is stored and the next destination word is fetched. When Y and Z equal 1110, the result has the correct sign and is in true form, the last result word is stored. Following is a description of the function of each cycle in this sequence:

SF1

Eight is gated to AA if two destination words remain to be processed ($Y<7$). The VFL fetch request trigger is set if another destination word is required ($Y \neq 1110$). This fetches ($B1+D1+8$) if two words remain and ($B1+D1+0$) if one word remains. If both operands have been processed ($Y$ and $Z=1110$) and the last word of the destination has not been stored (T5 on), the VFL store request trigger is set. This stores word ($B1+D1+0$). The Overlap triggers are reset with SF2 latch, when $Y$ and $Z=1110-1110$, in preparation for recomplementing.

SF2

Sixteen is gated to AA if two destination words remain to be processed ($Y<7$). Two words remaining means that the word which was just completed was the third word. Eight is gated to AA if one destination word remains to be processed ($Y<7$). The sequence waits in SF2 for an Accept to come back from the BCU if a request was set during SF1.

SF3

T1 is set when $Z=1110$ and T2 is set when $Y=1110$. If $L2 \leq L1$, the last store will be made during SF1 of the Store/Fetch sequence when $Y$ and $Z=1110$. If T1 and T2 are both on, the store request is blocked at SF3. This occurs when $Y$ counts down to 1110 and a destination word boundary is crossed before Z counts down to 1110. In this case, T5 blocks any further store request. If $L2=L1$, and Z does count down to 1110 before a destination word boundary is crossed, the last store request is made at SF1.

The VFL end sequence trigger is set with SF3 latch if T1 and T2 are on, and the result is in true form or if the E Interrupt trigger is on.

SF4

The sequence waits in SF4 for an Accept from BCU if a request trigger was set during SF3. If $Y=1110$, SF4 latch sets T5 to remember the last store has been made.

If the 0-7 Overlap trigger is on, the GT L with S trigger is set. The 0-7 Overlap trigger on indicates that the source and destination were operating out of the same storage word. The destination crossing a word boundary moves that operand out of the storage word that the source is currently in. During SF5, the word in K will be put in L where it will continue to be used as a source word. The condition register is set with SF2 if the VFL end sequence trigger is on.

SF5

The state of the two overlap triggers indicates the difference between the starting addresses. If the 0-7 Overlap trigger is on, the two operands will move in and out of common storage words. Each time a source word boundary is crossed, the source is moving into the same storage word out of which the destination is currently operating. Each time a destination word boundary is crossed, it is moving out of the word from which the source is currently operating. If the 8-15 Overlap trigger is on, the next word required by the source is being generated as a destination in K. Instead of prefetching, K is transferred to M as it is being stored.

If VFL end sequence is on, the ELC is set with the SF4 latch, and this is the last cycle.

SF6

J is gated to K during SF6. For one case, when the last destination word is being stored and the processing of the source is not complete, no word has been fetched to J. However, J should be valid and it is gated to K.

If the Address Invalid trigger is on, the SF6 latch sets SF3 instead of IS2 and the operation is ended.

(16.4.2.2) Change sign

For the instructions AP and SP, a positive sign is required if the result is zero. If the result is zero, it is in true form and does not require complementing. Therefore, there is never a need to change the result sign and prepare to recomplement during the same sequence.

The Result ZD trigger off when $Y$ and $Z=1110$ indicates a zero result. The byte address of the sign byte is calculated. A byte with positive sign and zero digit is generated in the AV and placed in K at the address calculated, setting the Mark corresponding to that byte. This byte is stored and the operation ends with SF5.

The following is a description by cycle of the Change or Invert sign sequence:

SF1

With $Y$ and $Z=1110$, there is no increment gated to AA. If a store is stored, it is the ($B1+D1+0$) word. If T5 is off, the VFL store request trigger is set.

In preparation for generating the starting byte address ($B1+D1+L1$), IOP (8–11) is gated to Y.

SF2

The sequence waits here for an Accept from the BCU if a request trigger was set during SF1.

The gate of Y to AA (28–31) is started in SF2 and continues through SF3.

SF3

This is the cycle at which the second request is normally set; however, the BCU Mark register must be set at the same time or before the BCU store request is set. To set the Mark register, the address must be calculated, put in H, transferred to the T LTCH and then to the Mark register. For this reason, the request is then delayed one cycle. To maintain the normal ending sequence, the VFL SEQ A is inserted between SF3 and SF4.

SEQ A

The sign byte address is gated from H to the T LTCH which controls the K byte release and the setting of the Mark register. The positive zero byte is generated and put in K. The VFL store request trigger is set but the normal function of gating AA to SAR and H is blocked. The address was set in SAR and H during the previous cycle.

The SEQ A latch sets VFL end sequence trigger and generates a VFL thru to the I unit.

SF4

The sequence remains in SF4 until the Accept signal returns. The condition register is set with SF4.

(16.4.2.3) Start recomplement pass

Decimal data must always be in true form at the start and end of an operation. Therefore, if the result of an AP or SP is in complement form after the first pass, another pass must be made through operand one to recomplement it. Preparation for the recomplement pass is made during what would otherwise be the last store sequence.

A description by cycle of this sequence is as follows:

SF1, SF2

These sequences are the same as they are for the Change sign, hereinbefore. The Overlap triggers are reset with the SF1 latch so that none of the overlap functions will be executed during the recomplementing pass.

SF3

The VFL fetch request trigger is set to fetch $$(B1+D1+L1)$$

This could be the word that was stored during SF1 of this sequence, but to keep the controls as simple and straightforward as possible, the fetch request is always made.

SF4

The sequence remains in SF4 until an Accept for the fetch request is made in SF3. The starting byte address is gated from H to T LTCH to T. To get the T LTCH into T register unchanged, the Count S and T Down line must be degated with the SF4 latch.

T4 is set to remember that the following sequences are for recomplementing.

SF5

The GT K with S trigger is set to gate the K bytes through the RBG to the $T/C+6$ gate.

T2 is reset since Y contains L, and is no longer equal to 1110.

The I3 trigger is set with the SF5 latch to start the add/subtract sequence in the normal way.

SF6

The SF6 latch is enabled with the J Loaded trigger. This means that the sequence will wait here for the word requested at SF4 to return. IS3 latch is also enabled with the J Loaded trigger for AP or SP and T4.

(16.4.3) STORE/FETCH FOR ZAP, CP, MVO

This group of instructions have Store/Fetch functions similar to those of AP and SP but without all the variations.

(16.4.3.1) ZAP

The Zero and Add Store/Fetch sequence only stores. Therefore, if Y and $Z \leq 1110-1110$ and $T=0$, SF3 is set and the sequence runs SF3 through SF6. If Y and $Z=1110-1110$, SF1 is set and the sequence runs SF1 through SF5. This last sequence stores a positive sign if the result was a negative zero.

(16.4.3.2) CP

The Decimal Compare instruction does not store a result and therefore, the Store/Fetch is a fetch only sequence. The sequence starts at SF1 and runs to SF5 or SF6, depending on whether the operation is complete or not.

The following is a description, by cycle, of the CP Store/Fetch.

SF1

Eight is gated to AA is $Y<7$. The VFL fetch request trigger is set of $Y \neq 1110$. The reset for the Overlap triggers is for AP and SP in preparation for recomplementing.

SF2

The sequence remains in SF2 until the Accept signal is received for the fetch request, if it was made.

SF3

The VFL end sequence trigger is set of Y and $Z=1110-1110$.

SF4

T5 is set if $Y=1110$. This blocks Store/Fetch from starting again until Y and $Z=1110-1110$.

SF5

K is gated to L for 0–7 overlap and K is gated to M for 8–15 overlap.

SF6

J is gated to K when J is loaded.

(16.4.3.3) MVO

Move-With-Offset, being a move type instruction, does not fetch the destination. The Store/Fetch routine is started at SF3 for storing only, and runs to SF5 or SF6. The SF6 sequencer is used to separate SF5, the last cycle sequencer, and the iterations. The SF6 is normally used to gate J and K but no fetch is made for MVO.

T5 need not be set, since the VFL end sequence is set when $Y=1110$.

(16.2.2) STORE/FETCH FOR PACK, UNPK

The PACK and UNPK instructions do not move through both operands at the same rate. This means the starting address relationships do not remain static throughout the execution. Therefore, overlapping fields must be handled differently from other instructions.

(16.4.4.1) Non-Overlapping fields

If it is determined during Set-Up that the starting addresses are not close enough together to have overlapping fields, PACK and UNPK are treated like MVO. The Store/Fetch sequence is entered at SF3, and the completed result word is stored. The VFL end sequence trigger is set when $Y=1110$.

(16.4.4.2) Overlapping fields

The overlap triggers are set during Set-Up as follows: 0–7 if $$0 \leq (B2+D2+L2)-(B1+D1+L1) < 8 \text{ for PACK}$$

$$-8 < (B2+D2+L2)-(B1+D1+L1) < 8 \text{ for UNPK}$$

8–15 if $$8 \leq (B2+D2+L2)-(B1+D1+L1) < 16 \text{ for PACK and UNPK}$$

With these initial conditions and the field length limitations, it is possible to monitor the two low order word address bits (H19 and H20) to determine when the operands are in the same storage word. These two bits are put in the ER and SC positions 1 and 2 during Set-Up. Each time a word boundary is crossed, the corresponding address (ER for operand No. 1 and SC for operand No. 2) is decreased by one and then the two registers are compared. If the two registers are equal, the operands are going to be working on the same storage word.

Other details are similar to the AP, SP Store/Fetch sequence.

(16.4.5) STORE/FETCH FOR MVN, MVC, MVZ, NC, CLC, OC, XC

The main difference between the Logical and Decimal SS instructions Store/Fetch sequences is the address generation. A word count is maintained in the ER of the words processed. This word count can be used to generate the increments added to the base address for storing and fetching. This word count is advanced each time a result word is stored. The fetch preceding the store uses $ER+1$ for the address increment. If the source field is crossing word boundaries ahead of the destination, the prefetch address increment will be $ER+1$. Since both operands move through storage at the same rate, a comparison of their starting byte addresses indicates which operand is leading throughout the entire execution. T5 is set during Set-Up of $S<T$, indicating operand two will cross word boundaries ahead of operand one. At the end of either a Store/Fetch, or a Prefetch, the SC will contain the increment for the next fetch.

MVC does not fetch the destination. Therefore, the Store/Fetch sequence is started at SF3 and the prefetch must leave the contents of the ER in the SC for the next address increment.

The following is a description of the unique operation of this Store/Fetch sequence:

SF1

The ER is transferred to SC in preparation for storing result.

SF3

One is added to the ER for word count advance.

SF5

One is added to the ER and the sum is put in the SC. This is a prefetch address increment if the destination is leading the source.

SF6

If T5 is on, one is added to the SC ($ER+2$) and the sum is put in the SC. This is a prefetch address increment if the source is leading the destination. This add is also gated with Not Overlap. If either one of the overlap triggers is on, the prefetch is not overlapped with the iterations. When a source word boundary is crossed, the iterations are suspended while the next source word is fetched. For this case, the address increment is $ER+1$.

(16.4.6) STORE/FETCH FOR ED, EDMK, TR, TRT

It is necessary, for EDMK and TRT, to calculate and put-away in GR1 the full 24 bit operand one address. The easiest way of calculating this address is to count Y and Z up (starting with Y and $Z=0$), instead of down, and add Y and Z to $B1+D1$, when the current byte address is needed. Y and Z register and Y and Z latch can then be used for addressing increments when storing and fetching operand one words at word boundaries.

The two operands move through their storage fields at different rates for ED and EDMK. The stepping of Y and Z corresponds to the processing of operand one bytes. The Y and Z counter has no direct relationship to operand two. Therefore, a word count is maintained in the SC for operand two.

The source storage references move at random through a translation table that can vary in size for TR and TRT. This makes it impossible to make an initial address comparison to determine if there is a possible overlapping of the fields. For this reason, the word address (three low order bits equal zero) of the word in K is placed in M. If the difference between the table address and the word address of the word currently in K is 0–7, the table byte required is in K. The GT K with S trigger is set, and the word returned from storage is not used.

The address calculated during Store/Fetch for the fetch is the address to be put in M. This address must be transferred to M before the store address is put in H. Therefore, the word in K is transferred to M and H is transferred to K. Then K and M are swapped to put the address in M and the result word being stored back in K.

*(16.5) Prefetch sequence (PF)*

(16.5.1) INTRODUCTION

The function of the Prefetch sequence is to fetch source words from storage. While one source word is being processed, the next word is being fetched from storage and put in the M register. When a source word boundary is encountered, the Prefetch sequence is initiated. The first cycle transfers M to L. After the first cycle, the iterations are started again. If another source word is required from storage, the remainder of the Prefetch sequence is allowed to follow the first cycle.

The Prefetch is initiated for decimal instructions, whenever the S pointer equals zero. For Logical instructions, the Prefetch is initiated whenever the S pointer equals seven. If the T pointer indicates a destination word boundary has been reached at the same time as the source word boundary, the Store/Fetch sequence has priority over the Prefetch.

The Address Advance line is brought up with PF1. The Gate Select register is set at B of PF1, and the following A clock sets the third half word of the op code into IOP (16–31). The Addressing Adder sum at the end of PF2 will be $B2+D2+D$, where D is the VFL increment.

(16.5.2) FIRST PREFETCH

The first Prefetch is started during Set-Up. Set-Up sequencers control the address generation and set the request trigger. The word returns after Set-Up is completed and the Iterations started. Therefore, PF3 is set with SU7 latch and reset with Accept from the BCU. PF4 is set with the PF3 latch and the Accept.

Since the first byte in an operand could be located anywhere within a storage word, there may be only one source byte to be processed before a second word is required. This means the first Prefetch would not be complete when the second Prefetch is started. In this case, the PF1 trigger is turned on but the latch is not enabled until the J Loaded trigger is turned on. When PF1 is turned on at the same time as PF4, the M TO AM T/C gating trigger is not set. With PF1 on, J is being gated to AM T/C at this time, and therefore it is J instead of M that is gated to L with the PF1 latch.

(16.5.3) INTERACTION WITH STORE/FETCH

If both operands come to a word boundary at the same time, the Store/Fetch sequence takes priority over the Prefetch and is executed first. This is done for two reasons:

If the Prefetch was allowed to go first, it would delay the Store/Fetch until an Accept was received and possibly delay it even more waiting for the storage cycle to complete. With the Prefetch following the Store/Fetch, most of it is overlapped with the iterations.

If the End of Operation conditions exist, the Prefetch sequence is not needed, and the Store/Fetch sequence ends the executions.

If a destination word boundary is encountered, or the End of Operation conditions occur while a Prefetch is in process, the start of the Store/Fetch is delayed until an Accept is received for the Prefetch request (PF3 latch and Accept).

In some cases are shown operands crossing word boundaries at the same time, and the source crossing a word boundary one cycle ahead of the destination. In one example, two Store/Fetch sequences are shown for the two possible cases F6 storage interferences. Another example shows the Prefetch and Store/Fetch fetching from the same storage bank. The second example shows the Prefetch fetching form the same storage bank that the Store/Fetch is storing into.

It should be noted that with multiple storage units, the two requests made during a Store/Fetch sequence are always made to different storage units and therefore do not interfere with each other.

(16.5.4) DECIMAL INSTRUCTIONS (16.5.4.1) General

The Prefetch sequence is initiated if S PTR=0 and SF1 or SF3 is not being set.

The first source word, $B2+D2+L2$, is fetched during Set-Up. If a second word is required, the first Prefetch is initiated during Set-Up and this fetches $B2+D2+0$ or $B2+D2+8$ depending on whether the operand is in two or three storage words. When the first word boundary is crossed, if the Z counter is greater than 7, PF2 is allowed to follow PF1 and $B2+D2+0$ is fetched. The field length limitation of 16 bytes limits the operand to a maximum of three storage words. If the operand is in two words, the Prefetch initiated at the word boundary consists of only one cycle, PF1.

The S pointer is stepped even after the Z counter latch is equal to 1110 and the operand no longer enters into the result. It would be possible for a one cycle Prefetch sequence to occur even though it is not needed. This is allowed because it should not happen very often; it only wastes one cycle out of many, and it is easier to prevent PF2 from being turned on than it is to prevent PF1 from being turned on.

(16.5.4.2) Overlapping fields

For AP, SP, ZAP and MVO, if the 0–7 Overlap trigger is on, each Prefetch moves the source into the same storage word that the destination is in. For this reason, the GT K with S trigger is set at the PF1 latch and the PF2 is not enabled. If the 8–15 Overlap trigger is on, M is transferred to L as usual. The word to be fetched is being generated in K and will be transferred to M on each Store/Fetch sequence.

Pack and Unpack must be handled differently for overlapping fields. In both instructions, the operands are used at different rates so that the initial address relationships do not hold throughout the execution. The overlap triggers are set according to the address comparisons as follows:

Pack
$0 \leq (B2+D2+L2)-(B1+D1+L1) < 8$ sets 0–7 TGR
$8 \leq (B2+D2+L2)-(B1+D1+L1) < 16$ sets 8–15 TGR Unpack
$-8 < (B2+D2+L2)-(B1+D1+L1) < 8$ sets 0–7 TGR
$8 \leq (B2+D2+L2)-(B1+D1+L1) < 16$ sets 8–5 TGR When either of these two triggers are on, the two low order words address bits (H19 and 20) are put in the ER and SC for the destination and source, respectively. Each time a word boundary is crossed, the corresponding register is decreased by one, and the two registers are compared for equal. If they are equal, it indicates the word boundary crossed moved the two operands into the same storage word. The address bits are in positions 1 and 2 of the ER and SC. They are decreased by adding 11 (the two's complement of 01) to them. The S3 is then subtracted from the ER. If all of the Half Sums of the Exponent Adder are equal to one, the two inputs are equal. Therefore, if $HS=1$'s, set GT K with S and if $HS \neq 1$'s, set GT L with S.

The Prefetch cannot be overlapped with the iterations when either of the overlap triggers is on. This is because the word being fetched might be in K. The Prefetch would fetch the word before the modified word (the result) had been stored. This would give an incorrect result. Therefore, the source fetches are made after the source word boundary is encountered. The AOB is gated to L as well as M with the PF4 latch when one of the overlap triggers is on.

(16.5.5) LOGICAL INSTRUCTIONS

The two Translate instructions do not use the normal Prefetch sequence because source bytes are fetched one at a time from a table and do not follow in sequence.

The Edit instructions do not overlap Prefetch with iterations. The stepping of Y and Z does not have a direct relationship to the source bytes used and therefore it is impossible to determine if another source word is needed until a word boundary is encountered. At a word boundary, if Y and $Z \neq IOP$ (8–15), a word is fetched. If Y and $Z=IOP$ (8–15), the Store/Fetch sequence is started and this having priority, suppresses the Prefetch sequence. It is still possible that a source word could be fetched that is not used. Therefore, the Address Invalid Latch and PF4 latch set VFL T7. The first digit that is examined with VFL T7 on sets the Invalid Address Interrupt.

Since Edits use the two operands at different rates, two separate word counts must be maintained. The Shift Counter (SC) is used to hold a word count for operand number two. Each Prefetch sequence adds one to the SC after it is used for the current fetch (the Set-Up sequence sets the SC to one initially). The SC bits 2–7 are gated to the AA positions 23–28 to generate the address $B2+D2+(SC \times 8)$. The Prefetch not being overlapped with the Iterations indicates the following:

(1) The fetched word is put in L
(2) The Iterations start after PF4 instead of PF1

The other Logical instructions overlap the Prefetch with the Iterations if there is no overlap and do not fetch if either overlap trigger is on. For the non-overlap case, the $ER+1$ is put in the SC during PF2 in preparation for the next Store/Fetch sequence. The word count of processed words is kept in the ER. It is updated each time a result word is stored. Therefore, each Store/Fetch stores at $B1+D1+ER$ and fetches from $$B1+D1+(ER+1)$$

The Store/Fetch sequence leaves either $ER+1$ or $ER+2$ in the SC, depending on whether the destination is crossing word boundaries ahead of or behind the source. When entering either a Prefetch or a Store/Fetch, the SC contains the address increment to be used for the fetch. Since the instructions move through both operands at the same rate, the two operands cross word boundaries alternately.

The Store/Fetch sequence for MVC starts at SF3 and does not fetch. Therefore, the ER is transferred to the SC without being incremented.

Crossing a source word boundary, if the 0–7 Overlap trigger is on, moves the source into the same storage word that the destination is currently in. Therefore, the GT K with S trigger is set so that both operands use bytes from the same register.

(17.0) VARIABLE FIELD LENGTH OPERATIONS

(17.1) Fixed sequence VFL operations

(17.1.1) INTRODUCTION

The fixed sequence VFL operations are a group of instructions that in general handle one byte of data. They are considered as a group because they use "Fixed Sequence" sequencers but use the VFL data flow.

The following data is by description only the portion of these instructions that is done by the E Unit.

(17.1.2) COMMON OPERATIONS

For the fixed sequence type of instructions, there are some things that can be discussed in common:

(1) If the instruction requires a word (byte) from storage, 1ST FXP sequence will loop on itself until J is loaded with that word.

(2) If the instruction requires a store, the STORE sequence will loop on itself until the ACCEPT LCH comes on. The ACCEPT LCH will turn on ELC and TOF BLK T2M. The instruction will then be terminated.

(3) IOP 8–15 is set into Y and Z before the first E cycle of every instruction. For the S1 format instructions this is the immediate operand (12). The condition that sets IOP 8–15 to Y and Z is: (E NOT BUSY or E LAST CYCLE) (B CLK).

(4) For most instructions in this group, it is necessary to use the low order 3 bits of the address in H. Normally, 1ST FXP LCH would gate the set of H21–23 to S and T. In the case where the contents of H are available for only one cycle, and 1ST FXP LCH is inhibited by J NOT LOADED, the byte address would be lost. To insure H21–23 getting set into S and T within one cycle, the VFL T5 trigger is set at the same time as 1ST FXP. T5 stays on for only one cycle. T5 gates H21–23 to S and T LCH and T5 LCH gates the release of S and T. This is done for all instructions in this group except ISK.

(17.1.3) MVI—MOVE, SI

MVI moves the immediate operand (byte from instruction stream) to the location specified by GR $(B1)+D1$.

The byte must be stored so that the VFL STORE REQ trigger is set during 1ST FXP sequence. The immediate operand is gated from Y and Z to AOE with HW LGC sequence. HW LGC LCH gates AOE LCH to K and releases the byte in K that is selected by T PTR. The MARK selected by T is also set.

The byte is now in K waiting to be stored. ELC will terminate the operation.

(17.1.4) CLI—COMPARE LOGICAL, SI

CLI compares the immediate operand to the byte in storage specified by GR $(B1)+D1$. The Condition register is set according to the results.

During 1ST FXP sequence, the immediate operand is gated through AOE. It is set into K24–31 with 1ST FXP LCH. When J is loaded, its contents are gated through MA T/C to L.

The two bytes to be compared are now in K and L. Operand No. 2 is in K24–31 and Operand No. 1 is in the byte in L that is selected by S PTR. During HW LGC sequence the 2's complement of the byte in L is added to K24–31. The AD CAR TGR and RESULT ZERO TGR are released with HW LGC LCH.

The Condition register is set during ELC. The setting of the bits is determined by the AD CAR TGR and RESULT ZERO TGR as follows:

|  | CR | |
| --- | --- | --- |
|  | 34 | 35 |
| Equal compare | 0 | 0 |
| Op No. 1<Op No. 2 | 0 | 1 |
| Op No. 1>Op No. 2 | 1 | 0 |

CR 34+NOT CARRY TGR
CR 35+(CARRY TGR) (NOT RESULT ZERO).

(17.1.5) NI, OI, XI—AND, OR, EXCLUSIVE OR, SI

The logical connective is performed between the immediate operand and the byte in storage specified by GR $(B1)+D1$. The Condition register is set to 00 for a zero result and 01 for a non-zero result.

When J is loaded, its contents are gated through MA T/C to L. Operand No. 1 is now in the byte in L that is selected by S.

The VFL STORE REQ trigger is set during HW LGC sequence. HW LGC gates Y and Z to one side of AOE. GT L WITH S TGR being on gates operand No. 1 from L to AOE. The instruction selects the proper logical connective gate to AOE. HW LGC LCH gates the results from AOE LCH to K and releases the byte selected by T. The MARK is set and the RESULT ZERO TGR is released with HW LGC LCH.

The result is stored, and the Condition register is set with ELC.

(17.1.6) TM—TEST UNDER MASK, SI

TM uses the immediate operand as a mask to test for bits in the first operand. The Condition register is then set to show the results of this test.

When J is loaded, its contents are gated through MA T/C to L. Operand No. 1 is now in the byte of L selected by S.

The AND gate to AOE is up during the operation. Y and Z are gated to AOE during HW LGC and ELC sequences. L WITH S TGR gates operand No. 2 from L to AOE. The gate to AOE is held up during ELC to hold the condition for setting the Condition register.

The Condition register is set as follows:

|  | CR | | AOE Output Lines |
| --- | --- | --- | --- |
|  | 34 | 35 | |
| All bits selected are 0 | 0 | 0 | NOT A B |
| Mask all 0 | 0 | 0 | A or B |
| Selected bits all 1 | 1 | 1 | A NOT B |
| Other conditions | 0 | 1 | NOT A NOT B |

The output lines from AOE are:
A=AOE ALL ONES=(NO MASK)
 +(MASK) (BIT)
B=AOE ALL ZEROES=(NO MASK)
 +(MASK) (NO BIT)

The logical function for each CR bit is:
CR34=A NOT B=(AOE ALL ONES)
 (NOT AEO ALL ZEROES)
CR35=NOT B=(NOT AOE ALL
 ZEROES)

ELC sets the Condition register and terminates the operation.

(17.1.7) LA—LOAD ADDRESS, RX

LA takes the address formed by GR $(X2)+GR$ $(B2)+D$ and puts it into the General register specified by R1.

1ST FXP is an idle cycle. H is not gated through the Incrementer to K because the Incrementer may be used at this time for a high order instruction counter advance.

H is gated through the Incrementer to K with HW LGC sequence. During ELC K0–31 is put away and the operation is terminated.

(17.1.8) STC—STORE CHARACTER, RX

STC stores the low order byte of the GR specified by R1 in the address formed by GR $(X2)+GR (B2)+D$.

The contents of GR (R1) is set from RBL to M with the set of 1ST FXP. During 1ST FXP M is gated through MA T/C to K. 1ST FXP sets VFL STR REQ trigger.

HW LGC forces T OUT DECODE to byte 24–31 and this byte is gated through the decimal adder. HW LGC LCH gates AD LCH to K and releases the byte selected by T. The corresponding MARK is set.

With ELC the byte is stored and the instruction is terminated.

(17.1.9) IC—INSERT CHARACTER, RX

IC takes the byte from storage specified by GR $(B2)+GR (X2)+D2$ and puts it into the low order byte of the General register specified by R1.

GR (R1) is set from RBL into M at the beginning of 1ST FXP and gated through MA T/C into K. During HW LGC the word specified by GR $(B2)+GR$ $(X2)+D2$ is gated through MA T/C to L.

During HW ADD sequence the byte selected by S is gated from L through AD and set into K24–31.

During ELC K0–31 is put-away and the operation is terminated.

(17.1.10) SSM—SET SYSTEM MASK, SI

The byte in storage specified by GR $(B2)+D2$ is set into bits 0–7 of the PSW.

When J is loaded, its contents are gated through MA T/C to K. The I unit is then signaled that the byte is available.

ELC gates the byte in K selected by T to the VFL left byte gate which has a path to PSW 0–7. The IE unit then terminates the operation.

(17.1.11) ISK—INSERT KEY, RR

The Key of the storage block addressed by GR (R2) is inserted in bits 24–27 of GR (R1).

The E unit loops in 1ST FXP sequence until the TAG ADVANCE line comes back from the BCU.

During 1ST FXP GR (R1) is gated through MA T/C to K. The Key is gated to AOE with HW LGC and set into K24–31 with HW LGC LCH. Bits 24–27 hold the key and 28–31 are zero. ELC puts K0–31 into GR (R1) and the operation is terminated.

(17.2) Decimal multiply and divide set-up

This section is an explanation of the sequences that set up the registers and control triggers in preparation for the multiply and divide iterations.

(17.2.1) MULTIPLY SET-UP FUNCTIONS

Before starting the multiply interations, the length of the operands must be checked. If they are incorrect, a specification interrupt must occur.

The multiplier may start at any byte within a word and may cross a word boundary. During set-up, the entire multiplier is fetched and right-aligned in L. The multiplier is validity checked as it is moved.

The multiplicand digits are used from the low order digit of J. Therefore, the low order word of the multiplicand is fetched and right-aligned in J. Subsequent multiplicand words are properly aligned in J when fetched from storage.

K and M are cleared during set-up. This is done because the product is formed in these two registers.

(17.2.2) DIVIDE SET-UP FUNCTIONS

Before starting the divide iterations, the length of the operands must be checked. If they are incorrect, a specification interrupt must occur.

The divisor may start at any byte within a word and may cross a word boundary. During set-up the entire divisor is fetched and right-aligned in L. Each byte is data checked as it is moved.

The high order one or two words of the dividend are fetched to K and M. The low order of the two will go to K if a word boundary is crossed by the initial alignment of the divisor. If no word boundary is crossed initially, the high order word will be in K.

(17.2.3) SET-UP SEQUENCER FUNCTIONS

SU1

IOP 8–15 (L1, L2) is set to Y and Z with E Last Cycle of the previous instruction. The gate of Y to AA is opened with SU L1. It is actually added during the next cycle, but because of the path length, the gate is brought up early.

SU2

The VFL fetch request trigger is set during SU2. This causes $B1+D1+Y$ (L1) to be set into H and SAR.

L2 is compared to 7 and to L1. If $L2>7$ or $L2 \geq L1$, the fetch request is blocked and the set of SU3 is blocked. Termination of the instructions is begun by setting SF3.

SU3

VFL address advance is gated so B2 and D2 will be gated to AA during the next cycle. H $(B1+D1+L1)$ bits 21–23 are set to T. The gate of Z (L2) is opened to AA. SU L3 is not enabled until the previous fetch request has been accepted.

SU4

SU4 sets the VFL fetch request trigger which causes $B2+D2+L2$ to be set to SAR and H.

*Multiply.*—The control trigger T1 is set if $T<4$. Trigger T2 is set if T equals 3 or 7. T1 is used during SU12 to determine if a right shift of 32 is necessary to right-align the multiplicand. T2 determines if a byte shift is necessary during the first time in PF1.

*Divide.*—T1 is set if T $(B1+D1+L1)<Y$ (L1). T2 is set if $Y \geq 8$. T1 or T2 says that the dividend is in two words. T1 and T2 being on says that the dividend is in three words.

SU5

H $(B2+D2+L2)$ bits 21–23 are set to S. SU L5 is not enabled until the previous fetch request is accepted.

*Multiply.*—The gate of Y to AA is opened.

SU6

The VFL address advance is gated so that B2 and D2 will be gated to AA during SU7. The AD gating triggers, L WITH S and TD OUT are set with SU L6.

*Multiply.*—AA $(B1+D1+L1)$ is set to SAR and H.
*Divide.*—AA $(B1+D1)$ is set to SAR and H.

SU7

The actions of SU7 are inhibited and SU L7 is inhibited until J is loaded. When J is loaded, the contents of J $(B1+D1+L1)$ are gated through MA T/C to K and M.

The control trigger T3 is set. T3 will control the setting of the multiplier (divisor) sign trigger during the first time in SU10.

If S $(B2+D2+L2)<Z$ (L2) the multiplier (divisor) is in two words and the VFL fetch request trigger is set. T4 is set to remember that the multiplier (divisor) is in two words.

*Multiply.*—$B2+D2$ is set to SAR by the setting of H $(B1+D1+L1)$ is blocked.
*Divide.*—$B2+D2$ is set to SAR and H.

SU8

The left byte gate (K) is gated to AOE so that the low order byte of the multiplicand (dividend) can be decoded for the sign. T6 is set if the sign is negative.

*Divide.*—The Gate of Z (L2) to AA is opened.

SU9

SU9 resets the T pointer and counts it down by 1 to 7. When J is loaded, its contents $(B2+D2+L2)$ are gated through MA T/C to L. SU L9 is enabled with J loaded.

*Divide.*—If the divisor is in one word, and the dividend is in two words, the VFL fetch request trigger is set. This causes $B1+D1+L2$ to be set to H but the set of SAR $(B1+D1)$ is blocked.

SU10

SU10 right-aligns the multiplier (divisor) by moving a byte at a time from L to K. It loops on itself until the end of the multiplier (divisor) field or a word boundary is reached.

If a word boundary is reached, SU11 is set to bring the next multiplier (divisor) word to L. When the word is in L, SU10 is set, and the right-alignment is continued. The multiplier (divisor) is data checked during SU10.

T3 being on during the first cycle of SU10 enables the setting of the multiplier (divisor) sign trigger. T3 is reset with SU L10.

SU11

As stated above, SU11 gates the second multiplier (divisor) word $(B2+D2)$ to L. This action depends upon J being loaded. SU L11 is enabled with J loaded.

*Divide.*—If the divisor is in two words, and the dividend is in two words, VFL fetch request is set. The set of SAR $(B1+D1)$ and H $(B1+D1+L2)$ is blocked.

SU12

*Multiply.*—SU12 gates the right-aligned multiplier from K to RBL to J. It also gates the low-order multiplicand word $(B1+D1+L1)$ from M to MA T/C to K. If T1 is on, the multiplicand will have to be shifted right at least 32 bits to be right-aligned. Therefore, T1 selects the right 32 shift gate during SU12.

H $(B1+D1+L1)$ is set to T. T is incremented in preparation for the first time in PF1.

*Divide.*—H $(B1+D1+L2)$ is set to T and IOP bits 12–15 (L2) are set to Y and Z. The divisor is gated from K to MA to L with a right 4 shift to properly align the divisor for divide test.

(17.2.4) PREFETCH SEQUENCER FUNCTIONS

PF1

*Multiply.*—PF1 gates K to the shifter to K. T2 being on says that a right 8 shift is necessary the first time in PF1. PF1 loops on itself and T pointer is stepped until T equals 3 or 7. PF2 is then set. Decoding for $T=3$ is for the case when the multiplicand was shifted right 32 during SU12.

*Divide.*—1 is gated to AA (20). The low-order dividend word $(B1+D1+L1)$ is gated from M to MA T/C to K.

PF2

*Multiply.*—PF2 gates the right-aligned multiplicand from K to RBL to J. It also gates the right-alignment multiplier from J to MA T/C to L. The multiplier and multiplicand are now properly positioned for the iterations.

59

*Divide.*—If the dividend is in three words, and J is loaded, the VFL fetch request trigger is set. This sets $B1+D1+1$ to SAR. The set of H $(B1+D1+L2)$ is blocked.

PF L2 is enabled with J Loaded or the fact that the dividend is in one word. If there is a request, when J is loaded $(B1+D1)$ it will be gated from J to MA T/C to M.

PF3

*Multiply.*—PF3 increments the shift counter so it will be right for the first iteration. The sign digit is shifted out of J. T7 is set for the product sign gates. T1 and T2 are reset so that they can be used during the iterations.

*Divide.*—If there was no fetch request in the previous sequence, PF L3 will be enabled and nothing will happen during PF3. If there was a fetch request, when J is loaded $(B1+D1+L1)$ it will be gated to MA T/C to K. Then K $(B1+D1+L1)$ will be gated to RBL to J where it will be held until needed.

T7 is set for divide test and T1 and T2 are reset for use during the iterations.

PF4

*Multiply.*—The first multiplicand digit is set to DC. K and M registers are cleared by gating MAOB to them. Seq-D is set, following which the iteration will begin.

*Divide.*—The S pointer is reset. If T $(B1+D1+L2) \leq Y$ (L2) K and M are interchanged to get the proper starting point in K.

The set-up is now complete, and the divide iterations are started by setting IS1.

(17.3) Multiply iterations

(17.3.1) METHOD OF MULTIPLICATION

Decimal multiply is done basically the same in the environmental systems as the normal "longhand" method. An example of this "longhand" process is shown below:

```
   4,976    multiplier
    ×23    multiplicand
  14,928   partial product
  +9,952   partial product
  114,448  product
```

The entire multiplier is multiplied by each digit of the multiplicand and the results are added with each partial product right-aligned with its corresponding multiplicand digit.

The computer must do each multiplication by adding the multiplier to itself a number of times equal to the multiplicand digit.

When the multiplicand digit is 6 or greater, the operation can be speeded up by multiplying the multiplier by 10 minus the multiplicand digit. The method is shown below.

Note: The use of multiplier and multiplicand may be opposite to the way they are normally thought of. This keeps the terminology consistent with that of said System/360 Manual.

Let A be the multiplier and B be the multiplicand digit. As a numerical example, consider $A=246$ and $B=7$:

```
A×B= A×10−A×(10−B)   longhand check
    = 246×10−246×(10−7)
    = 2460−246×(3)      246
    = 2460−738          ×7
    = 1722             1722
```

Multiplying the multiplier by 10 is accomplished by adding 1 to the next high order multiplicand digit.

The increase in speed by using this method is shown by the fact that it was necessary to subtract the multiplier only 3 times whereas it would have taken 7 additions.

In general, the multiply process in said environmental system is as follows:

60

The low order multiplicand digit is set into a counter and is decoded. If it is 0 (10 following a subtraction) the multiplier is shifted left 1 digit and the next multiplicand digit is set into the counter. If it is not 0 (10) it is decoded for $D \leq 5$ or $D > 5$. As previously shown, this determines whether the multiplier will be added to or subtracted from the partial product.

The multiplier is then added (subtracted) to the partial product field a byte at a time. At the end of each addition of the multiplier, the counter is decremented (incremented) by 1 and decoded. The addition of the multiplier continues until the counter goes to 0 (10). Then the next multiplicand digit is set into the counter and the multiplier is shifted left 1 digit, etc. This continues until all multiplicand digits are exhausted.

(17.3.2) REGISTER FUNCTIONS FOR DECIMAL MULTIPLY

(17.3.2.1) J register

J holds the multiplicand field. J bits 63–63 are sent to DC where counting of the additions takes place. As each multiplicand digit is set into DC, J is shifted right 4 to position the next digit so it can be set into DC when the present one is completed.

After set-up, the portion of the multiplicand that is to the right of the right-most word boundary of the multiplicand field is right-aligned in J. The sign of the multiplicand has been set into a trigger and the sign digit of the field has been shifted out of J. During Seq-D, between set-up and the first iteration sequence, the first multiplicand digit is set into DC and that digit is shifted out of J.

(17.3.2.2) K register and M register

K holds the portion of the partial product that is presently being worked on. M holds the portion of the partial products that is on the other side of the word boundary if a word is crossed by the present partial product.

As the multiplicand-product field can be up to 16 bytes long, there can be up to 2 word boundaries crossed by this field. The portion of this field that must be worked on at any one time is limited by the length of the multiplier which is a maximum of 8 bytes. Therefore, two registers are sufficient to hold the portion of the field that is being worked on.

When a word boundary is crossed while making an addition, K and M are swapped. When the portion of the product that is contained within one word of the field is completed, SF1 is set and that word is stored.

(17.3.2.3) L register

L holds the entire multiplier field right-aligned. This right-alignment is done during set-up.

(17.3.3) VFL COUNTER AND POINTER FUNCTIONS FOR MULTIPLY

(17.3.3.1) Y counter

Y is initially set with the length of the multiplicand-product field (L1). When a byte of the multiplicand has been processed, Y is stepped down by 1. If $Y<L2$ the multiplicand field still has bytes left to process. When $Y=L2$, the product has been completed. All that remains is to check the high-order bytes of the multiplicand for non-zero. When $Y=0$ the multiplicand-product field has been exhausted, and the multiplication is ready for termination.

(17.3.3.2) Z counter

Z is set with the length of the multiplier field (L2) at the beginning of every pass through the multiplier. It is stepped down by 1 everytime a byte of the field is processed. When $Z=0$ the multiplier has been completely added to the partial product.

(17.3.3.3) S pointer

S selects the byte from L that must be added to the partial product. It is reset at the beginning of each pass through the multiplier. As each byte is processed, S is stepped down by 1.

(17.3.3.4) T pointer

T selects the byte from K that must be added to the partial product and the byte of K that the sum must be set into.

The initial setting of T is determined by $B1+D1+L1$. As each byte of the multiplicand is processed, the starting point for the addition must be shifted left by one byte. Y is initially set with L1 and is stepped down by 1 as each multiplicand byte is processed. Therefore, T starting points are determined by $B1+D1+Y$.

When T is set to 0 from $B1+D1+Y$ the last byte of a word is being processed. This means that when this multiplicand byte is completed, a new multiplicand word must be fetched. A word of the product field is also complete and must be stored.

(17.3.3.5) Digit counter

DC is set with the multiplicand digit that is to be processed. It is decoded for $D \leq 5$ or $D > 5$. If $D > 5$ DC is incremented by 1 at the end of each pass through the multiplier. If $D \leq 5$ DC is decremented at the end of each pass. DC is decoded for 0 or 10 to determine when a digit multiply has been completed.

(17.3.4) ODD AND EVEN CYCLE DEFINITION

The basic addressable data unit in the environmental system is the byte. In decimal multiply, the basic data unit is the digit. The multiplicand is processed a digit at a time and the effective shift of the multiplier with relation to the partial product must be a digit.

To get this effective shift of 1 digit to the left, the starting point of T is shifted left by 1 byte and L is shifted right 1 digit. Following the next multiplicand digit L is shifted left by a digit without changing the starting point of T.

To differentiate between these two cases, the shift counter is incremented after each multiplicand digit is processed. The odd cycles are defined as those during which the multiplier is in its left-most position in L. Even cycles are those during which the multiplier is shifted right 4 in L.

As will be seen later, there are other things that must differ in odd and even cycles.

(17.3.5) VFL SEQUENCER FUNCTIONS FOR MULTIPLY

IS1

IS1 is the first sequencer in every pass through the multiplier when adding to the partial product IS1 controls the gates to AD for sign control and HOT 1 for subtraction.

IS2

IS2 is the sequencer after IS1 during which K and L bytes are added. It loops on itself until a word boundary is crossed or the multiplier field is exhausted.

IS3

IS3 is the sequence that is used to propagate a carry into the next byte of the partial product after a pass through the multiplier on odd cycles. IS3 is not needed during even cycles because the multiplier is shifted right a digit. This leaves a high-order digit to collect the carries.

SF12

SF12 is used to swap K and M when a word boundary is crossed during a pass through the multiplier.

Seq-A

Seq-A is the first sequence following an addition of the multiplier. It resets S, gates L2 to Z and gates H $(B1+D1+Y)$ to T. If a word boundary was crossed during the addition, K and M will be swapped back at this time. DC is stepped down (up when subtracting) during Seq-A and is decoded to determine if the digit multiply is complete. If it is, the next multiplicand digit is set to DC. If not, another addition (subtraction) must be made so IS1 is set. If the digit multiply is complete, the next even cycle sequence is Seq-D. The next odd cycle sequence is Seq-B.

Seq-B—Seq-C

When the odd cycle digit multiply is complete, the new Y value must be added to $B1+D1$. Seq-B and Seq-C gate Y to AA and release H.

Seq-D

Seq-D shifts L right 4 following odd cycles and left 4 following even cycles. The shift counter is incremented during Seq-D. Seq-D gates H to T to get the new T starting point if Y was stepped and added to $B1+D1$. J is shifted right 4 to position the next multiplicand digit.

(17.3.6) VFL CONTROL TRIGGER FUNCTIONS

T2—Dummy cycle trigger

Multiplicand digits can have values of 0–9. When a 9 digit is to be processed following a subtract DC will be incremented by 1 so a digit of 10 must be processed. If the 10 digit is processed during an even cycle, it is only necessary to shift L and proceed to the next multiplicand digit. If the 10 digit is processed during an odd cycle, it is necessary to go to IS3 to gate 99 to K. To get to IS3, it is necessary to make a pass through the multiplier without adding. T2 is used to block the addition during this dummy cycle.

T3—True/complement trigger

T3 is set true if the multiplicand digit is 5 or less. It is set complement if the digit is 6 or more. T3 controls whether addition or subtraction cycles are taken.

T4—Swap trigger

T4 is set every time a word boundary is crossed during a pass through the multiplier. T4 in being on causes K and M to be swapped during Seq-A. T4 is reset following the swap.

T5—Block carry trigger

Following a subtract cycle, the partial product is negative, and therefore, all digits above the significant digits are 9. It is necessary to use at least one of these high order 9's in any computation.

During even cycles following a subtraction, it is guaranteed that there will be a high-order non-significant 9 in the partial product because an entire high-order byte was processed in IS3 of the previous odd cycles.

During odd cycles following a subtraction, the next high-order byte (the one that will be processed with IS3) will be 00 instead of 99 as it should be.

The fact that the high-order byte of the partial product is 00 instead of 99 can be compensated for in IS3 of the first pass. This is done by blocking the carry into this byte as shown below:

|  | is |  | should be |  |
| --- | --- | --- | --- | --- |
| K | 00 |  | 99 |  |
| L | 00 |  | 00 | addition |
|  |  | BLOCK |  |  |
|  | 0 | CARRY | 1← | CARRY |
| result | 00 |  | =00 |  |
| K | 00 |  | 99 |  |
| L | 99 |  | 99 | subtraction |
|  |  | BLOCK |  |  |
|  | 0 | CARRY | 1← | CARRY |
| result | 99 |  | 99 |  |

The carry is blocked by T5 which is set during even subtract cycles. T5 is then reset following the first pass so that the carry will not be blocked in subsequent cycles.

T6—Multiplicand sign trigger

T6 is set with the multiplicand sign during set-up and is used to force the product sign while multiplying by the first digit.

T7—First digit trigger

T7 is set during set-up and reset when the first multiplicand digit has been processed. Its function is to gate sign control during IS1.

T8—Termination trigger

T8 is set when $Y=L2$. It controls the multiplicand high-order zero detect.

*Multiply store/fetch.*—Multiply store/fetch has two functions. First, a fetch is requested for the next multiplicand word. Then the completed portion of the product is stored from K.

During a store/fetch, the Y counter tells how much of the multiplicand remains to be processed. It is therefore used to determine the address of the words to be stored and fetched. If $Y>7$, $B1+D1+1$ is fetched and $B1+D1+2$ is stored. If $0<Y\leq 7$, $B1+D1$ is fetched and $B1+D1+1$ is stored.

(17.4) *Divide iterations*

(17.4.1) METHOD OF DIVISION

To show the method of decimal division in said environmental system, consider first the normal longhand method as shown below:

```
              173     R = 12
      23) 3991
           23
          ---
          169
          161
          ---
           81
           69
          ---
           12
```

To generate the quotient the divisor is subtracted from the upper end of the dividend as many times as possible. The number of times it can be subtracted is the value of the first quotient digit. The divisor is then shifted right one digit. The second digit is developed by subtracting from this position.

This process is continued until the divisor has been shifted to the low end of the dividend and the last quotient digit is generated. What remains of the dividend is the Remainder. This may be shown a little more clearly below.

```
                   173     R = 12
          23)     3991
    (1)          − 23
                  ---
                  169
     1           − 23
                  ---
                  146
     2            123
     3           − 23
                  ---
                  100
     4           − 23
                  ---
                   77
     5           − 23
                  ---
                   54
     6           − 23
                  ---
                   31
    (7)          − 23
                  ---
                   81
     1           − 23
                  ---
                   58
     2           − 23
                  ---
                   35
    (3)          − 23
                  ---
                   12
```

For each quotient digit generated above, the divisor was subtracted until the remainder was less than the divisor. This is difficult for the computer to determine. Instead, the computer continues to subtract until the result goes negative. When the result goes negative, the divisor has been subtracted once to often. It must then be added back to get the proper result. The divisor is then shifted right 4 bits and the next quotient digit is generated in the same manner.

It is possible to speed up the preceding process by non-restoring division. Instead of adding the divisor back when the dividend goes negative, the divisor is shifted right 4 in preparation for the next digit. The next digit is then generated by adding the divisor to the dividend until the dividend goes positive.

This is possible because the subtraction that causes the dividend to go negative for one digit is the same as 10 subtractions when the divisor is shifted for the next digit. In this case, the quotient digit counter is set to 9 and counted down.

In said environmental system, both the restoring and the non-restoring methods are used. The high-order digits of the divisor and dividend are decoded to predict approximately what the next quotient will be. This quotient prediction allows the selection of the method that will be the fastest for each particular digit.

In general, the decimal division process in said environmental system is as follows:

First, a divide check is made. The divisor is left-aligned with the left-most-but-one dividend digit. A trial subtraction is made, and if the result does not go negative, the dividend is too large. In this case, the divide check trigger is set and the division process is terminated.

If the result of the trial subtraction is negative, the operation continues. The divisor is shifted right one digit and subtracted from, or added to, the dividend. Whether a quotient digit is generated by addition or subtraction is determined by the positive or negative state of the dividend and the predicted quotient. The quotient digit is generated in a digit counter. When the first digit is completed, it is temporarily stored in a digit buffer. The divisor is then shifted right 4 and the next quotient digit is generated. Now that a full byte of quotient has been generated, it is put away in the upper end of the dividend-quotient field. This process continues until the divisor is right-aligned with the low-order byte of the dividend. The last quotient digit is then generated and put away. The Division is then terminated.

(17.4.2) REGISTER FUNCTIONS FOR DECIMAL DIVIDE

(17.4.2.1) J register

In the decimal divide iteration, J serves no function in developing the quotient. Its only function is to receive any dividend word fetched from memory.

(17.4.2.2) K register and M register

K holds the portion of the dividend-product field that is presently being worked on. M holds the portion of the dividend that is on the other side of the word boundary if a word boundary is crossed by the present alignment of the divisor.

As the dividend-product field can have a maximum length of 16 bytes, it can cross two word boundaries. The length of the divisor determines how much of this field is used in determining any one quotient digit. As the maximum divisor length is 8 bytes, only one word boundary can be crossed by the portion of the dividend field being worked on.

At the beginning of the divide iteration, the high-order two words of the dividend field are in K and M. The first word that will be worked on is in K.

(17.4.2.3) L register

L holds the entire divisor right-aligned. The right-alignment is done during set-up.

(17.4.3) VFL COUNTER AND POINTER FUNCTIONS FOR DIVIDE

Y counter

Y is initially set to L2. Every time a byte of the dividend has been exhausted (a quotient byte generated) Y is stepped up by 1. When $Y=L1$, the last quotient digit is complete and the operation can be terminated.

Z counter

Z is set with L2 at the beginning of each pass through the divisor. It is stepped down by 1 every time a byte of the divisor in L is used. When $Z=0$ the addition has been completed with the exception of the extra byte during odd cycles.

S pointer

S is reset at the beginning of each pass through the divisor. It is used to select the divisor bytes as they are subtracted from the dividend. S is stepped down by 1 as each byte is processed.

T pointer

T is set with $B1+D1+Y$ at the beginning of each pass through the divisor. It is counted down by 1 as each byte of the dividend is processed.

Y is stepped up by 1 as each byte of quotient is generated. Therefore $B1+D1+Y$ provides the T starting point that shifts right while proceeding through the division.

T also selects the K byte in which to set the quotient. At the end of a pass through the divisor when a quotient byte has been completed, it is only necessary to step T down once more to set the quotient byte into K.

Digit counter

DC is used to generate the quotient digit. It is set to 0 and counted up when the divisor is being subtracted from the dividend. It is set to 9 and counted down when the divisor is being added. It is stepped after every pass through the divisor until the dividend changes signs. When this happens the quotient digit is complete.

Digit buffer

DB is used to hold one quotient digit while another is being generated in DC. Thus, a full byte of quotient can be stored after every other digit is generated.

Odd and even cycle definition

To effectively shift the divisor right 4, the first time it is only necessary to shift L right 4. For the next right 4 shift, it is necessary to shift the starting point of the addition right 1 byte and shift L left 4.

To keep track of this shifting, the shift counter is incremented after every digit is generated. The odd cycles are defined as those during which the divisor is in its leftmost position in L. During even cycles, the divisor is shifted right 4 in L.

An odd cycle quotient digit is put away in DB. When an even cycle quotient digit has been generated in DC, DB and DC are put away in K.

(17.4.5) VFL SEQUENCER FUNCTIONS FOR DIVIDE

(17.4.5.1) Iteration sequencers

IS1

IS1 is the first sequencer in every pass through the divisor when subtracting (adding) from the dividend. IS1 controls the gates to AD for sign control and HOT 1 for subtraction.

IS2

IS2 is the sequencer after IS1 during which L bytes are subtracted (added) from K bytes. It loops on itself until coming to a word boundary or the end of the divisor field.

IS3

IS3 is used to process an extra byte during an odd cycle pass through the divisor. The extra byte is necessary because the next high-order digit of the dividend may not be zero. The extra cycle is not necessary during even cycles because the high-order divisor digit is the low-order digit of a byte.

(17.4.5.4) Other sequencers

SF12

SF12 is used to swap K and M when a word boundary is crossed during a pass through the divisor.

Seq-A

Seq-A is the first sequence following a subtraction (addition) of the divisor. It resets S, gates L2 to Z and gates H $(B1+D1+Y)$ to T. If the portion of the dividend presently spanned by the divisor is in two words, K and M are normally swapped at this time. DC is stepped during Seq-A if the quotient digit is not complete.

If the quotient digit is not complete, another subtraction (addition) must be made so IS1 is set. If not, the next even cycle sequence is Seq-B. The next odd cycle sequence is Seq-D.

Seq-B, Seq-C

When the even cycle digit is complete, the new Y value must be added to $B1+D1$. Seq-B and Seq-C gate Y to AA and release H.

Seq-D

Seq-D shifts L right 4 following odd cycles, and left 4 following even cycles. The shift counter is incremented during Seq-D. Seq-D also gates H to T to get the new T starting point if Y was stepped and added to $B1+D1$.

(17.4.6) VFL CONTROL TRIGGER FUNCTIONS

T1—First word store trigger

T1 is set when the first quotient-remainder word has been stored. It is used in generating addresser of subsequent stores.

T2—Restore trigger

T2 is set when a quotient digit is complete and the decoding of the divisor, dividend and T/C says to restore the dividend before generating the next digit.

T2 prevents the things that normally happen when a quotient digit is complete until after the restore of the dividend.

T3—True/complement trigger

T3 is set to control whether the divisor is added to, or subtracted from, the dividend.

T4—Swap trigger

T4 is turned on when the portion of the dividend that is being worked on moves into two words. It is turned off when the portion of the dividend that is being worked on moves into one word. Its function is to control the swapping of K and M after each pass through the divisor.

T5—Block swap trigger

When generating the last quotient digit of a word, the swap trigger (T4) is still on. However, no word boundaries are actually crossed during these passes through the divisor. T5 is set to block swapping K and M between these passes. T5 also causes the set of SF6. The store/fetch sequences will store the word that is in K.

T6—Dividend sign trigger

T6 is set with the sign of the dividend during set-up. It is used to generate the quotient sign and to force the machine preferred sign to the remainder.

T7—Divide test trigger

T7 is turned on during set-up and is reset following the divide test. It blocks setting the AD sum into K during divide test.

T8—Termination trigger

As each quotient byte is stored, the mark is set for that byte. When the division is complete, the remainder must be stored. Therefore, the marks must be set. To set the marks, a restore cycle is forced if it is not needed. If the restore is not actually needed, the results will not be set into K.

If the remainder is in two words (T4 on) the marks can only be set for the high-order word. A second restore cycle must be forced to set the marks for the low-order word after the first word has been stored.

T8 is set during the store of the high-order word if the swap trigger (T4) is on. During the restore of the low-order word, T8 being on when a word boundary is crossed causes the word to be stored and, consequently, the termination of the operation.

(17.4.7) DIVIDE STORE/FETCH

The function of divide store/fetch is to store the complete portion of the quotient-remainder field which is in K.

To determine the address of the word to be stored, two triggers are used. T1 is turned on after the first word is stored. T4 (swap trigger) will be on until the last word is to be stored.

The address of the word to be stored is $$B1+D1+\text{DELTA}$$

Sections 18.0 through 22.0 are included in the case relating to said environmental system, which is referred to in Section 2.0 herein.

While the invention has been shown and described with respect to a preferred embodiment thereof, it should be apparent to those skilled in the art that various changes and omissions in the form and detail thereof may be made therein without departing from the spirit and scope of the invention.

What is claimed is:

1. In a data processing system, data flow control, comprising:
    address means for specifying storage words;
    a primary source register;
    a second register, said second register relating to secondary sources and to results;
    a primary sink and a second sink;
    a buffer register;
    a character control means for selecting characters from among the contents of said registers;
    and means responsive to said character control means and to said address means to extract characters from said primary register or from said secondary register, alternatively, for application to said primary sink, said means applying other selected characters to said second sink from said second register, said means also transferring the contents of said second register to either said buffer register or to said primary register.

2. In a data processing system, character selection apparatus, comprising:
    a plurality of registers, said registers having input and output gating means;
    a first register control means and a second register control means, said first register control means operable to select characters from a first one of said registers and to return characters thereto, said second character control means operable to select characters from either said first register or from the second one of said registers;
    a buffer register;
    means for moving data between said second register and said buffer register;
    means for moving data from said buffer register to said first register;
    and means responsive to said first and second register control means to selectively connect said second register control means to said first register or to said second register, alternatively.

3. In a data processing system, character selection apparatus, comprising:
    a primary source register and a secondary register, said registers having input and output gating means;
    a first character selecting means and a second character selecting means, said first character selecting means operable to select characters from said primary source and to return characters thereto, said second character selecting means operable to select characters from either said primary source register or said secondary source register;
    means for moving data between said secondary source register and said primary source register;
    and means responsive to said first and second character selecting means to selectively connect said second character selection means to said primary character register or to said secondary character register, alternatively.

4. In a data processing system, character selection apparatus, comprising:
    a primary source register and a secondary register, said registers having input and output gating means;
    a first character selecting means and a second character selecting means, said first character selecting means operable to select characters from said primary source register and to return characters thereto, said second character selecting means operable to select characters from either said primary source register or said secondary source register;
    a buffer register;
    means for moving data between said secondary source register and said buffer register;
    means for moving data from said buffer register to said primary source register;
    and means responsive to said first and second character selecting means to selectively connect said second character selection means to said primary character register or to said secondary character register, alternatively.

5. In a data processing system, data flow control, comprising:
    a plurality of registers;
    an operand source control;
    and means responsive to said operand source control for selectively connecting said operand source control to one of said registers, said source control being shifted from controlling one of said registers to controlling another of said registers in response to said operand source control indicating the exhaustion of the contents of one of said registers.

6. In a data processing system, data flow control, comprising:
    a pair of registers;
    a first operand source control;
    a second operand source control;
    means responsive to said first operand source control for selectively connecting it to one of said registers, said first source control being shifted from controlling a first one of said registers to controlling the second one of said registers in response to the exhaustion of the contents of said first register, and means for selectively connecting said second operand source control to said second register, said second register thereby subjected to control by either of said operand source controls.

References Cited

UNITED STATES PATENTS 3,027,081   3/1962   Evans et al. _____ 340—172.5
3,161,855   12/1964   Propster et al. _____ 340—172.5

PAUL J. HENON, *Primary Examiner.*

ROBERT C. BAILEY, *Examiner.*

G. D. SHAW, *Assistant Examiner.*